(12) United States Patent
Gendron et al.

(10) Patent No.: US 9,848,665 B2
(45) Date of Patent: Dec. 26, 2017

(54) BALLISTIC AND IMPACT PROTECTIVE SYSTEM FOR MILITARY HELMET ASSEMBLY

(75) Inventors: Marie-Pierre Gendron, Mercier (CA); Stéphane Lebel, Saint Rédempteur (CA); Martin Bélanger, Québec (CA); Richard Coomber, Montreal (CA); Stephan Morency, Montreal (CA)

(73) Assignee: Revision Military S.a.r.L., Luxembourg (LU)

( * ) Notice: Subject to any disclaimer, the term of this patent is extended or adjusted under 35 U.S.C. 154(b) by 413 days.

(21) Appl. No.: 12/875,108

(22) Filed: Sep. 2, 2010

(65) Prior Publication Data

US 2011/0113519 A1 May 19, 2011

Related U.S. Application Data

(60) Provisional application No. 61/239,733, filed on Sep. 3, 2009, provisional application No. 61/246,701, filed
(Continued)

(51) Int. Cl.
*A42B 3/04* (2006.01)
*G02C 3/02* (2006.01)
(Continued)

(52) U.S. Cl.
CPC ............. *A42B 3/04* (2013.01); *A42B 3/221* (2013.01); *A42B 3/326* (2013.01); *F41H 1/04* (2013.01);
(Continued)

(58) Field of Classification Search
CPC .... A42B 1/08; A42B 3/08; A42B 3/32; A42B 1/247
(Continued)

(56) References Cited

U.S. PATENT DOCUMENTS 1,272,309 A 7/1918 Paupa
2,881,442 A 4/1959 Sowle
(Continued)

FOREIGN PATENT DOCUMENTS

| DE | 10234330 A1 | 2/2004 |
|---|---|---|
| EP | 1 834 535 A2 | 9/2007 |
| GB | 2464749 A | 5/2010 |

OTHER PUBLICATIONS

84-Headborne Systems Integration—Modified Source Sought, 2007.
(Continued)

*Primary Examiner* — Katherine Moran
(74) *Attorney, Agent, or Firm* — Wolf, Greenfield & Sacks, P.C.

(57) ABSTRACT

A helmet attachment system is usable to attach a mandible or face or mouth guard. The helmet attachment system also comprises a pair of attachment bases, each arranged on a side of the helmet near to an ear covering of the helmet. The attachment bases each include a metal base plate covered by an attached body block. Each attachment base provides provisions for attaching opposite ends of a mandible to the bases. The metal base plate includes hooks for engaging an edge of the helmet. A pair of strap assemblies is provided, each strap assembly connected to one attachment base. The strap assemblies extend rearward and are connected to the back rail by a buckle member on the end of each strap assembly. The back rail includes a pair of buckle member-receiving slots. The straps assemblies and the hooks provided on the attachment bases secure the attachment bases to the helmet.

23 Claims, 67 Drawing Sheets

Related U.S. Application Data on Sep. 29, 2009, provisional application No. 61/265,707, filed on Dec. 1, 2009, provisional application No. 61/334,923, filed on May 14, 2010.

(51) Int. Cl.

| | | |
|---|---|---|
| *G02C 7/02* | (2006.01) | |
| *A42B 3/22* | (2006.01) | |
| *F41H 11/04* | (2006.01) | |
| *A42B 3/32* | (2006.01) | |
| *F41H 1/04* | (2006.01) | |

(52) U.S. Cl.
CPC ............ *F41H 11/04* (2013.01); *G02C 3/02* (2013.01); *G02C 7/022* (2013.01); *G02C 2202/04* (2013.01)

(58) Field of Classification Search
USPC ........ 2/6.6, 6.7, 10, 2.5, 421, 422, 424, 425, 2/468
See application file for complete search history.

(56) References Cited

U.S. PATENT DOCUMENTS

| | | | |
|---|---|---|---|
| 2,890,457 A | | 6/1959 | Marietta |
| 2,918,060 A | | 12/1959 | Lobelle |
| 2,980,914 A | | 4/1961 | Heisig et al. |
| 3,113,318 A | | 12/1963 | Marietta |
| 3,137,005 A | | 6/1964 | Herbine et al. |
| 3,167,783 A | | 2/1965 | Wolfe |
| 3,204,251 A | | 9/1965 | Child |
| 3,216,023 A | | 11/1965 | Morgan |
| 3,662,435 A | | 5/1972 | Allsop |
| 3,732,574 A | | 5/1973 | Hale |
| 3,781,915 A | | 1/1974 | Menold et al. |
| 3,797,042 A | | 3/1974 | Gager, Jr. |
| 3,897,598 A | * | 8/1975 | Bednarczuk et al. ............. 2/9 |
| 3,945,043 A | | 3/1976 | Deangelis |
| 4,021,858 A | | 5/1977 | Neeld et al. |
| 4,028,743 A | | 6/1977 | Christensen |
| 4,042,974 A | * | 8/1977 | Morgan et al. .................. 2/9 |
| 4,117,554 A | | 10/1978 | Palumbo |
| 4,170,042 A | | 10/1979 | Aileo |
| 4,199,823 A | | 4/1980 | Jenkins et al. |
| 4,224,694 A | | 9/1980 | Palmaer |
| 4,536,892 A | | 8/1985 | Brinkhoff et al. |
| 4,641,382 A | | 2/1987 | Gessalin |
| 4,667,424 A | | 5/1987 | Sartor et al. |
| 4,675,920 A | | 6/1987 | Glasheen |
| 4,689,836 A | | 9/1987 | Vitaloni |
| 4,713,844 A | | 12/1987 | Westgate |
| 4,766,615 A | | 8/1988 | Morin et al. |
| 4,769,857 A | * | 9/1988 | Cianfanelli et al. ........... 2/424 |
| 4,847,920 A | | 7/1989 | Aileo et al. |
| 4,975,981 A | | 12/1990 | Ray |
| 4,999,846 A | | 3/1991 | Ball et al. |
| 5,012,528 A | | 5/1991 | Pernicka et al. |
| 5,090,708 A | | 2/1992 | Gerlitz et al. |
| 5,091,997 A | | 3/1992 | Foehl |
| 5,131,101 A | | 7/1992 | Chin |
| 5,177,816 A | | 1/1993 | Schmidt et al. |
| 5,249,347 A | | 10/1993 | Martinitz |
| 5,257,417 A | | 11/1993 | Oleson |
| 5,263,204 A | * | 11/1993 | Butsch ............................ 2/424 |
| 5,416,952 A | | 5/1995 | Dodge |
| 5,448,780 A | | 9/1995 | Gath |
| 5,471,678 A | | 12/1995 | Dor |
| 5,506,730 A | | 4/1996 | Morley et al. |
| 5,571,220 A | | 11/1996 | Hall |
| 5,603,117 A | | 2/1997 | Hudner et al. |
| 5,606,779 A | | 3/1997 | Lu |
| 5,687,427 A | | 11/1997 | Lamattina et al. |
| 5,689,833 A | | 11/1997 | Allen et al. |
| 5,752,280 A | | 5/1998 | Hill |
| 5,779,259 A | | 7/1998 | Lin |
| D406,402 S | | 3/1999 | Simpson |
| D406,404 S | | 3/1999 | Simpson |
| 5,887,318 A | | 3/1999 | Nicoletti |
| 5,901,369 A | | 5/1999 | Pilney |
| 5,909,850 A | | 6/1999 | Cavasin et al. |
| 5,966,738 A | | 10/1999 | Wang Lee |
| 6,125,477 A | | 10/2000 | Crippa et al. |
| 6,161,225 A | | 12/2000 | Arai |
| 6,175,994 B1 | | 1/2001 | Nicoletti |
| 6,237,161 B1 | | 5/2001 | Lee |
| 6,350,030 B2 | | 2/2002 | Fujima |
| 6,381,750 B1 | | 5/2002 | Mangan |
| 6,701,537 B1 | | 3/2004 | Stamp |
| 6,795,977 B2 | | 9/2004 | Basson et al. |
| 6,804,829 B2 | | 10/2004 | Crye et al. |
| 6,834,398 B1 | | 12/2004 | Martinez |
| 6,892,393 B1 | | 5/2005 | Provost et al. |
| 6,931,668 B2 | | 8/2005 | Dobbie et al. |
| 7,003,802 B2 | | 2/2006 | Broersma |
| 7,056,179 B2 | | 6/2006 | Courtney |
| 7,207,072 B2 | | 4/2007 | Halsnes et al. |
| 7,219,370 B1 | | 5/2007 | Teetzel et al. |
| D592,359 S | | 5/2009 | McGovern et al. |
| 7,631,365 B1 | | 12/2009 | Mahan |
| 7,805,776 B2 | | 10/2010 | Crossman et al. |
| 8,286,270 B2 | | 10/2012 | Higgins |
| 2002/0120979 A1 | | 9/2002 | Prendergast |
| 2003/0070200 A1 | | 4/2003 | Crye et al. |
| 2003/0074722 A1 | | 4/2003 | Lee |
| 2003/0115662 A1 | | 6/2003 | Dobbie et al. |
| 2004/0117898 A1 | | 6/2004 | Penque, Jr. et al. |
| 2006/0064799 A1 | | 3/2006 | Dion |
| 2006/0195973 A1 | | 9/2006 | Ikeda |
| 2006/0206976 A1 | | 9/2006 | Futch |
| 2006/0248623 A1 | | 11/2006 | Miller |
| 2006/0282939 A1 | | 12/2006 | Rogers et al. |
| 2007/0083967 A1 | | 4/2007 | Crossman et al. |
| 2007/0214537 A1 | | 9/2007 | Durocher et al. |
| 2008/0115260 A1 | | 5/2008 | Schulz |
| 2008/0127400 A1 | | 6/2008 | Dupuis |
| 2008/0196148 A1 | * | 8/2008 | Morin ............................. 2/421 |
| 2009/0083890 A1 | | 4/2009 | Dempsey et al. |
| 2009/0100576 A1 | * | 4/2009 | Kim ................................ 2/424 |
| 2009/0126059 A1 | | 5/2009 | Tack |
| 2009/0144872 A1 | * | 6/2009 | Lebel et al. ..................... 2/6.7 |
| 2009/0183302 A1 | | 7/2009 | Choi |
| 2010/0064405 A1 | | 3/2010 | McGovern |
| 2010/0083413 A1 | | 4/2010 | McGovern |
| 2010/0132095 A1 | | 6/2010 | Gafforio et al. |
| 2012/0192329 A1 | | 8/2012 | Lebel et al. |
| 2014/0033406 A1 | | 2/2014 | Lebel et al. |

OTHER PUBLICATIONS

PCT/US2010/047757, Feb. 25, 2011, International Search Report and Written Opinion.

PCT/US2010/047757, Mar. 15, 2012, International Preliminary Report on Patentability.

* cited by examiner

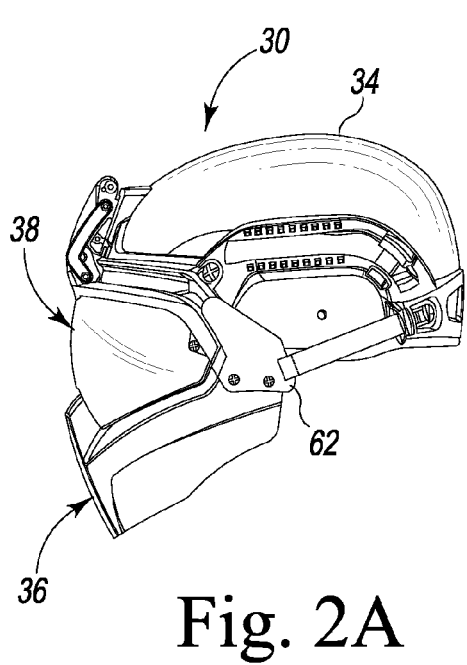
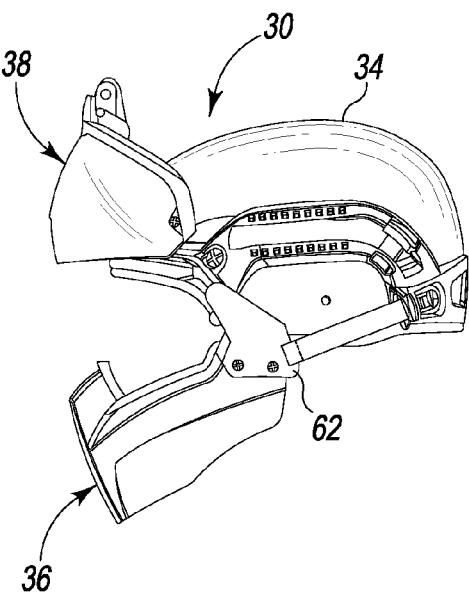
Fig. 2A    Fig. 2B
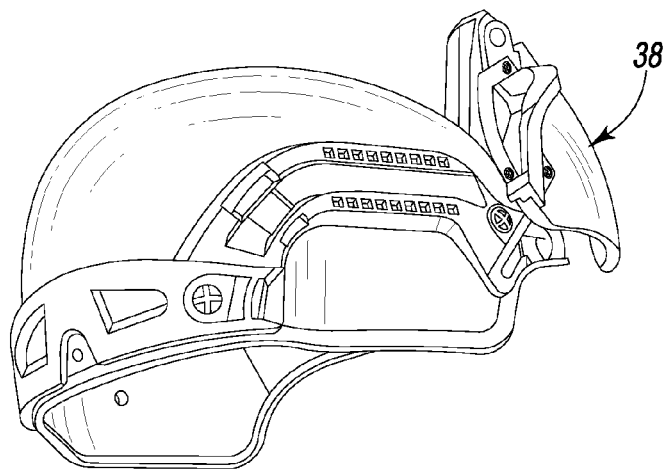
Fig. 2C

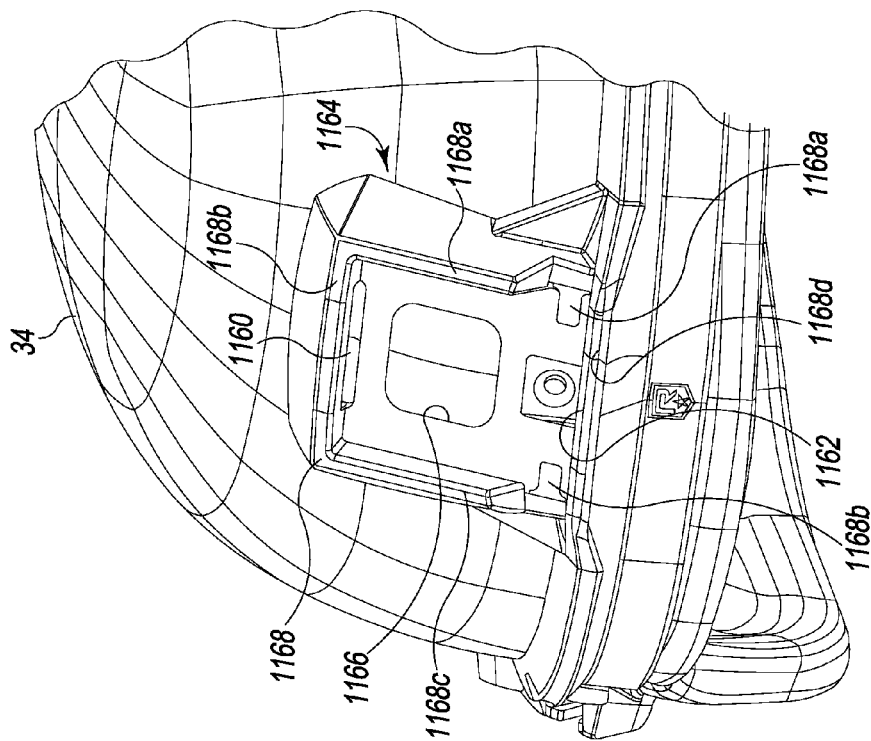
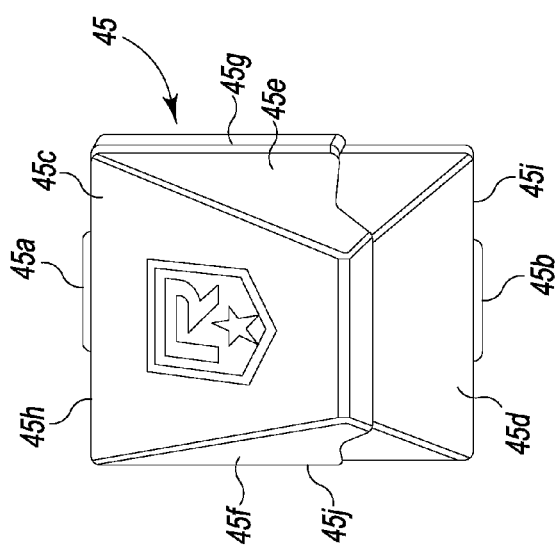
Fig. 10B
Fig. 10A

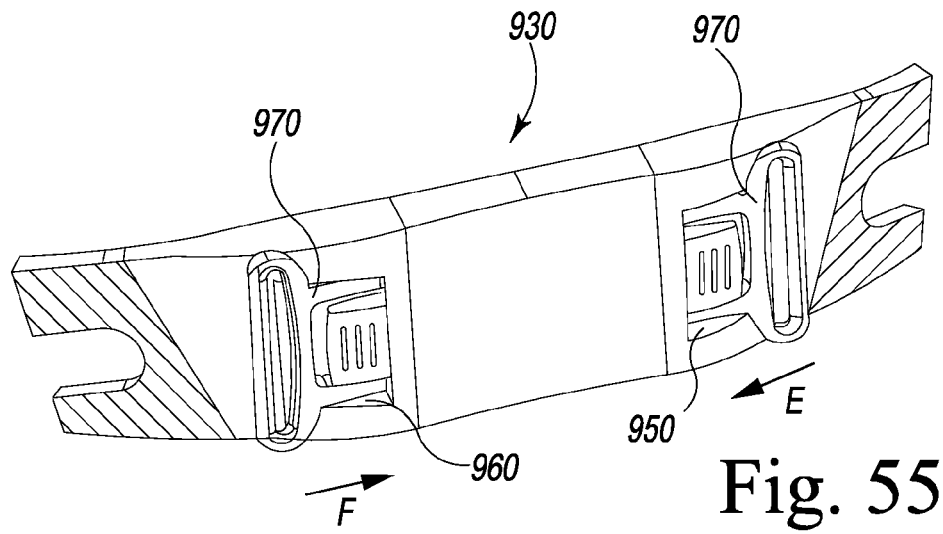
Fig. 55
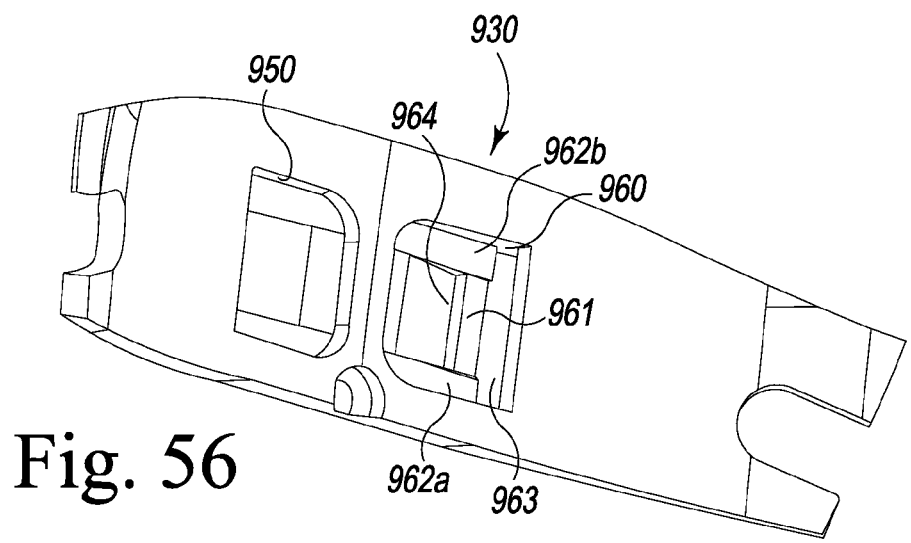
Fig. 56
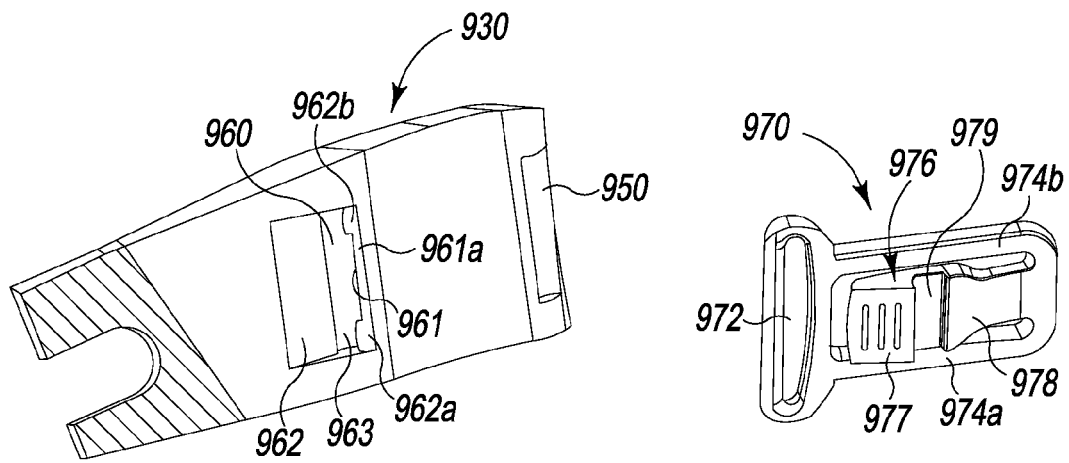
Fig. 57
Fig. 58 ptimate # BALLISTIC AND IMPACT PROTECTIVE SYSTEM FOR MILITARY HELMET ASSEMBLY

This application claims the benefit of U.S. Provisional Application Ser. Nos. 61/239,733 filed Sep. 3, 2009; 61/246,701 filed Sep. 29, 2009; 61/265,707 filed Dec. 1, 2009; and 61/334,923 filed May 14, 2010.

TECHNICAL FIELD OF THE INVENTION

The present invention relates to helmet assemblies having multiple components such as face shields, mandibles or mouth guards and accessories for use on helmets.

BACKGROUND OF THE INVENTION

Military and law-enforcement helmets with face shields are known such as disclosed in U.S. Pat. Nos. 5,901,369 and 4,536,892. These face shields provide pivot arrangements on opposite lateral sides of the face shield to allow the face shield to be pivoted upward away from the user's face when the face shield is not deployed. The face shield is held in a deployed position in front of the user's face by locking of the pivot arrangements.

The present inventors have recognized that it would be desirable to provide a helmet assembly with an improved attachment system for attaching a face shield, a mandible, goggles and other accessories.

The present inventors have also recognized that it would be desirable to provide an attachment system that was quickly and easily installed onto, or removed from, a helmet.

The present inventors recognize a need for a visor system having a lens that provides ballistic and impact protection while reducing refractive power, astigmatism and prism in the horizontal direction as well as in the vertical direction which is important for military personal activities such as inspecting the roof of buildings, crouching and looking upward to use a weapon, inspecting grounds, and running.

The present inventors recognize a need for a lens that provides not only impact protection but also ballistic protection for military applications.

The present inventors recognize the need for a lens without a molded bead frame structure which can induce stress on the lens during molding.

The present inventors recognize the need for a lens design that improves optics of the area extending 40 degrees from the straight ahead line of sight.

SUMMARY OF THE INVENTION

An exemplary embodiment of the present invention provides a helmet assembly that includes a face shield and a single, center top mounting arrangement that operatively connects a center top location of the face shield to a center front mount on the helmet. The face shield can be raised and lowered about a pivot axis provided in the mounting arrangement between a tilted up, non-use position and a lowered, deployed position. The mounting arrangement can include a detent and two recesses, wherein the detent engages a first recess at a slightly forwardly displaced position to allow ventilation between the helmet and mandible and the face shield and a second recess at the tilted up, non-use position. The recess and detent engagement can be overcome by an easy manual force acting on the face shield to reposition the face shield.

An exemplary embodiment of the present invention also provides a helmet attachment system that is usable to attach a mandible or mouth guard. The exemplary embodiment provides a helmet attachment system that attaches other devices such as goggle straps, night vision devices, and other devices. The exemplary embodiment of the present invention provides an attachment system that is quickly and easily installed onto or removed from a helmet.

The helmet assembly can include a front mount or front rail that is substantially contiguous with side rails mounted to the helmet which extend rearward from side edges of the front mount. The rear edges of the side rails can be substantially contiguous with a back rail mounted on the helmet. The side rails are configured to provide attachment locations for further components, such as lights, electronics, communication equipment, etc. The back rail can be configured to secure ends of goggle straps; if for example, under certain circumstances the wearer prefers wearing goggles instead of mounting the face shield.

The combination of a front mount, side rails and back rail form a substantially circumferential reinforcement of the helmet and provides front side and rear mounting platforms for accessories, electronics and other tools and devices according to the needs of the wearer.

The helmet assembly of the exemplary embodiment of the present invention also comprises a pair of attachment bases, each arranged on a side of the helmet near to an ear covering of the helmet. The attachment bases each include a metal base plate covered by an attached body block. Each attachment base provides provisions for attaching one or more devices to the attachment base, such as for attaching opposite ends of a mandible to the bases. The metal base plate includes hooks for engaging an edge of the helmet. A pair of strap assemblies is provided, each strap assembly connected to one attachment base. The strap assemblies extend rearward and are connected to the back rail by a buckle member on the end of each strap. The back rail includes a pair of buckle member-receiving slots. The straps assemblies and the hooks provided on the attachment bases secure the attachment bases to the helmet. The mandible is screwed onto the attachment bases. The mandible is easily installed by insertion of a headed pin or rivet extending from each attachment base inward, through channels formed on the front mount or front rail and sliding the attachment bases with mandible mounted thereto through the channel until the hooks engage the rim of the helmet. The straps are then drawn rearward and buckled. The mandible can be removed by unbuckling the straps from the back rails and sliding the headed pins back out of the channels formed in the front mount or front rail.

The face shield mounting arrangement provides an effective, cost efficient mechanism for holding the face shield in either the downward deployed position or the upwardly tilted, non-use position. A wearer can raise and lower the face shield with only one hand. This attribute allows a soldier to raise or lower his face shield without putting down his rifle.

Advantageously, a front mount attached to the helmet can accommodate either the face shield mounting arrangement or a night vision appliance. Thus the mounting apparatus for a helmet is simplified and the number of parts and mounting complexities are reduced.

In one embodiment the face shield is a visor system that has a lens with optics that are designed to provide not only impact protection but also high energy ballistic protection while providing clarity by reduced refractive power, astigmatism, and prism in the horizontal direction as well as in the vertical direction. According to one embodiment the lens has a thickness defined between the inner and outer surfaces. The thickness is greatest at the centerpoint and tapers at a substantially constant rate toward the edges. The radius of curvature of the outer surface of the lens is longer and offset forwardly of the radius of curvature of the inner surface of the lens causing the lens surfaces to be eccentric.

Numerous other advantages and features of the present invention will be become readily apparent from the following detailed description of the invention and the embodiments thereof, and from the accompanying drawings.

BRIEF DESCRIPTION OF THE DRAWINGS

FIG. 2A is a side view showing the helmet assembly with a face shield in a slightly tilted up position;

FIG. 2B is a side view showing the helmet assembly with the face shield in a fully tilted up non-use position;

FIG. 2C is a perspective view showing the helmet assembly in a fully tilted up, non-use position;

FIG. 10A is a perspective view of a cap;

FIG. 10B is an enlarged, fragmentary front perspective view of the helmet assembly portion with a second embodiment helmet mount;

FIG. 55 is a perspective front view of the center back rail of the toothed back rail embodiment of the adjustable back rail system;

FIG. 56 is a perspective rear view of the center back rail of the toothed back rail embodiment of the adjustable back rail system;

FIG. 57 is a second perspective front view of the center back rail of the toothed back rail embodiment of the adjustable back rail system;

FIG. 58 is a perspective view of a buckle member;

DETAILED DESCRIPTION

Figure 1:
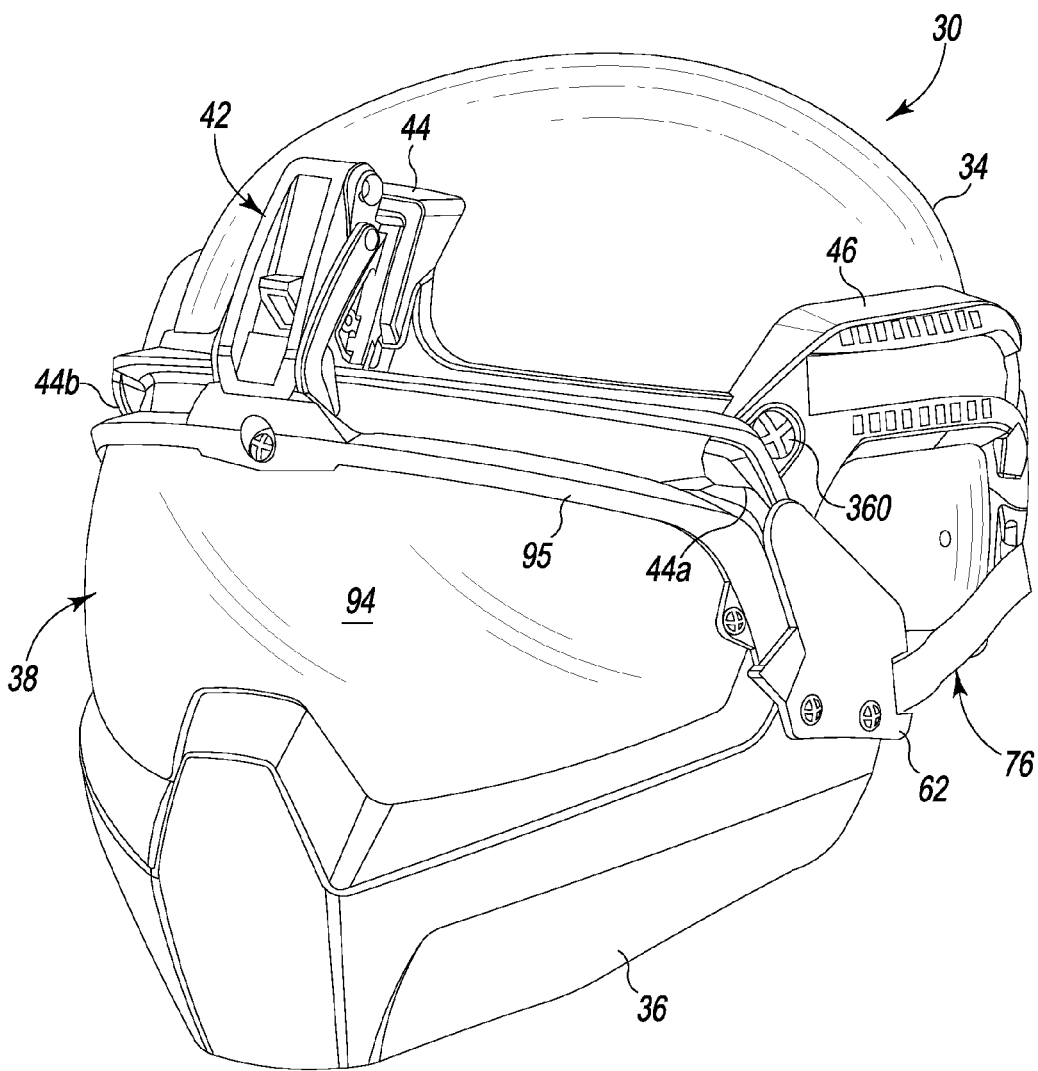
FIG. 1 is a perspective view of a helmet assembly outfitted with the attachment system of the present invention.
Figure 2:
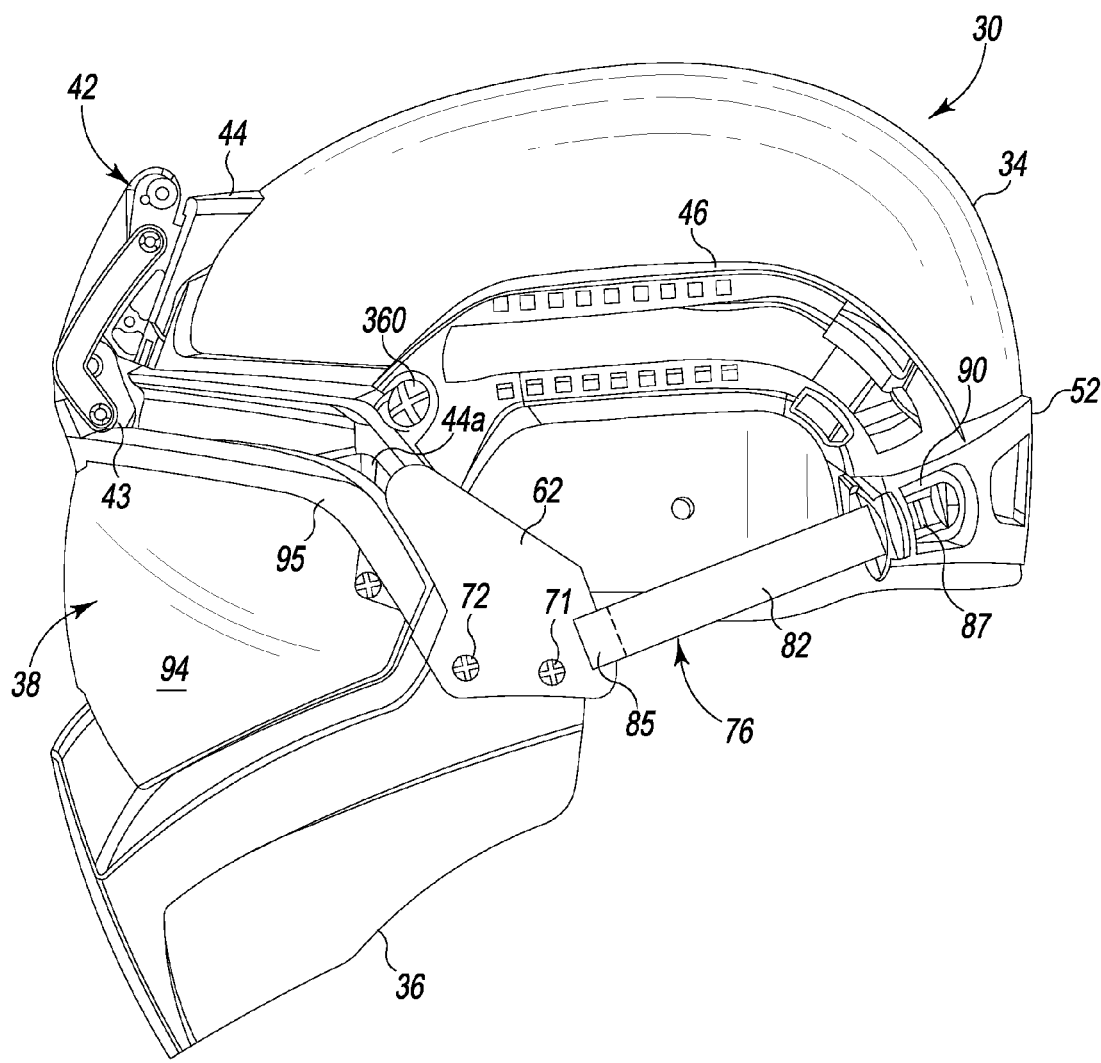
FIG. 2 is a left side view of the helmet assembly shown in FIG. 1.
Figure 3:
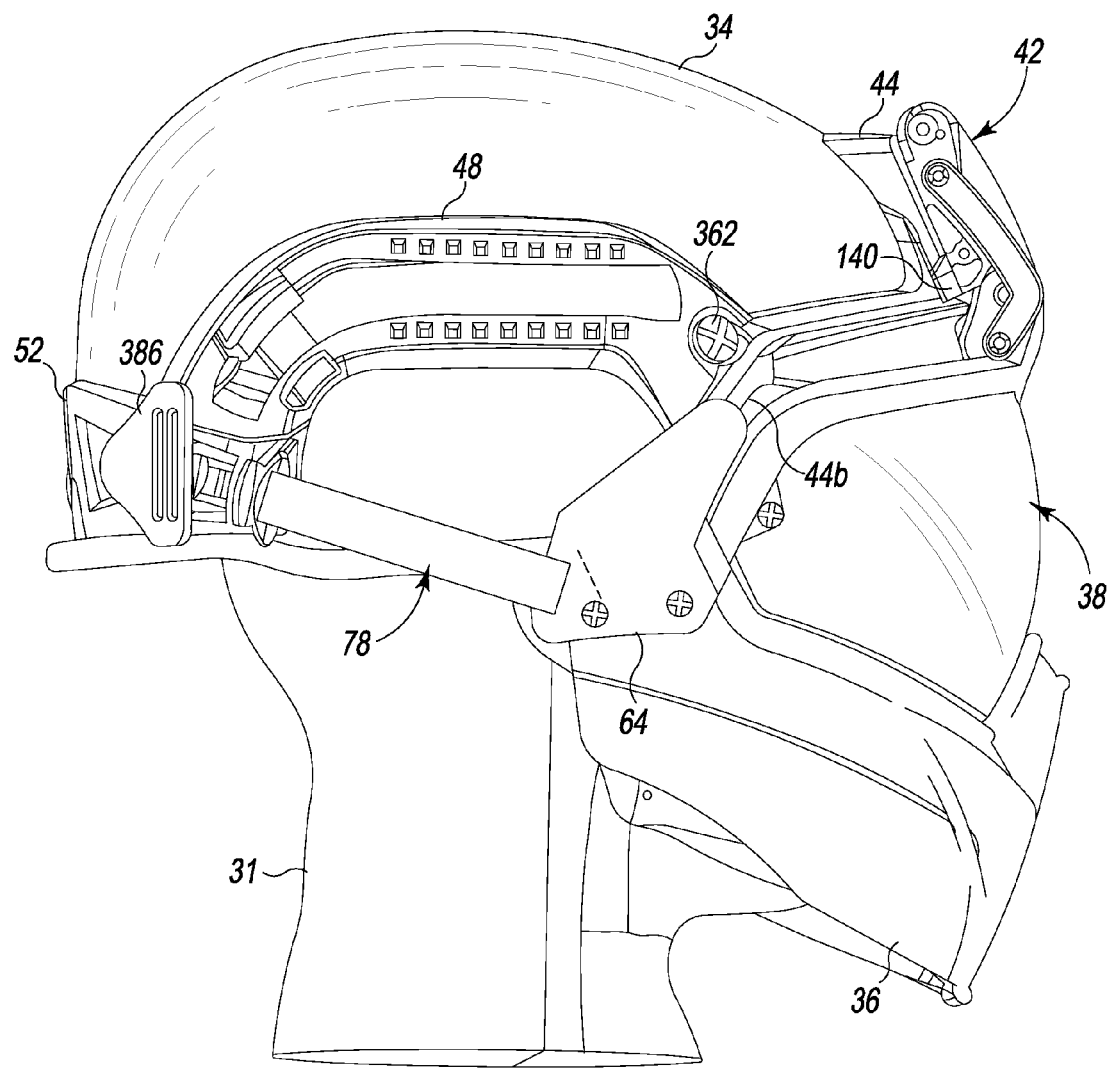
FIG. 3 is a right side view of the helmet assembly shown in FIG. 1.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

It should be noted that the helmet assembly described herein is symmetrical across a vertical, front-to-back centerplane as evidenced by the figures and any description of a right side component will also describe the left side component as a mirror image thereof.

FIGS. 1-5 illustrate a helmet assembly 30 to be worn by a wearer 31 (FIG. 3) according to an exemplary embodiment of the present invention. The helmet assembly includes a helmet, such as a military helmet 34. A mandible 36 is operatively connected to the helmet 34. A protective face shield, such as a transparent visor or transparent face shield 38 is also operatively connected to the helmet, substantially between a front of the helmet 34 and the mandible 36. A mounting arrangement 42 is operatively connected to the helmet 34 and to the face shield 38 which allows movement of the face shield 38 with respect to the helmet. The mounting arrangement 42 includes a shield mount 43 and a helmet mount 44.

The helmet mount 44 extends across at least a partial width of the helmet and is contiguous on the right and left sides of the helmet to a left side rail 46 and a right side rail 48 (left and right orientations mentioned herein are according to the helmet wearer's perspective). The side rails are mirror image identical across a vertical, front-to-back center plane of the assembly 30. Rear portions of the rails 46, 48 are contiguous with a back rail 52. The mount 44, the side rails 46, 48 and the back rail 52 together substantially surround a perimeter of the helmet 34.

The helmet mount includes two side channels 44a, 44b used for mounting the mandible 36 as described below.

Figure 4:
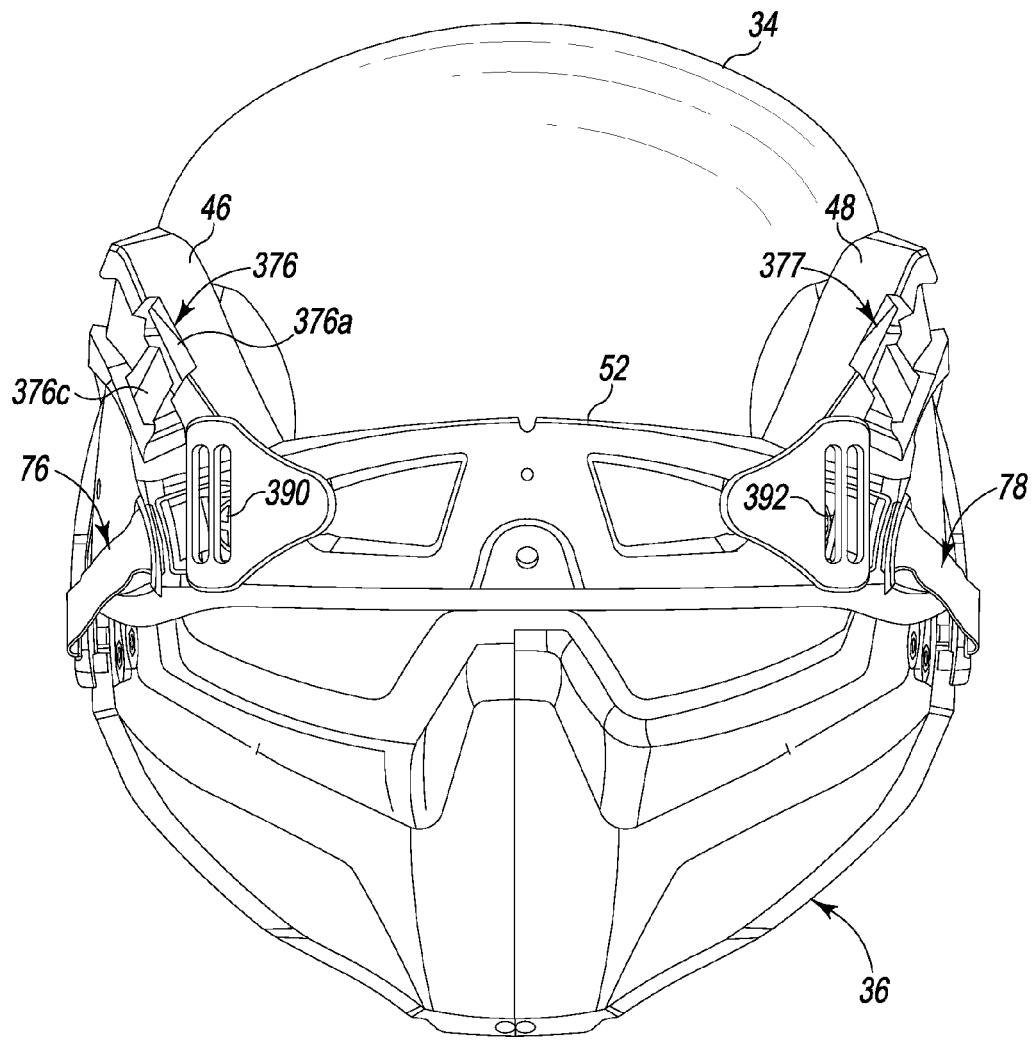
FIG. 4 is a rear view of the helmet assembly shown in FIG. 1.
Figure 4A:
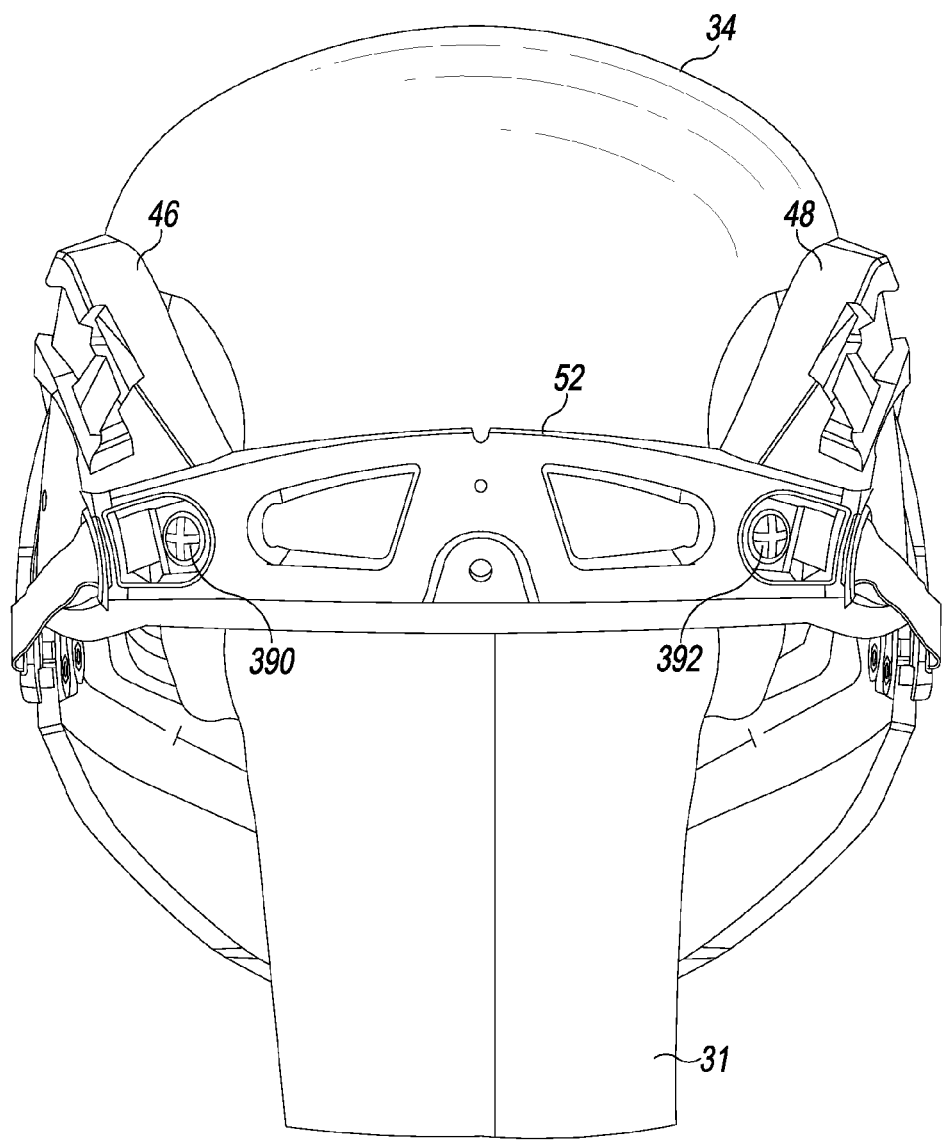
FIG. 4A is a rear view identical to FIG. 4 but with portions removed for explanation of underlying features.
Figure 4D:
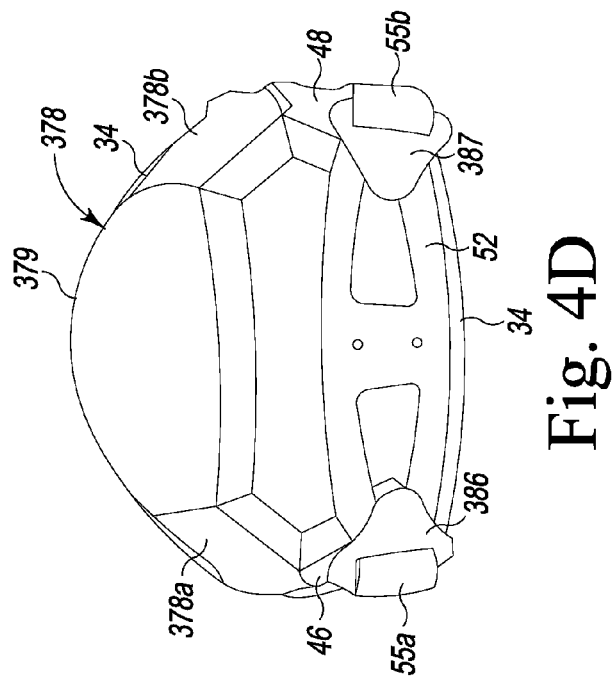
FIG. 4D is a right side perspective view of the helmet assembly of FIG. 4C.
Figure 4B:
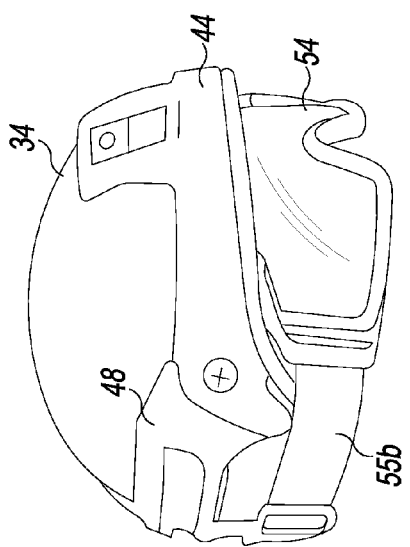
FIG. 4B is a perspective view of the helmet assembly in an alternate configuration wherein the face shield is replaced by goggles.

The helmet assembly can also be used with goggles 54 rather than the face shield 38, as shown in FIG. 4B. The goggles include straps 55a, 55b that are connected to goggle clips to the back rail 52, as described below. The back rail is design so that the back rail retains an unreleased goggle clip. In this way one the goggle clip and accompanying strap may be retained in the back rail even when the other goggle clip is released. This provides that a goggle may be quickly deployed by reattaching the released goggle a clip.

The mandible 36 is operatively mounted to the helmet 34 by left and right attachment bases 62, 64. For simplicity, only the left attachment base 62 will be describes as the right side attachment base is mirror image identical across the vertical, front-to-back center plane of the assembly.

The mandible 36 is fastened to the attachment base by two screws 71, 72. The attachment base 62 engages the helmet as described below and is drawn rearward by a strap system 76. Only the left side strap system 76 will be described but it is to be understood that a right side strap system 78 would be mirror image identical across the vertical, front-to-back center plane of the assembly. The front rail or mount 44, side rails and the back or rear rail provide support as a system for the mandible.

The left side strap system includes a strap 82 that is connected by a loop 85 to the base 62 at one end and to a buckle member 87 at an opposite end. The buckle member 87 engages a buckle receiving slot 90 formed in the back rail 52.

Face Shield and Mounting Arrangement

The details of the face shield 38 and the mounting arrangement 42 are shown in FIGS. 7-15 and 25-31.

The face shield 38 comprises a lens 94 and a frame 95. The lens 94 fits within a groove 97 (FIG. 9) in the frame 95 and is fixed to the frame by three screws 96. For military use particularly, the face shield lens 94 should be ballistic impact resistant. It can be of a laminated construction and can feature a variable light transmission system. Such a variable light transmission system can incorporate an electronic control system to vary the light transmission according to the ambient light conditions.

Figure 13:
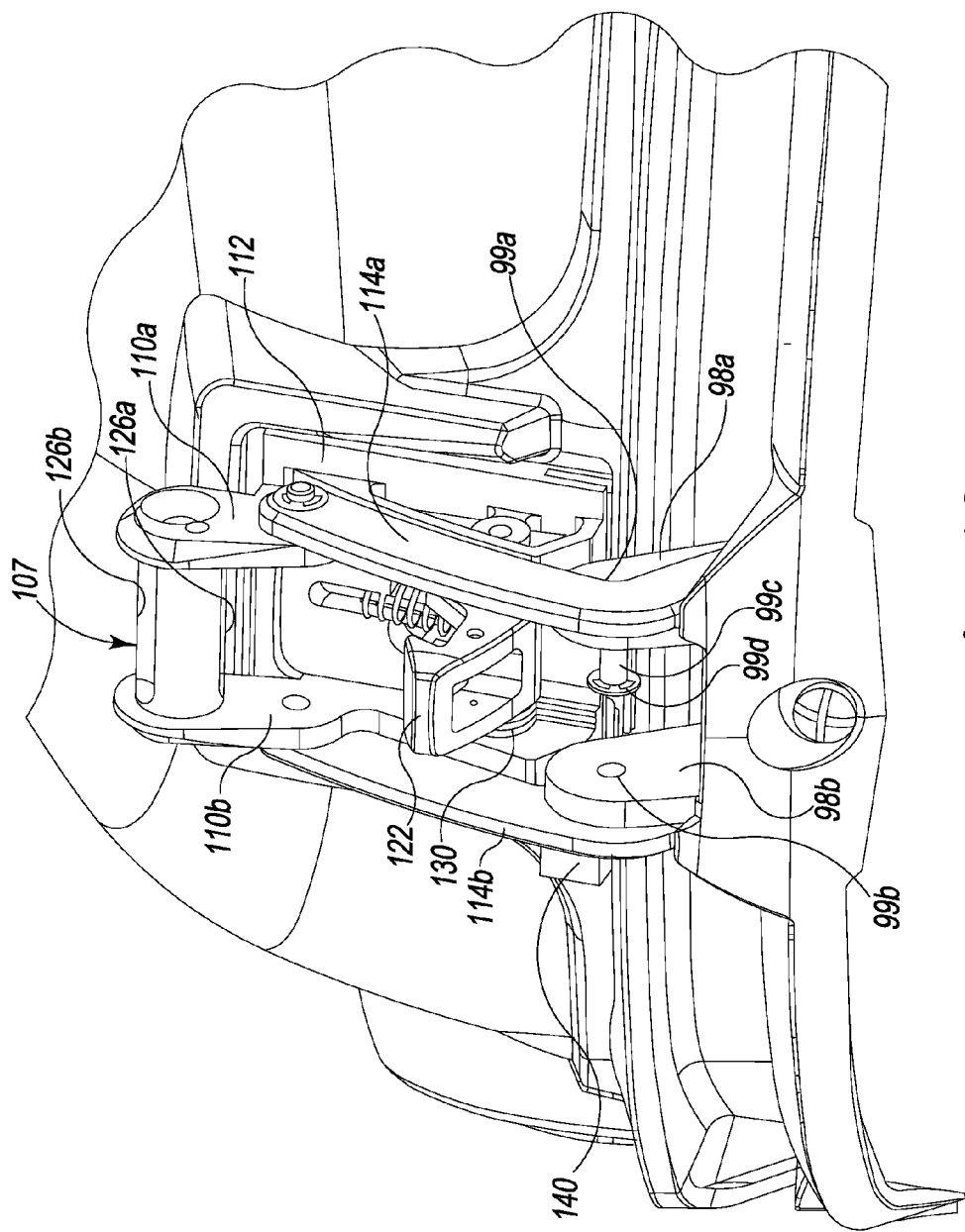
FIG. 13 is a front perspective view of the helmet assembly shown in FIG. 11 with portions removed for explanation of underlying features.
Figure 14:
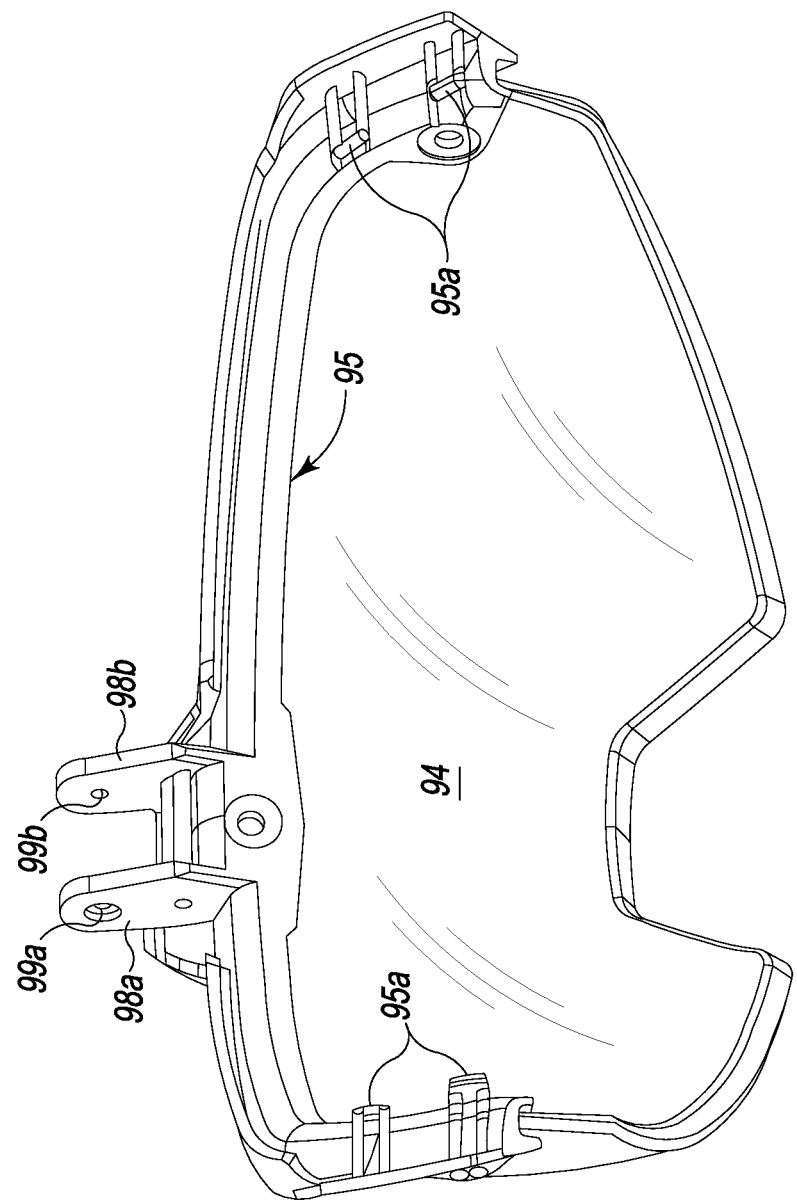
FIG. 14 is a rear perspective view of a face shield assembly shown in FIG. 1 with portions removed for explanation of underlying features.
Figure 15:
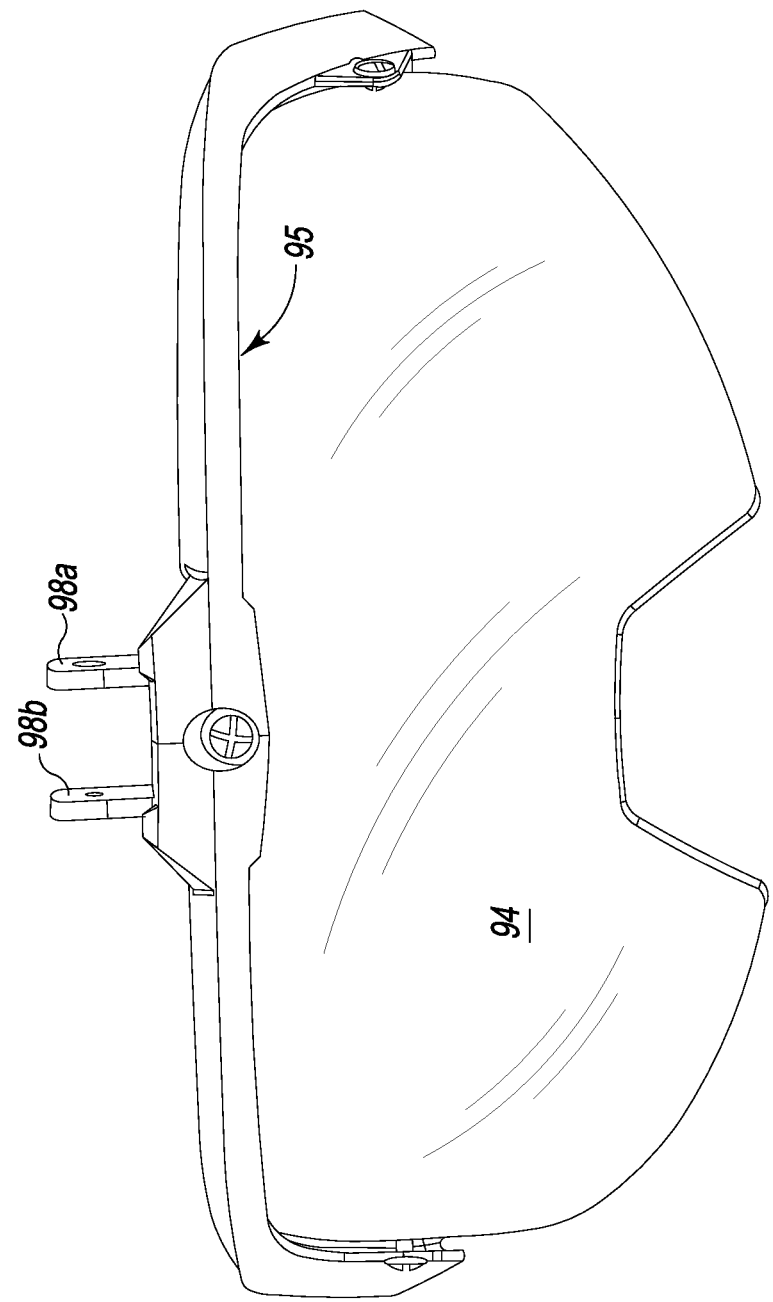
FIG. 15 is a front view of the face shield assembly shown in FIG. 14.

The face shield frame 95 is mounted to the mounting arrangement 42 via the shield mount 43. The shield mount 43 comprises parallel lugs 98a, 98b (FIG. 14). The lugs 98a, 98b include holes 99a, 99b for receiving pins 99c (only one shown, FIG. 13). Each pins 99c passes through a hole 101 (FIG. 12) formed through sides in a base portion 102 (FIG. 11) of a lever 100, and are held in place by the head of the pin and a circlip or lock washer 99d. The lever 100 includes a hole 103 (FIG. 11) through a distal end thereof. A pivot pin 107(Figure 12) is fit though the hole 103 and is fixed to sidewalls 110a, 110b (FIG. 13) which extend outward from a baseplate 112. L-shaped side links 114a, 114b are pinned at one end to the lugs 110a, 110b and at an opposite end to the lugs 98a, 98b.

Figure 11:
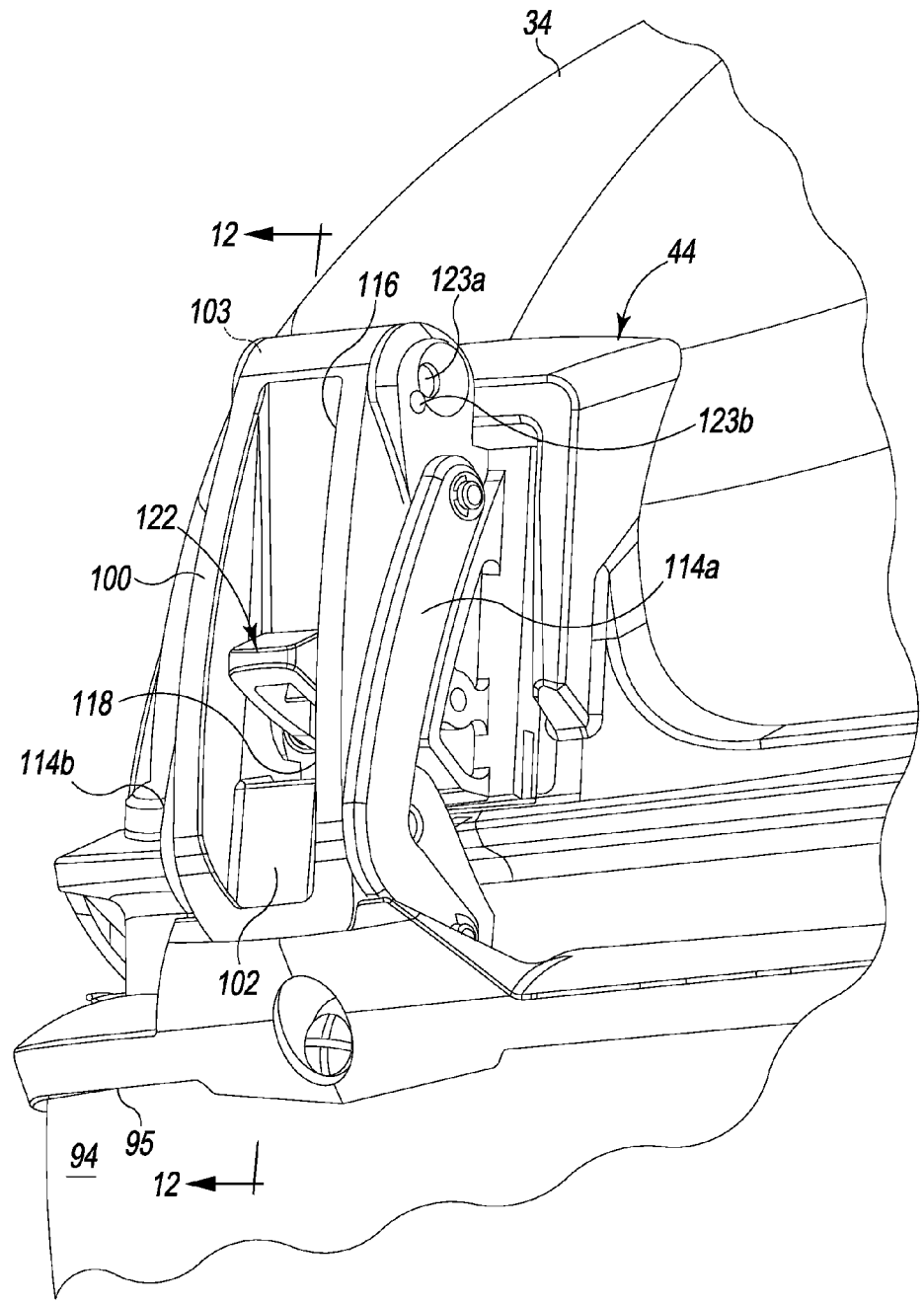
FIG. 11 is a front perspective view of the face shield portion shown in FIG. 10 with portions of the face shield added.
Figure 12:
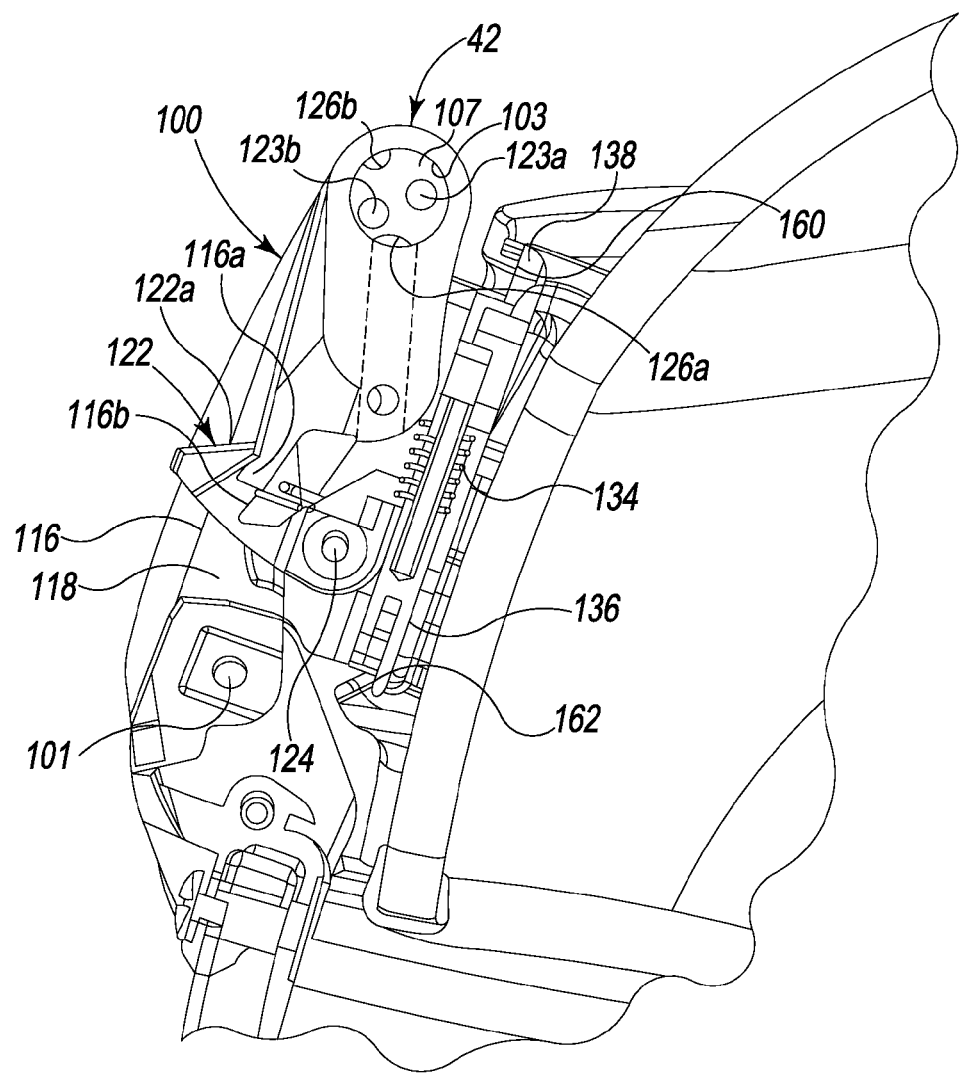
FIG. 12 is a sectional view taken generally along line 12-12 of FIG. 11.

The lever 100 has a central recess 116 (FIGS. 11 and 12). An opening 118 is provided within the central recess 116. A hook-shaped latch 122 (FIGS. 11, 12 and 13) has a base end pivotally attached to the sidewalls 110a, 110b by a through pin 124 (FIG. 12). The latch extends outwardly through the opening 118. The latch is biased to rotate upward to a latched position by a torsion spring 130 (FIG. 13). When the face shield is moved from the upward, non-use position down to the deployed position as shown in FIG. 1, the lever slides over the angular face 122a of the latch, which causes rotation of the latch downward as the hook end passes through the opening 118. Once the hook end of the latch is through the opening 118, the latch rebounds by the urging of the torsion spring to rotate upward and the hook end overlies a first recessed surface 116a of the lever adjacent to the opening 118. The latch 122 holds the lever 100 and the face shield 38 in the deployed position. The latch 122 can also be made to overlie a second recessed surface 116b to hold the face shield in a slightly open position with respect to the helmet and mandible. To move the face shield 38 to the slightly open position or the tilted up, non-use position, the hook end 122a of the latch must be depressed downward by a finger to release the latch from the lever and the face shield can be pivoted upward.

The pivot pin 107 is fixed to the sidewalls 110a, 110b by use of a threaded screw 123a and a spring pin 123b on each end of the pivot pin 107 for each sidewall 110a, 110b. The spring pin 123b is a pin having a portion that is larger than a hole in the pivot pin 107 such that is must be resiliently or deformable forced into the hole to hold the pivot pin 107 fixedly to the side walls 110a, 110b. The use of a spring pin prevents unscrewing of the screw 123a due to the repetitive raising and lowering of the face shield.

Figure 26:
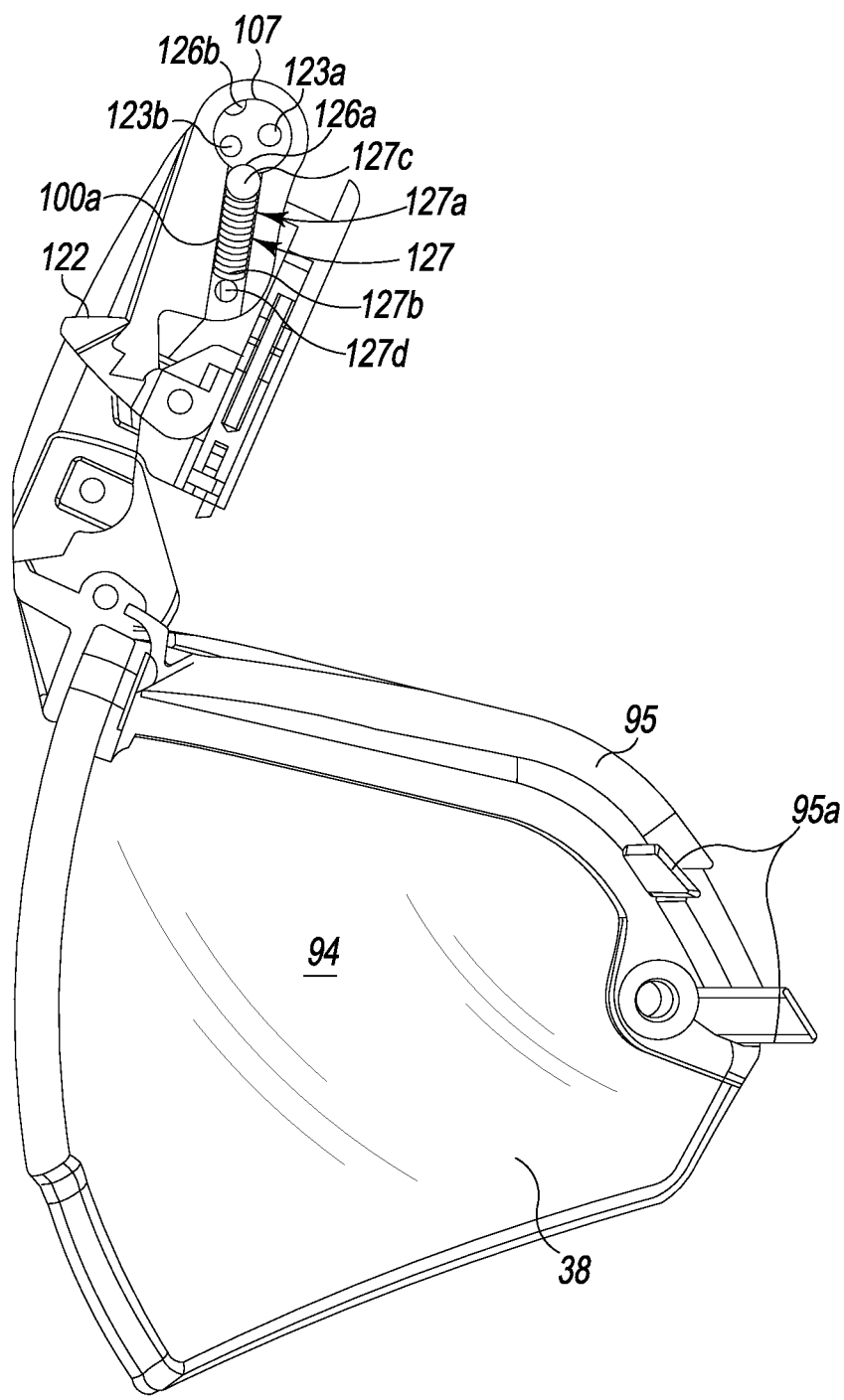
FIG. 26 is a sectional view taken generally along line 26-26 shown in FIG. 25.
Figure 26A:
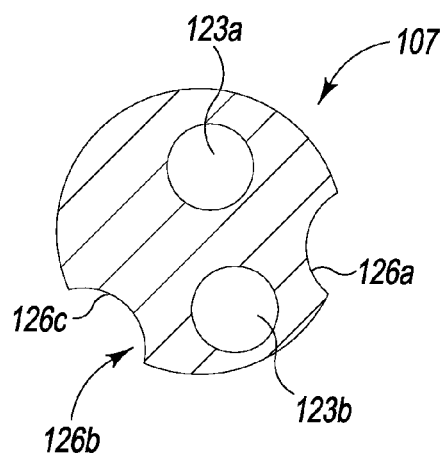
FIG. 26A is a sectional view of a first embodiment of a pivot pin.
Figure 28:
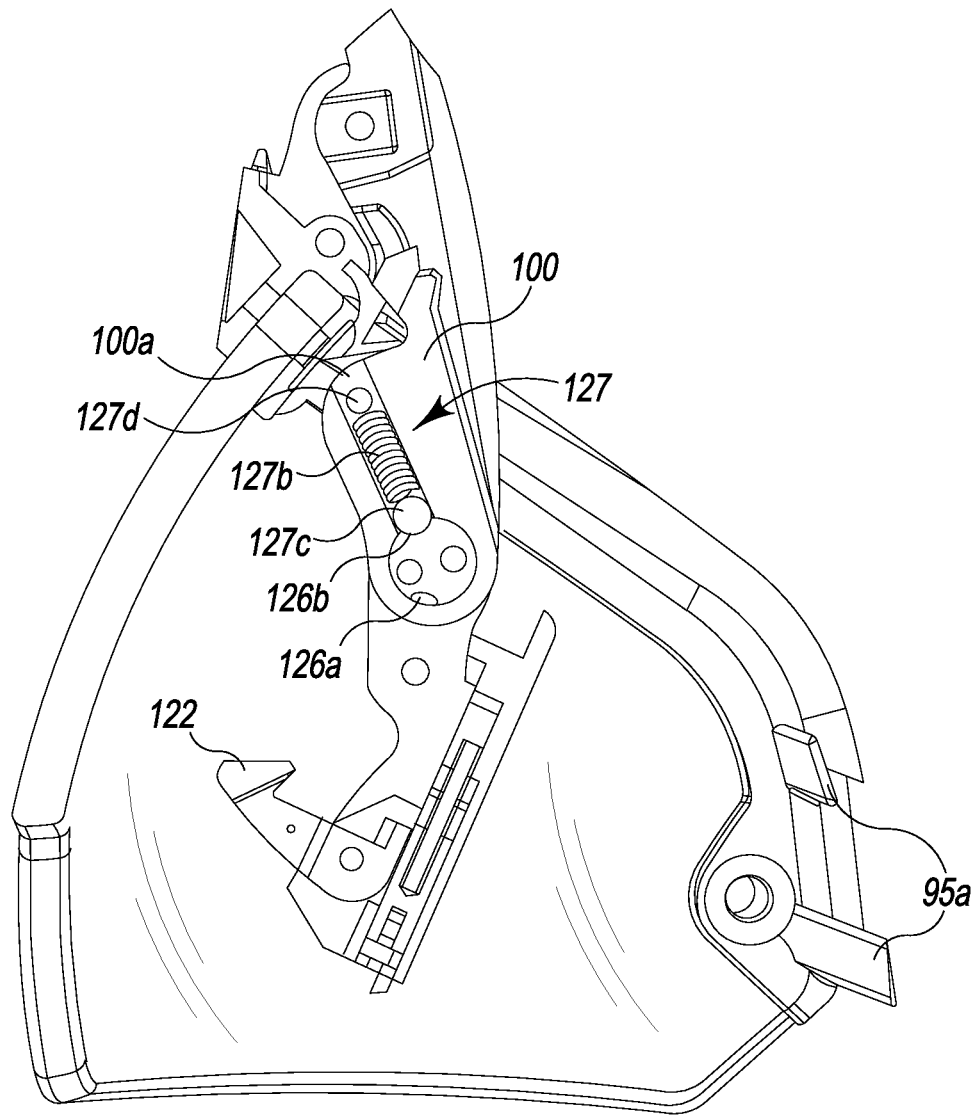
FIG. 28 is a sectional view taken generally along line 28-28 shown in FIG. 27.
Figure 29:
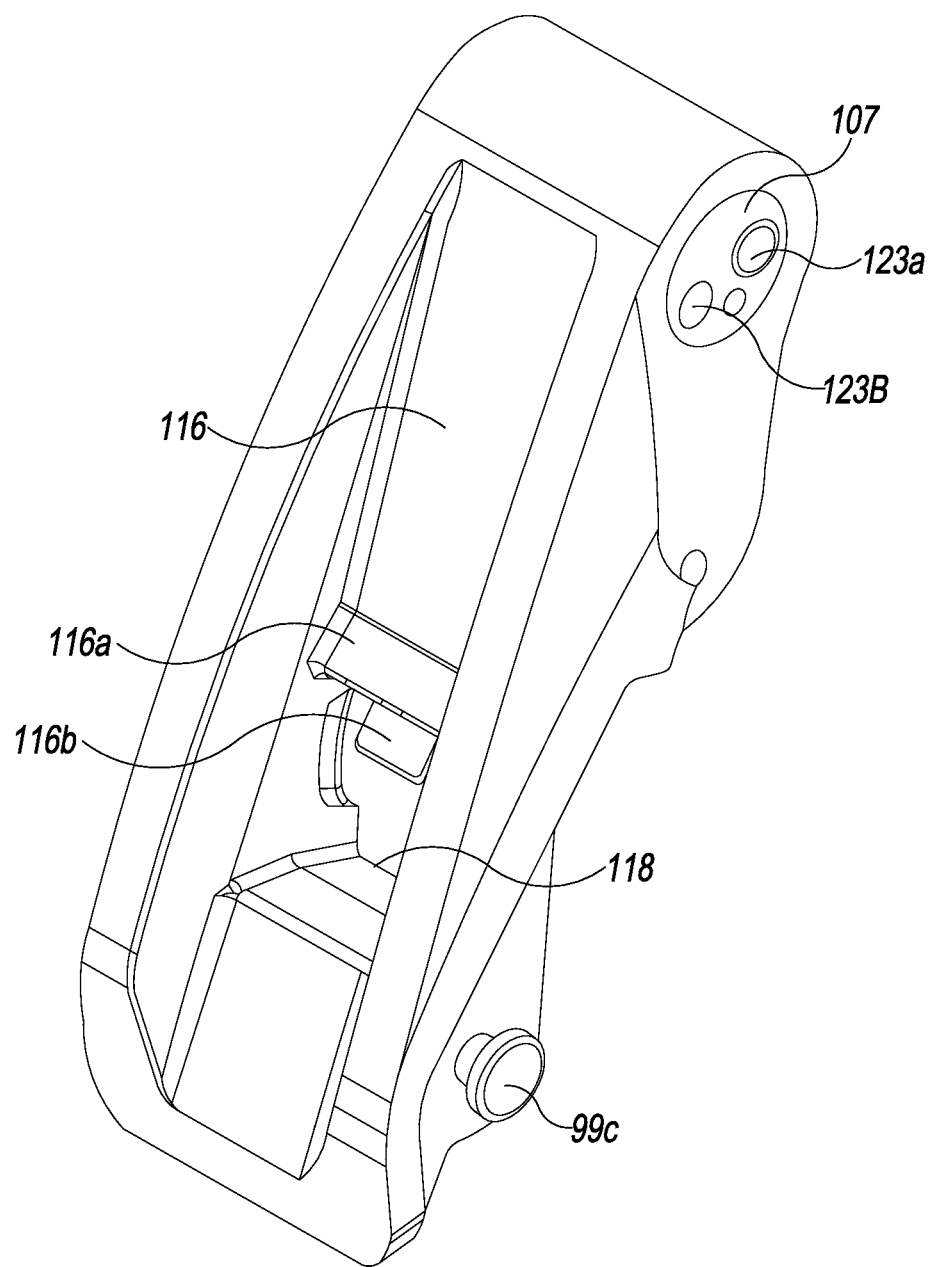
FIG. 29 is an enlarged, front perspective view of the lever for raising the face shield, shown in FIG. 1.
Figure 30:
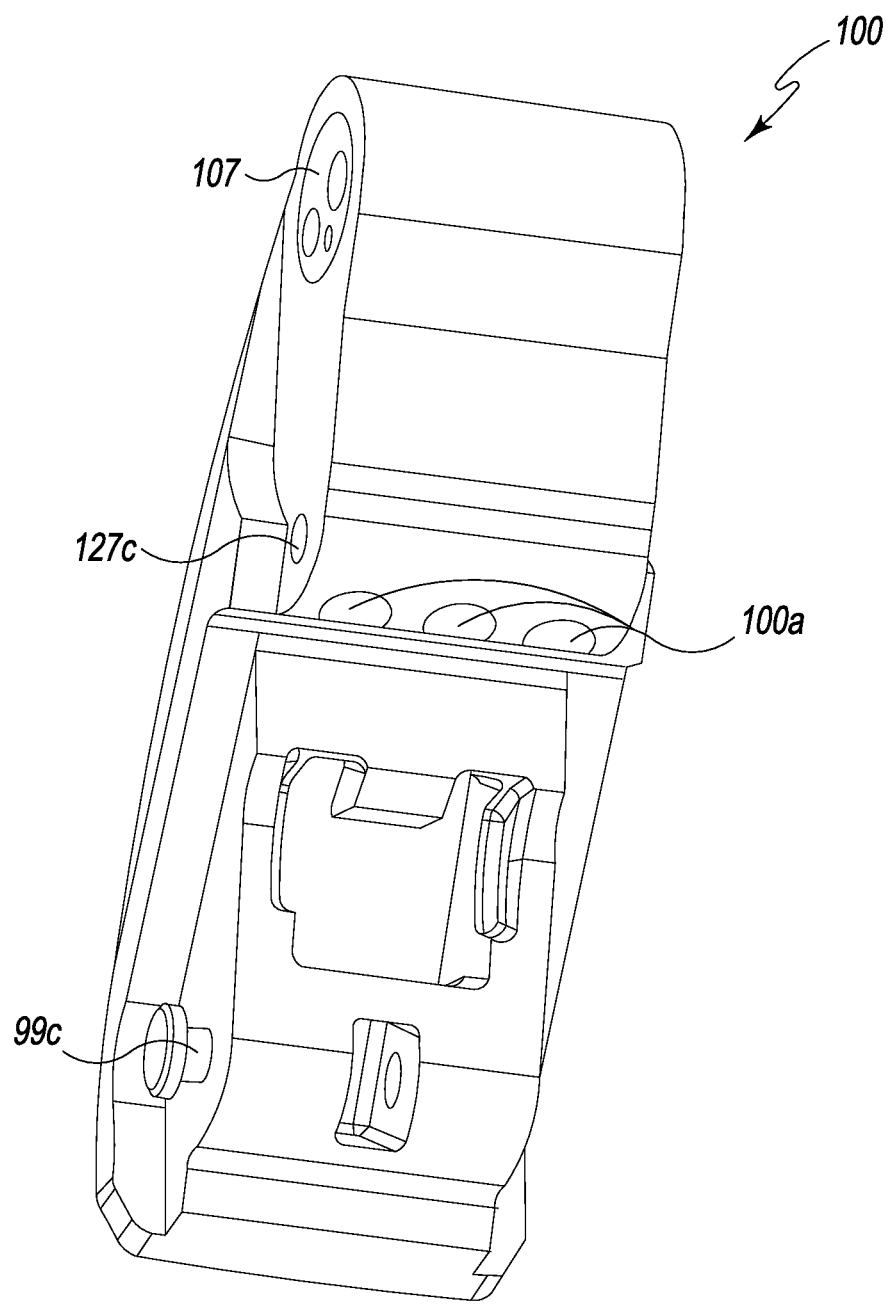
FIG. 30 is a rear perspective view of the lever shown in FIG. 29.
Figure 31:
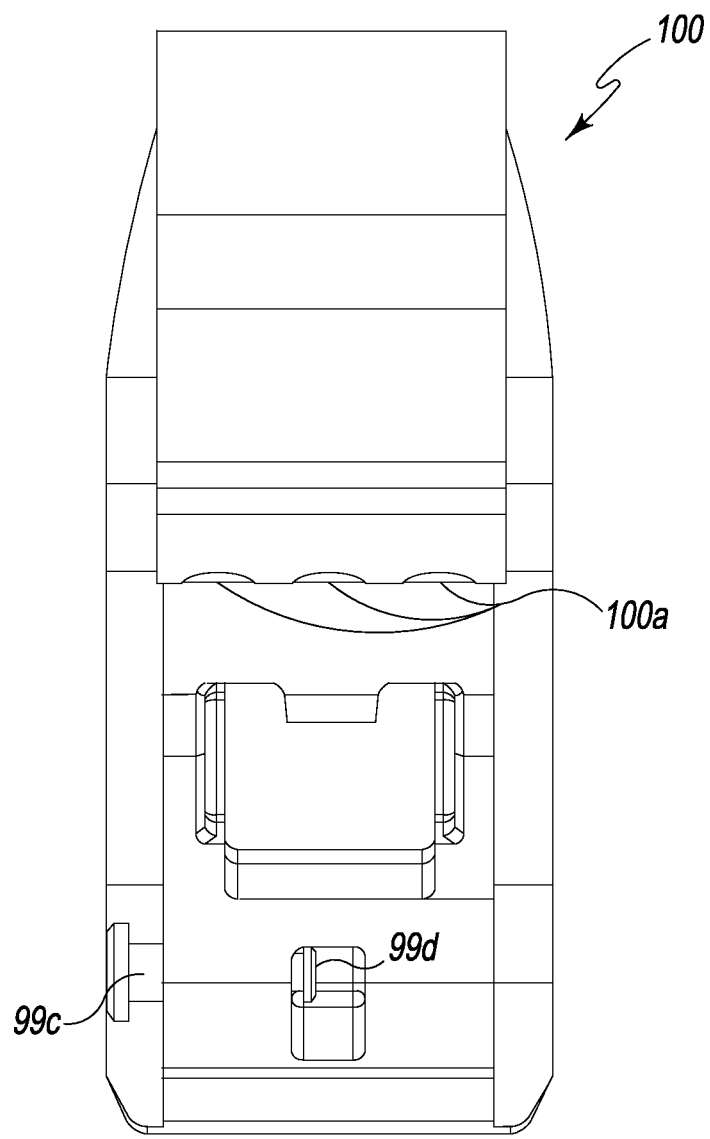
FIG. 31 is a rear view of the lever shown in FIG. 30.

The pivot pin 107 includes two recesses 126a, 126b at two spaced apart, circumferential positions. A detent mechanism 127 is shown in FIGS. 26 and 28. The detent mechanism includes three spring mechanisms 127a arranged in parallel. Each mechanism includes a compression spring 127b that urges a ball 127c toward the pivot pin 107. All the compression springs are braced by a backing through pin 127d. The compression spring 127b and the ball 127c are captured within a cylindrical passage 100a formed in the lever 100, by the backing pin 127d and the pivot pin 107. When installed, the springs 127b are pre-compressed between the backing pin 127d and the pivot pin 107 to the degree necessary to allow the balls 127c to be urged into the appropriate recess 126a, 126b when the recess presents itself to the balls 127c upon rotation of the lever 100 with respect to the pivot pin 107. The balls 127c fit into the recess 126a when the face shield is moved slightly away from the helmet and mandible to allow for increased ventilation (FIG. 2A), and fit into the recess 126b when the face shield is pivoted into the raised, non-use position (FIGS. 2B and 2C). The engagement between the detent mechanism 127 and either of the recesses 126a, 126b provides a resilient hold that can be overcome by force from the wearers hand to pivot the face shield.

Figure 26B:
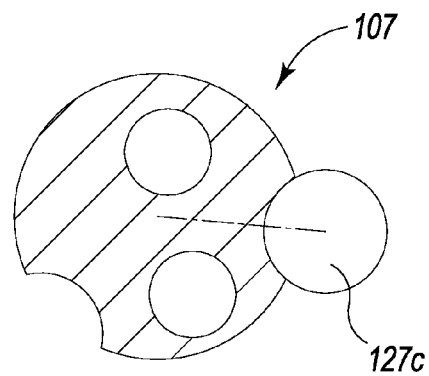
FIG. 26B is a sectional view of the first embodiment of a pivot pin with a ball.
Figure 26C:
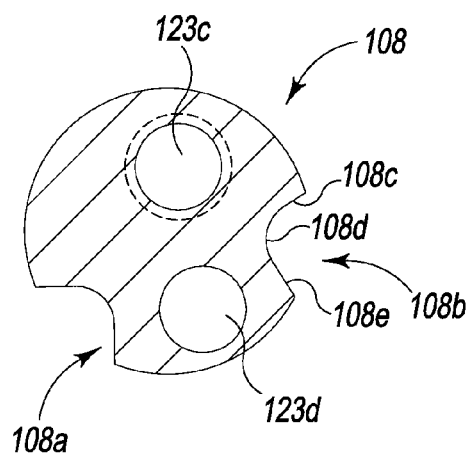
FIG. 26C is a sectional view of a second embodiment of a pivot pin.
Figure 26D:
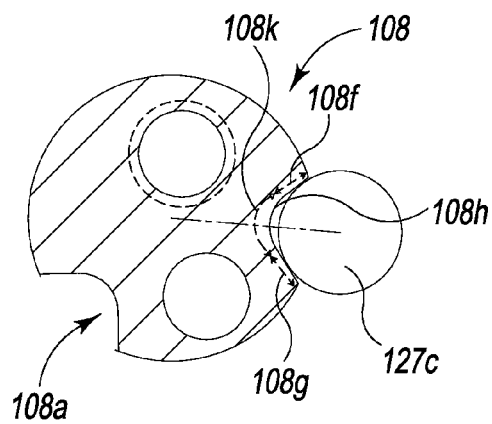
FIG. 26D is a sectional view of the second embodiment of a pivot pin with a ball.
Figure 27:
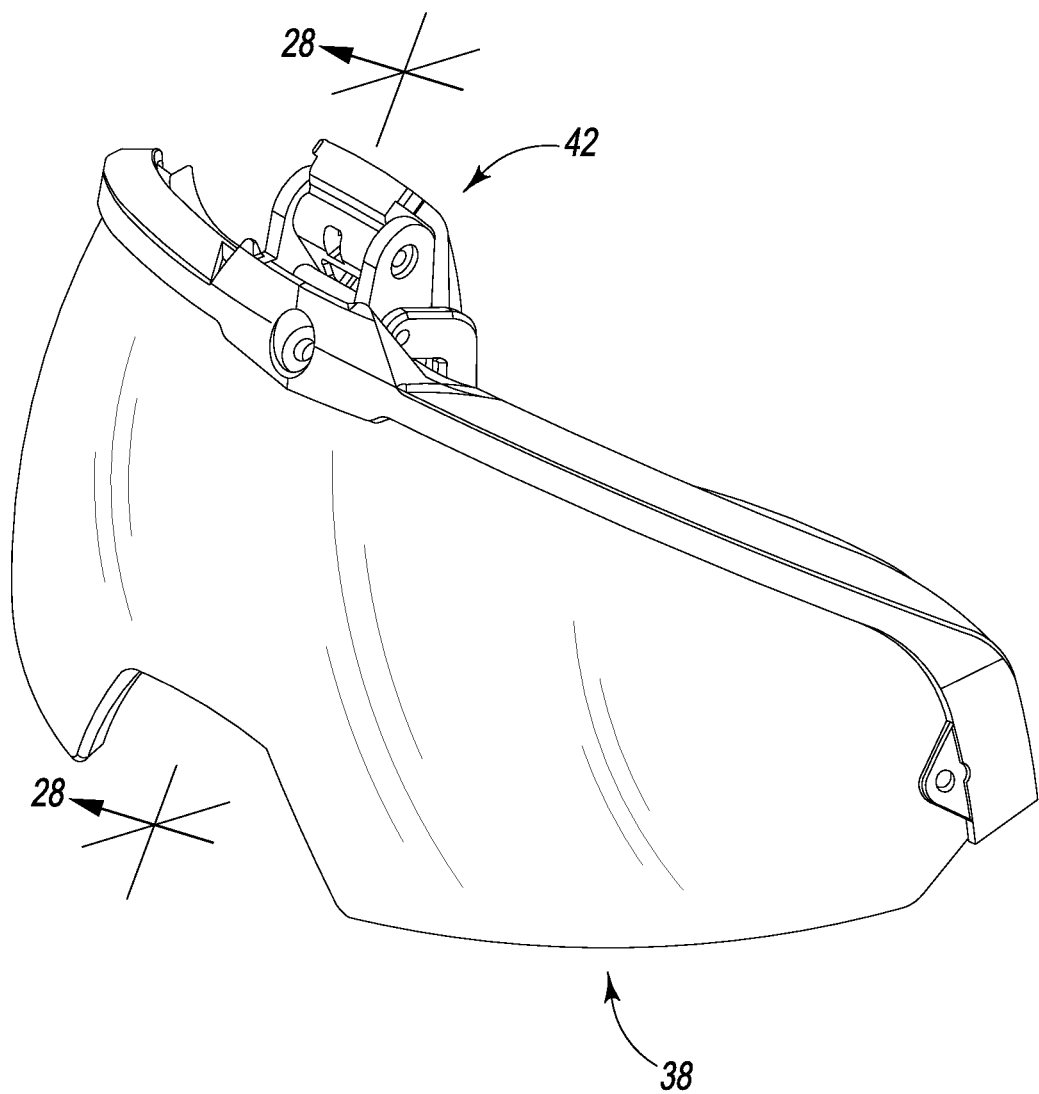
FIG. 27 is a perspective view of the face shield and mounting arrangement shown in FIG. 1 but shown in a raised, non-use position, such as shown in FIG. 2B.

FIGS. 26-26B show the first embodiment of the pivot pin 107. FIGS. 26C-26D show the second embodiment of the pivot pin 108. The recesses 126a, 126b of the first embodiment have a recess wall 126c that has a constant radius of curvature along its arc length. The first recess 126a is identical geometrically to the second recess 126b. As shown in FIG. 26B, the constant radius of curvature allow the ball 127c to fully contact the recess along the entire recess wall.

The second embodiment of the pivot pin 108 provides a recess wall 108c, 108d, 108e that does not have a constant radius of curvature along its length. In this configuration the ball 127c does not make contact with the recess along the entire recess wall as shown in FIG. 26D. The first recess 108a is identical geometrically to the second recess 108b. Referring to recess 108b, the recess has two flat walls 108c, 108e are connected by a curved section 108d. At last a portion of the flat walls 108c, 108e contact the ball 127c when it engages the recess 108b. This leaves a gap 108h between the ball and at least a portion of the curved portion 108d of the recess wall. The recess has full contact areas 108g, 108f and a non-contact area 108k therebetween. The arrangement prevents full contact between the ball and the entire length of the recess wall to reduce force needed to overcome the spring pressure transferred to the ball. As less force is needed with the second embodiment of the pivot pin 108 as compared to the first embodiment of the pivot pin 107, it is easier for a user to move the mounting arrangement 42 between the deployed position and the standby position. In one embodiment, the contact area 108g corresponds to the flat wall 108e, and the contact area 108f corresponds to the flat wall 108c, and the non-contact area 108k corresponds to the curved section 108d.

The face shield is operable with one hand to raise and lower the face shield. One finger depresses the latch 122 as the rest of the hand lifts the face shield to a raised position. The face shield can be lowered with one hand and the latch is self engaging.

Figure 9:
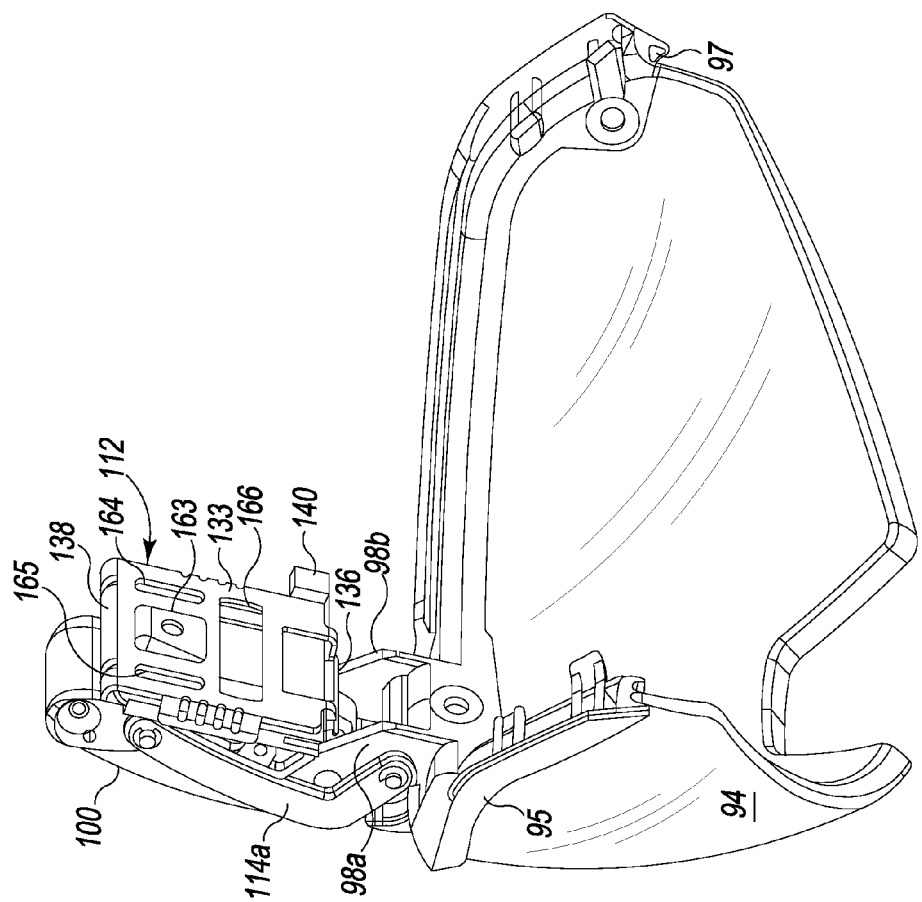
FIG. 9 is a rear perspective view of a face shield portion of the portion of the helmet assembly shown in FIG. 8.
Figure 13A:
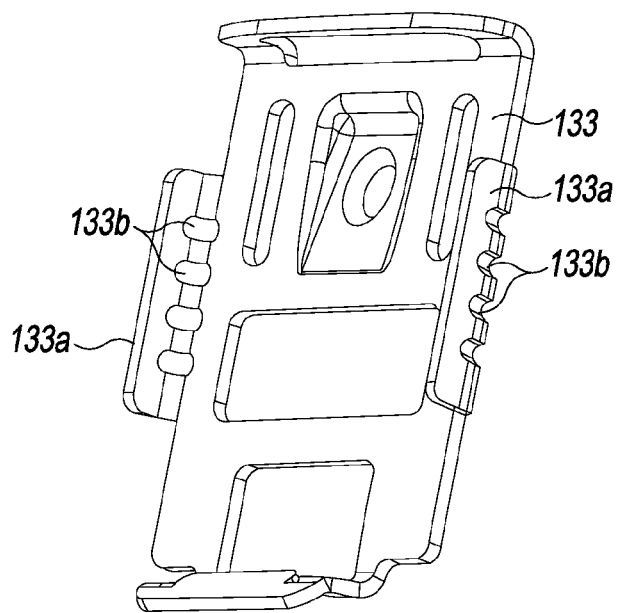
FIG. 13A is a perspective view of a portion of a mounting arrangement baseplate.
Figure 13B:
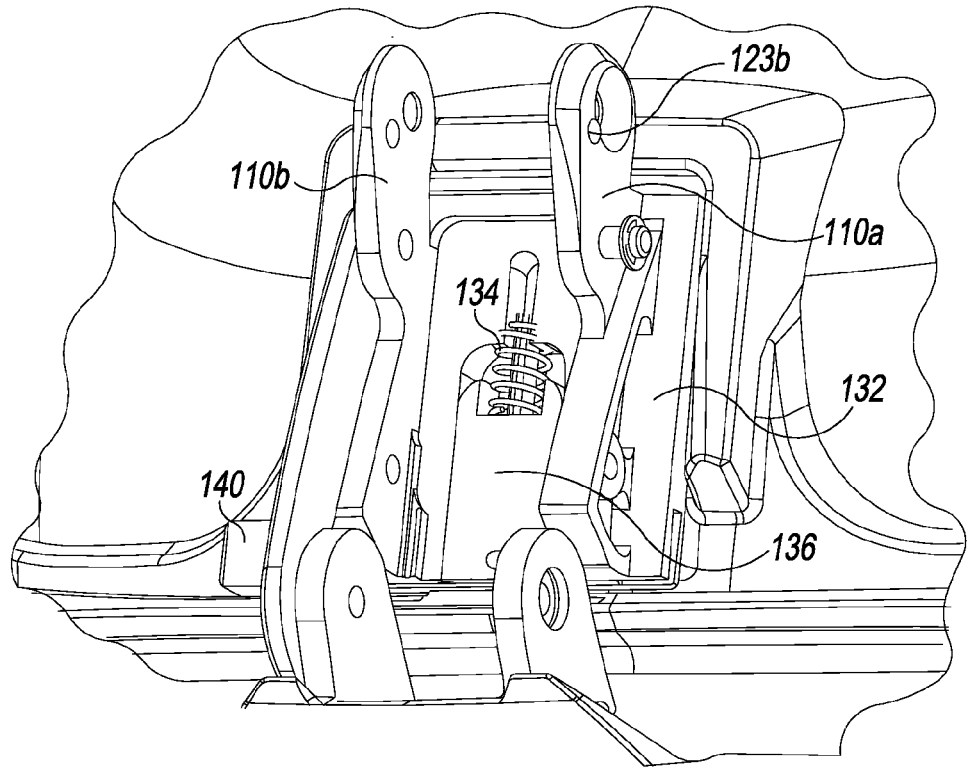
FIG. 13B is a perspective view of the mounting arrangement with portions removed for explanation of underlying features.
Figure 13C:
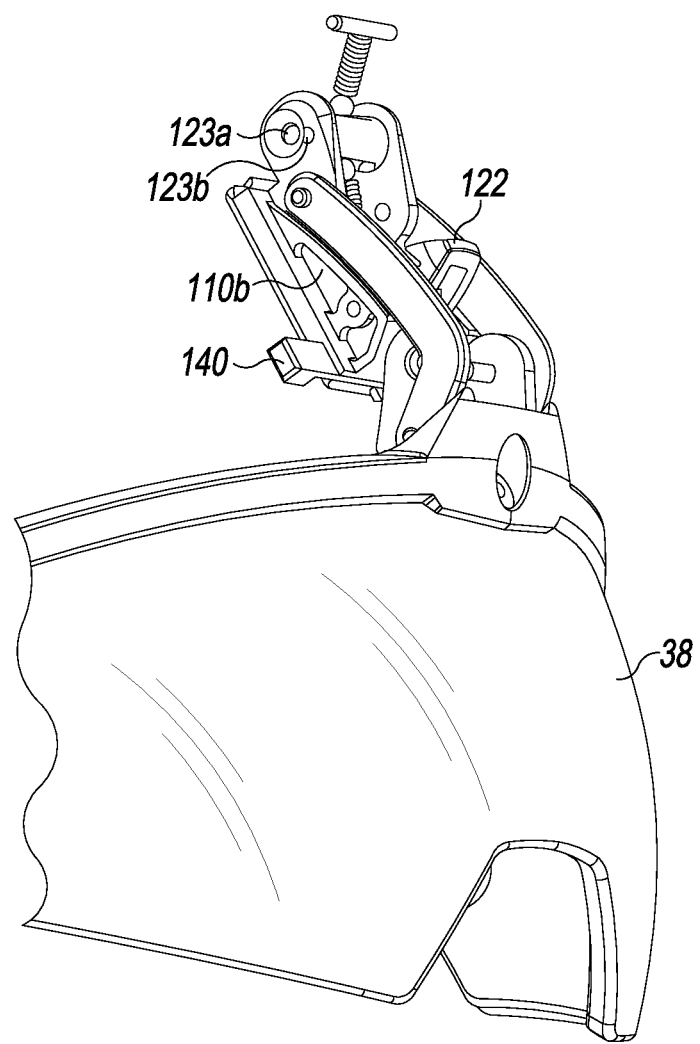
FIG. 13C is a perspective view of the mounting arrangement with portions removed for explanation of underlying features.

FIG. 13B shows the baseplate 112 includes a main body portion 132, a backing plate 133 (FIG. 13A), a spring 134, and a latching tongue 136. The main body portion 132 includes an upper edge 138 (FIGS. 9 and 12). The spring 134 biases the latching tongue 136 in a direction away from the upper edge 138. A handle 140 is connected to the latching tongue through a side clearance within the main body portion 132.

The backing plate 133 is a metal piece and includes side walls 133a having holes 133b which allow resin of the main body portion 132 to flow through the holes during overmolding to integrate the backing plate 133 with the main body portion 132.

The mount 44 includes a top front formation or central accessory mount 144 (FIG. 10) that includes an inverted U-shaped retainer portion 148, surface depressions 150, 152, 154, 156, 158, a top slot 160 and a bottom slot 162. The surface depressions 150-158 are sized and shaped to receive protrusions 163, 164, 165, 166 (FIG. 9) on a back of the baseplate 112.

The front mount is also compatible to mount a night vision appliance or night vision goggle.

Figure 10:
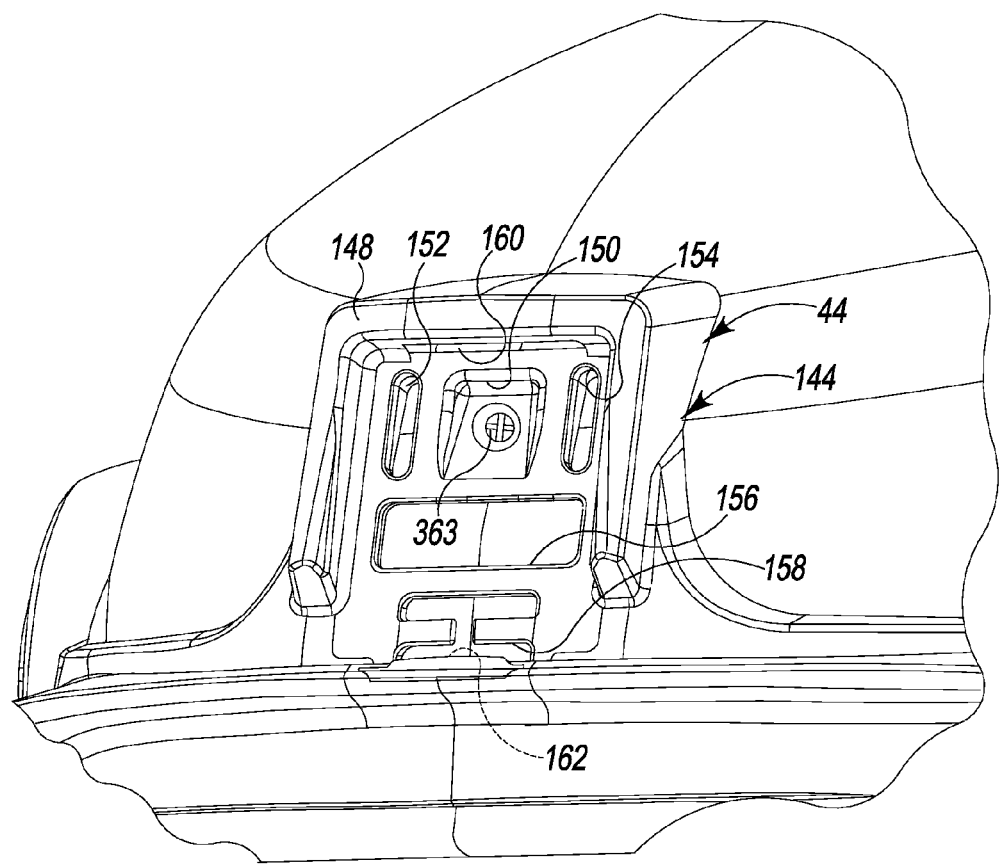
FIG. 10 is an enlarged, fragmentary front perspective view of the helmet assembly portion shown in FIG. 1 with portions removed for explanation of underlying features.

The front mount or front rail is mounted on the helmet using screws 360, 362 and a center screw 363 (FIG. 10).

To mount the baseplate 112 to and into the formation 144, the top edge 138 is fit into the top slot 160, the baseplate is fit snugly within the retainer portion 148 and the tongue 136 is retracted upwardly by force on the handle 140 until the tongue can be fit into the bottom slot 162.

Figure 6:
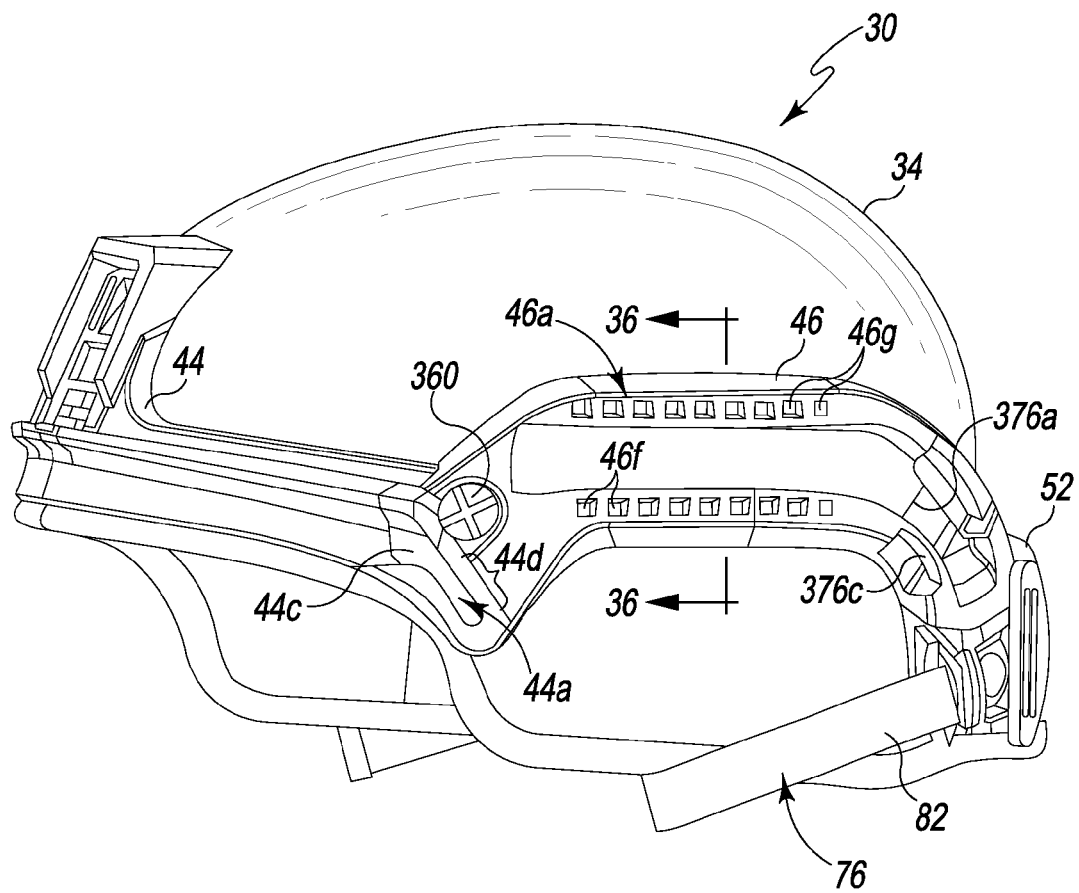
FIG. 6 is a left side perspective view of the helmet assembly shown in FIG. 1 with portions removed for explanation of underlying features.

The mount side channels 44a, 44b each include a wide mouth 44c and a narrow region 44d (FIG. 6). The side channels are used to mount mandible attachment bases as described below.

The face shield frame 95 can also incorporate a removable gasket to seal against the helmet brim to prevent ingress of fluids.

FIG. 14 shows the frame 95 includes frame supports 95a that brace against the helmet gasket 240 when the face shield is properly seated.

Figure 10D:
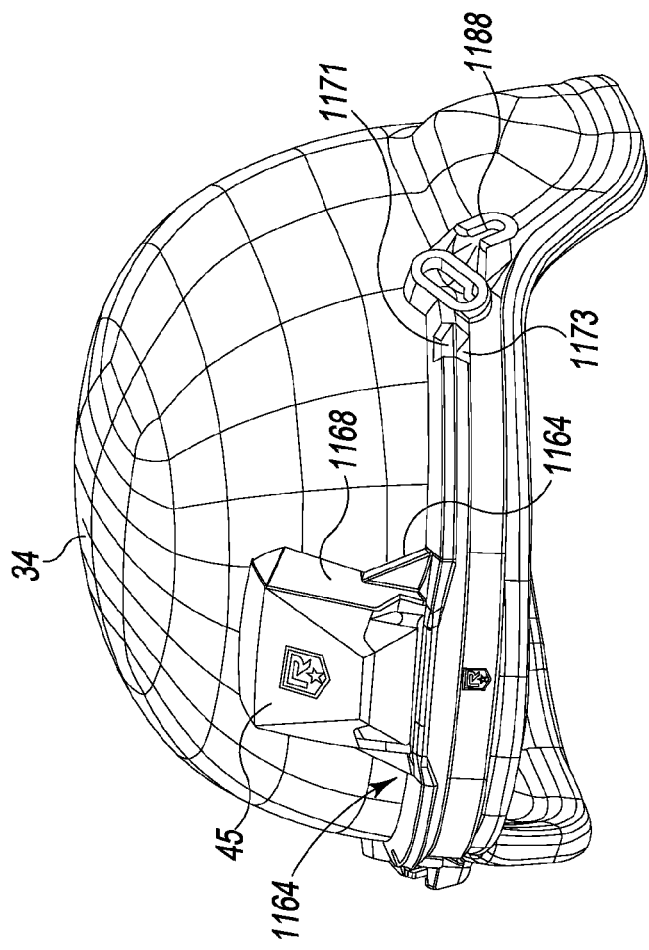
FIG. 10D is an enlarged, front perspective view of the helmet assembly portion with a second embodiment helmet mount.
Figure 10C:
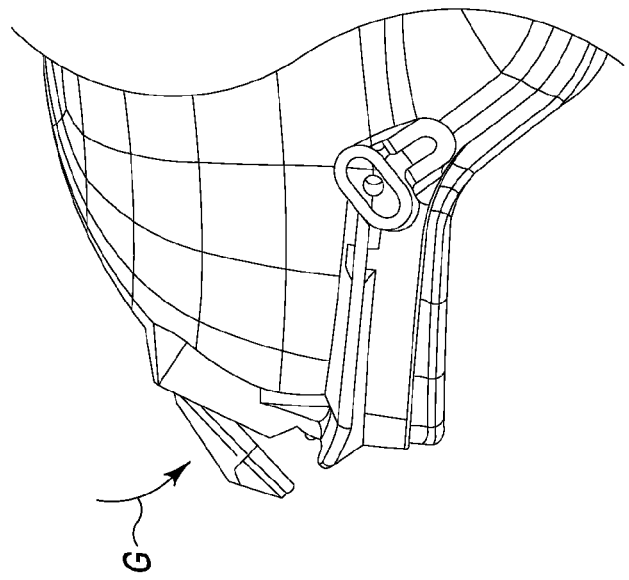
FIG. 10C is an enlarged, fragmentary side view of the helmet assembly portion with a second embodiment helmet mount.

A second embodiment of the mount or rail 1161 is shown in FIGS. 10B-10D. The mount 1161 includes a top front formation or central accessory mount 1164 (FIG. 10B-10D) that includes an inverted U-shaped retainer portion 1168, a surface depression 1166, lateral tabs 1168a, 1168b, a top slot 1160 and a bottom slot 1162. The U-shaped retainer portion 1168 has side walls 1168a, 1168b, 1168c. A recessed bottom edge 1168d is opposite the top side wall 1168b. The surface depression 1166 and lateral tabs 1168a, 1168b are sized and shaped to receive protrusions on a back of the an accessory (not shown).

The helmet assembly may include a central accessory mount cap 45 as shown in FIGS. 10A, 100, and 10D. The cap forms a concavity on a back side. The concavity is defined by side walls 45g, 45h, 45i, 45j, top walls 45c, 45d, 45e, 45f, an upper tab 45a, and a lower tab. The upper tab is positioned along the top side wall 45h and the bottom tab is positioned along the bottom side wall 45i. Opposite the top walls is an open side. The open side faces the top front formation or central accessory mount and is received thereon. The upper tab 45a engages the top slot 1160 of the central accessory mount. After the top tab is in location the cap is rotated downward in the direction G shown in FIG. 100 so that the bottom tab engages the bottom slot 1162 of the central accessory mount. When the cap is secured over the central accessory mount a storage area is provided between the cap and the central accessory mount. The cap 45 may also be used on the central accessory mount 144 of the first embodiment of the mount 44.

Figure 71:
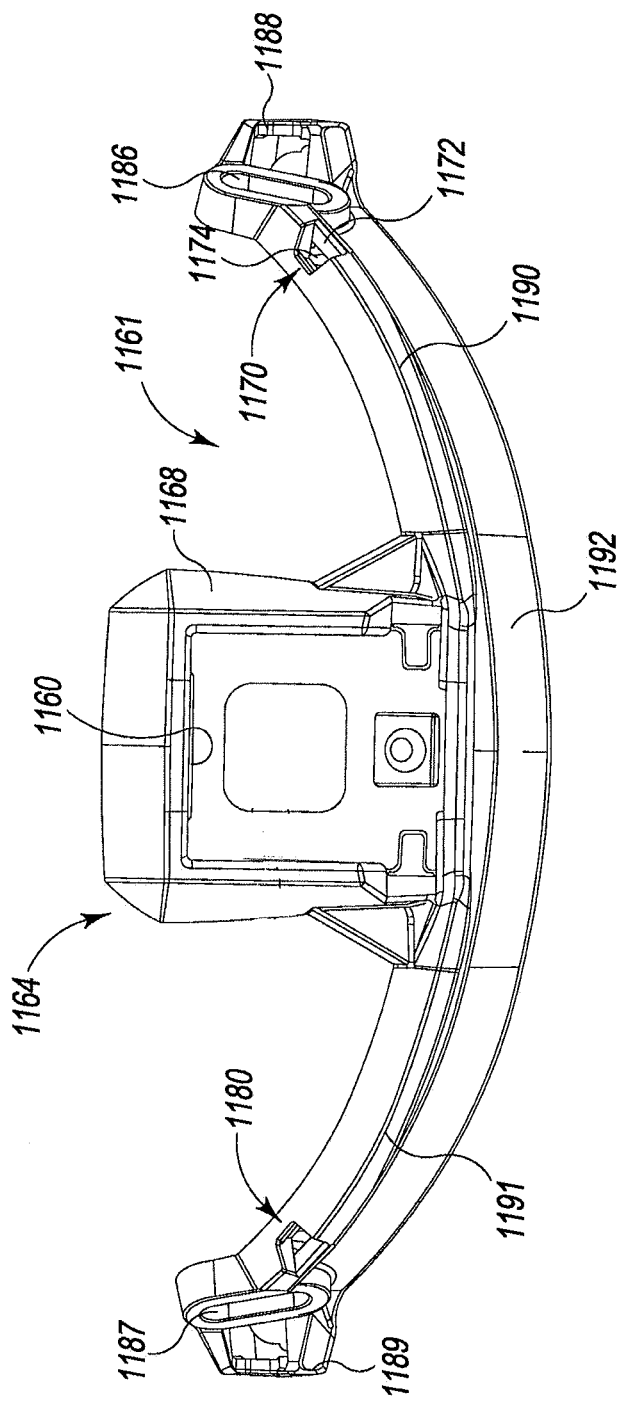
FIG. 71 is a front view of a mount.

A second embodiment mount or rail 1161 is shown in FIG. 71. The rail includes two upper rail segments 1190, 1191 that flank the top front formation or central accessory mount 1164. The rail also includes the bottom rail portion 1192 that extends under the upper rail segments 1190, 1191 and under the top front formation or central accessory mount 1164. Mounting apertures 1186, 1187 are located at opposed end areas of the rail. The mounting apertures allow that mount 1161 to be connected to the front area of a helmet as shown in FIG. 10D. Also, mandible support slots 1188, 1189 are provided at the opposite ends of the rail and adjacent to the mounting apertures 1186 and 1187 respectively. Adjacent the mounting apertures on a side opposite the mandible support slots, are anchor receivers 1170, 1180. The right anchor receiver 1180 is mirror image identical to the left anchor receiver across the vertical front to back mid-plane of the helmet system as shown in FIG. 71.

Figure 72:
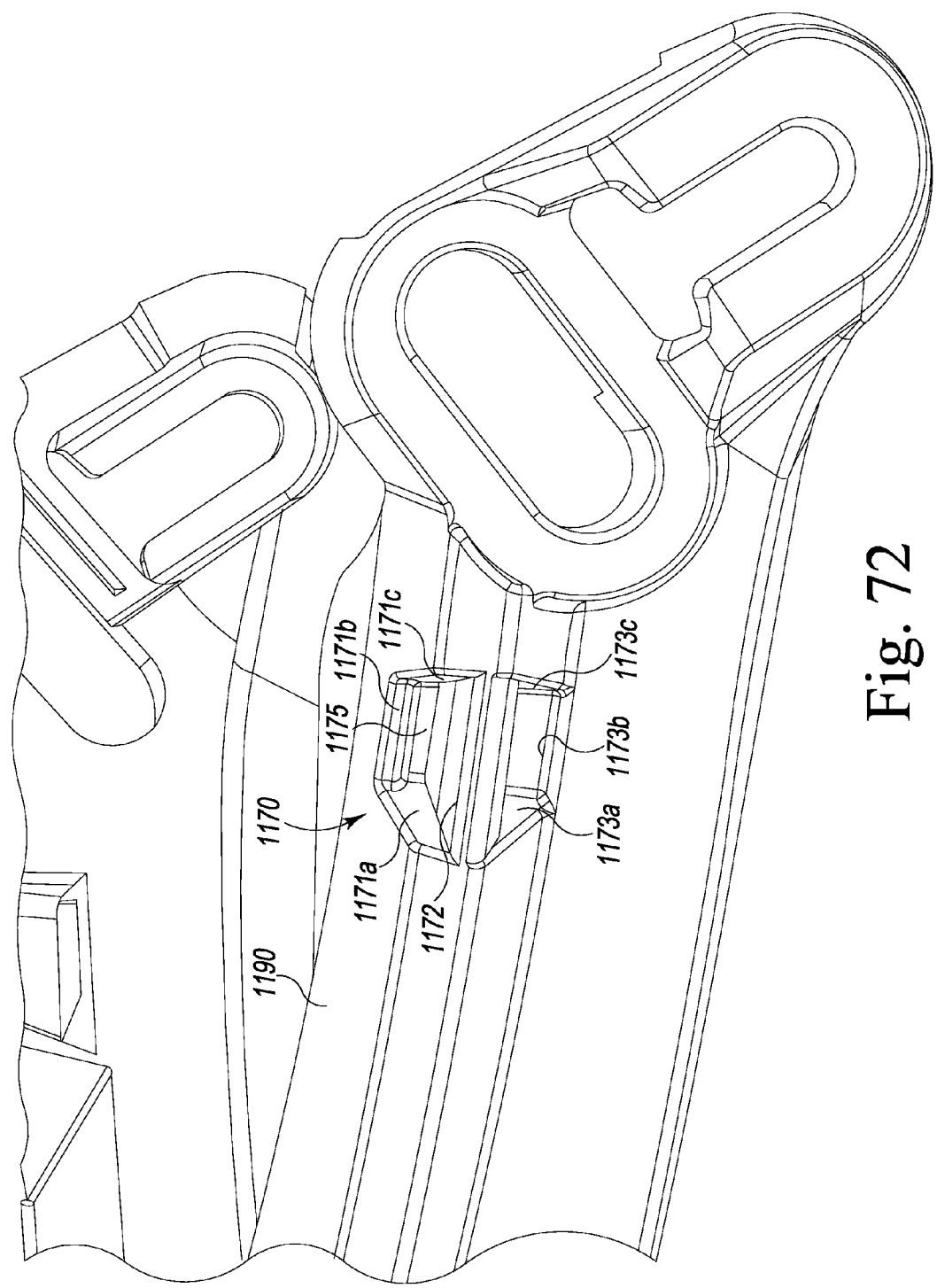
FIG. 72 is a side view of an anchor receiver.

The anchor receiver has a top recess, 1171, a bottom recess 1173, a anchor bar 1172, a vertical passage 1174, and a horizontal passage 1175. As shown in FIGS. 71 and 72, the anchor bar separates the top and bottom recesses. The recesses have a back wall 1171b, 1173b, a first side wall 1171a, 1173a, a opposite second side wall 1171 c, 1173c. The vertical passage 1174 extends behind the anchor bar 1172 vertically through to connect the top and bottom recesses. The horizontal recess extends from the back side of the anchor bar 1172 out the back of the rail portion 1190.

A night vision device when mounted to the central accessory mount 1164 may be stabilized by connecting one or more shock or elastic cords from the night vision device to the anchor receivers 1170, 1180. The anchor receivers may be used to anchor a visor or any other accessory that is mounted to the central accessory mount 1164. The front anchor receivers are advantageous for, amoung other things, stabilizing the mounted accessory when the front mount 1161 is used alone on a helmet, and side and or back rails are not used.

Visor System

In one embodiment, the face shield 38 is a visor system 38. In one embodiment, the visor system comprises the lens 94 and a frame 95. In another embodiment, the visor system comprises the lens 94, the frame 95, the mounting arrangement 42, and a helmet mount 44.

Figure 61:
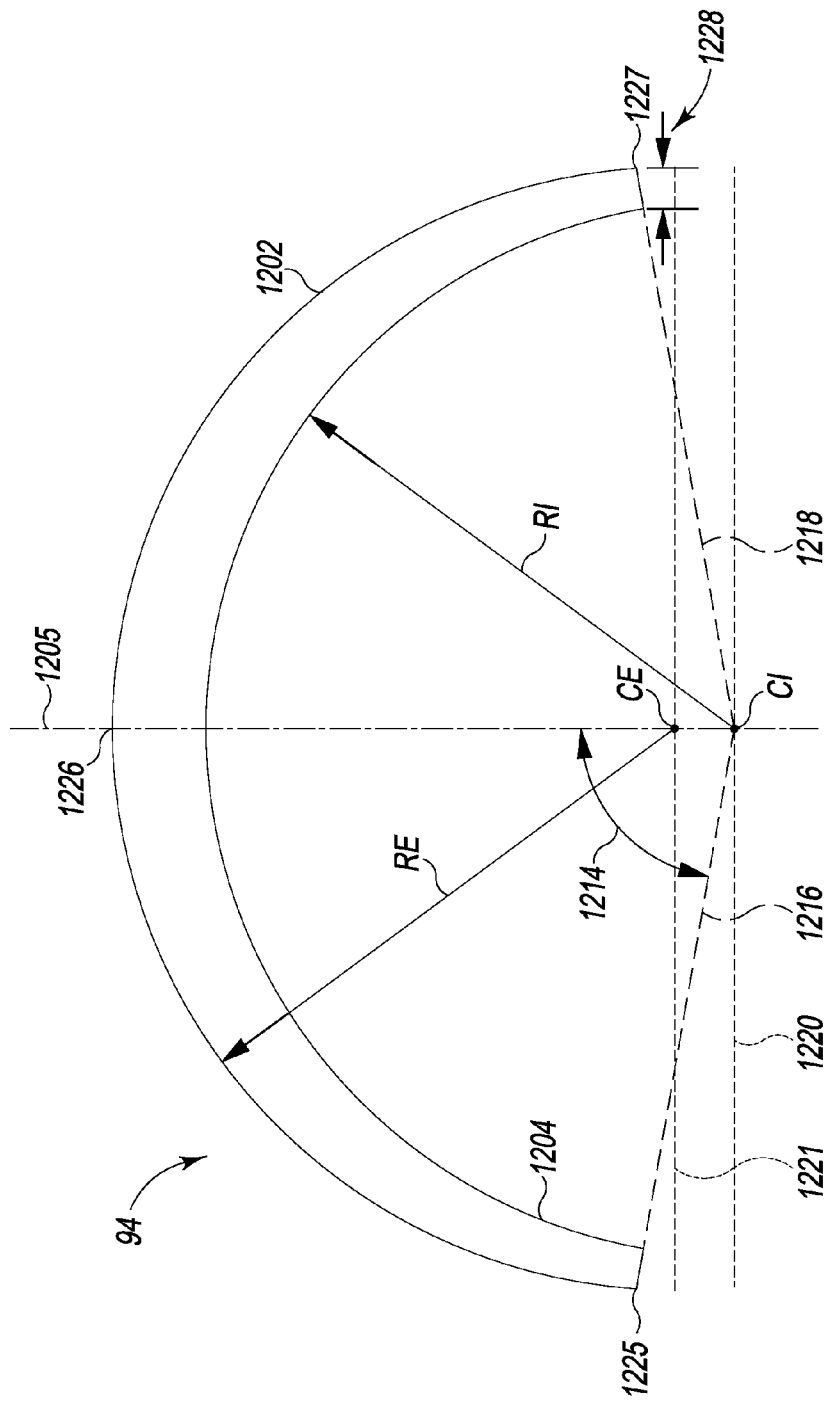
FIG. 61 is a horizontal cross-sectional view of the lens taken along line 61-61 of FIG. 60 showing tapering thickness of the lens.
Figure 62:
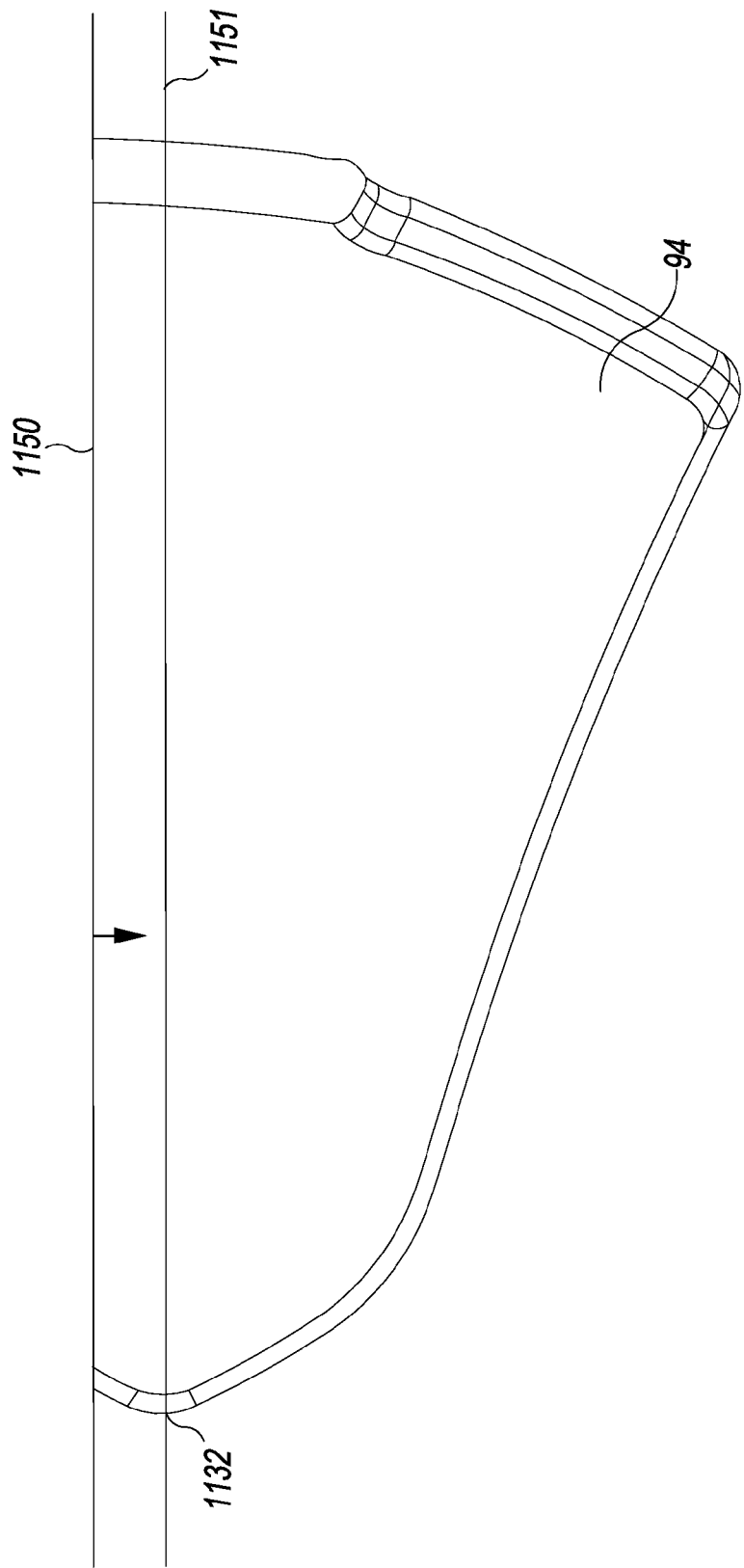
FIG. 62 is a vertical cross-sectional view of the lens taken along line 62-62 of FIG. 60.
Figure 63:
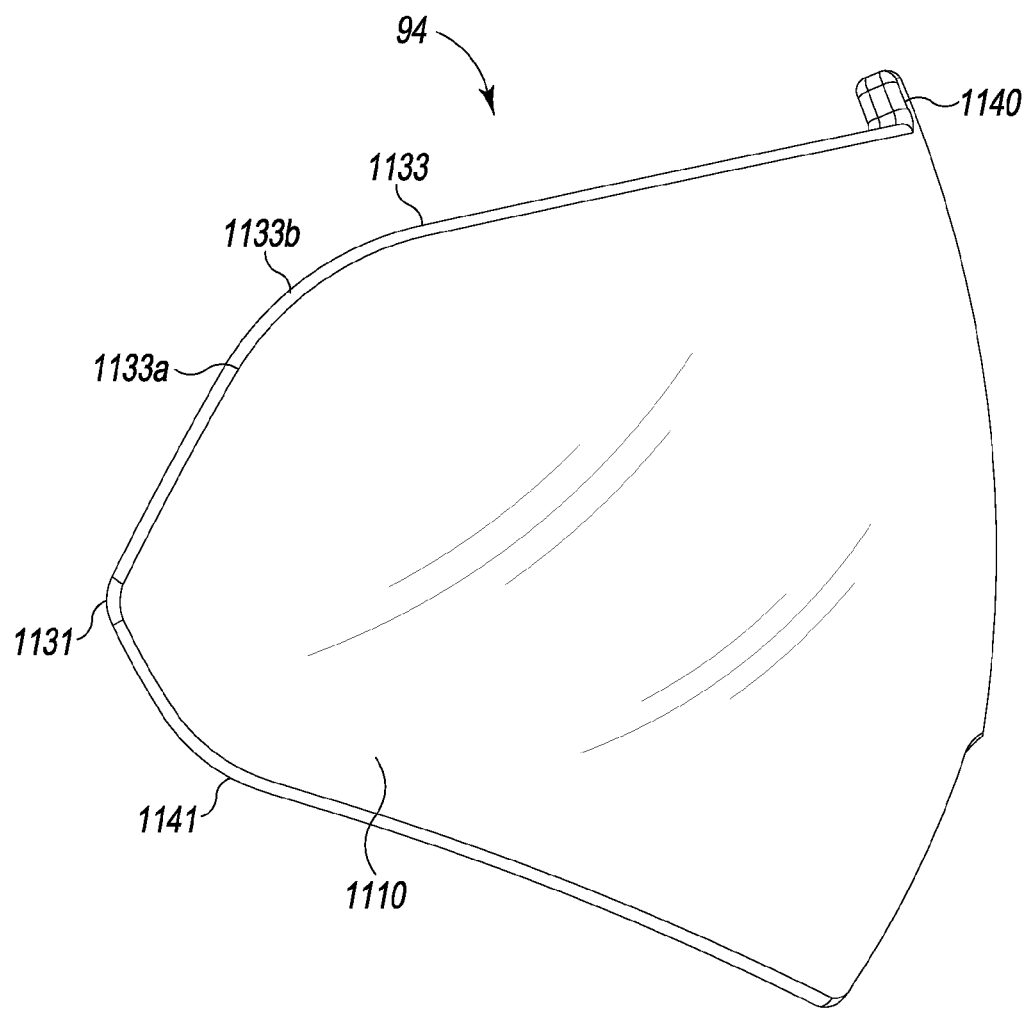
FIG. 63 is side view of the lens of FIG. 59.

Referring to FIGS. 59-63, in one embodiment the lens 94 has a top edge 1136 that slopes downward from a top center point to first right and left curve points 1134, 1133. At the first curve points the top edge begins to slope more aggressively toward second right and left curve points 1134*a*, 1133*a*, and more aggressively toward right and left side edge points 1132, 1131. On the left side, between the first curve point 1133 and second curve point 1133*a* is a top side beginning point 1133*b*. The left side of the lens extends from the side beginning point 1133*b* to the outermost point of the side edge 1131 to a bottom side beginning point 1141 (FIG. 63).

As is shown in FIG. 62, the plane of sight 1150 along the vertical extent of the lens is displaced above the plane 1151 intersecting the side edge points 1132, 1131. The plane of sight is the straight-ahead-view plane of sight when the line of view is normal to the internal surface of the lens. In one embodiment, the plane of sight 1150 is located at the vertical mid-point on a lens blank that has not been cut into a particular shape.

A portion of the bottom edge extends from the bottom side beginning point 1141 along an outer bottom edge 1153 of the lens to a nose cutout portion 1144. The bounds of the nose cutout portion 1144 are defined by opposite upward angled portions 1127*a*, 1129*a* that are connected by a top horizontal nose cutout portion 1121 a. The upward angled portions 1127*a*, 1129*a* meet the outer bottom edge portions 1153, 1154 at bottom nose cutout corners 1127, 1129, respectively. The upward angled portions 1127*a*, 1129*a* meet the top horizontal nose cutout border 1121 a at top nose cutout corners 1123, 1125, respectively. The nose cutout border 1121*a* has a midpoint 1121 that is coincident with the vertical midplane 120 of the lens 94.

The vertical midplane 120 intersects a mounting hole 1138 that is configured to receive screw 96. The mounting hole is at least partially located in a mounting protruding portion or tab 1140 of the lens. The mounting tab 1140 extends above the left and right top edges of the lens 1128, 1130. The mounting tab is configured to be received in the frame 95 and to securely engage the visor therewith.

The lens 94 has a thickness defined between the inner surface 1204 and the outer surface 1202. In one embodiment, the lens is a tapering thickness lens. FIG. 61 shows a cross sectional view taken along line 61-61 of FIG. 60, at the plane of sight. The outer surface 1202 is convex and the inner surface 1204 is concave. The outer surface 1202 has an outer surface radius of curvature RE originating at outer centerpoint of curvature CE. The inner surface 1204 has an inner surface radius of curvature RI originating at inner centerpoint of curvature CI. The surfaces 1202 and 1204 have different radii of curvatures where the centerpoints of those radii are shifted relative to each other. In this embodiment, the inner radius RI is shorter than the outer radius RE. The thickness of the lens tapers from a centerpoint 1226 towards opposite left and right endpoints 1225, 1227. The thickness of the lens is greatest at the midpoint to 1226. In one embodiment, the thickness of the lens is the smallest at the endpoints to 1225, 1227. The thickness of the lens tapers at a constant rate from the midpoint 1226 towards opposite endpoints 1225, 1227.

The arc of the outer surface and the arc of the inner surface do not have a common centerpoint. In one embodiment, the maximum arc 1214 between a centerline 1205 and a reference ray 1216 extending from the inner centerpoint CI to the outer edge 1225 is 80 degrees. Therefore in that embodiment, the arc of the lens extends for 160 degrees about inner centerpoint CI. In one embodiment, the thickness of the lens at the midpoint 1226 is greater than the distance between the centers of curvature CI and CE.

According to one embodiment, the thickness of the lens tapers at a substantially constant rate from the thickest portion of the lens to the edges. The lens thickness may vary smoothly from the maximum thickness at the center to the minimum thickness at or near the edges. The radius RI may not be constant at the opposite left and right side ends of the lens, such as beyond 75 degrees from the center line 1205. This variation area provides a minimum thickness at the edge. Moreover, this variation from the constant radius RI at the edges is allowable in some cases. It may be less important that the radius of curvature be constant at these end areas because this area is in the detection area of view of a user and beyond the focusable field of view of the user. However, it is important to maintain a minimum thickness at the edges 1131, 1132 to provide sufficient ballistic protection and impact protection.

Figure 59:
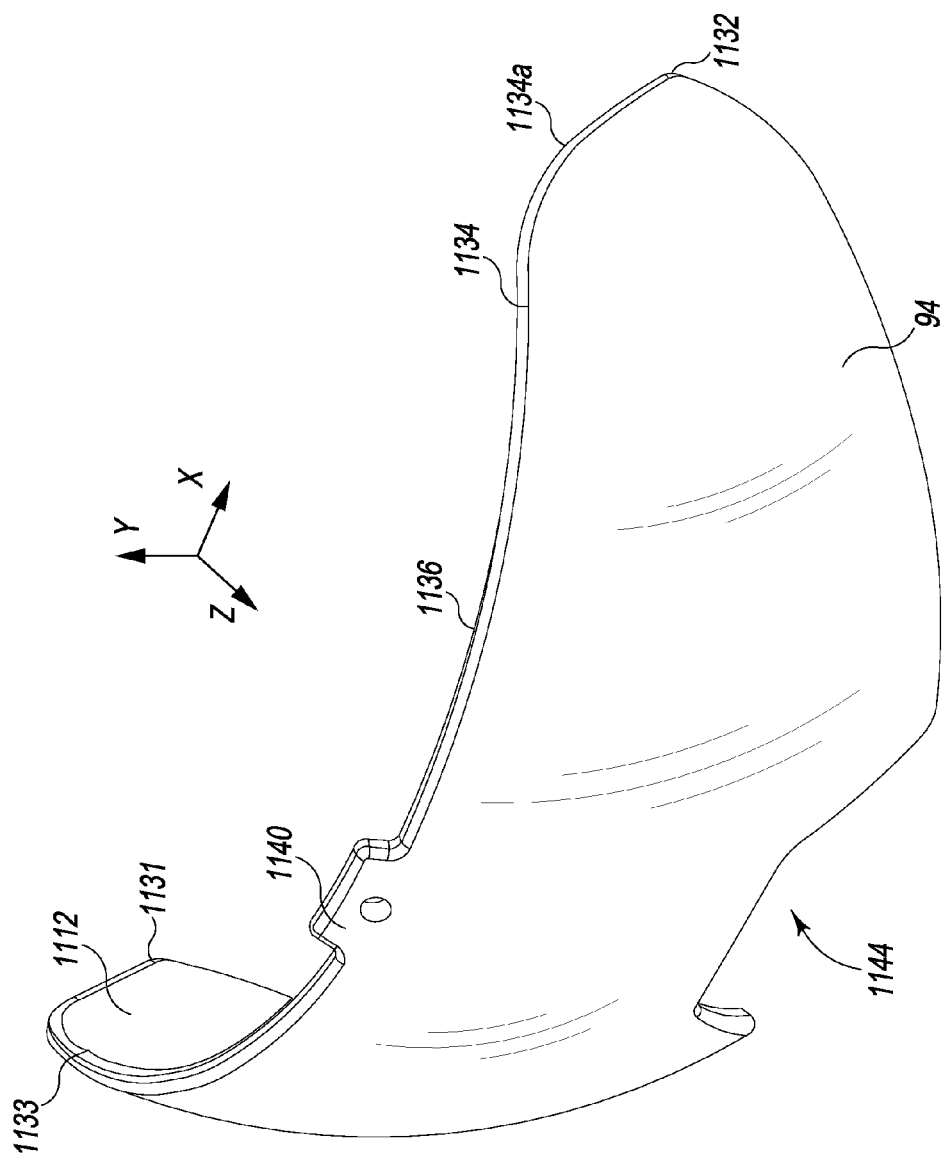
FIG. 59 is a perspective view of one embodiment of a lens of a visor system.
Figure 60:
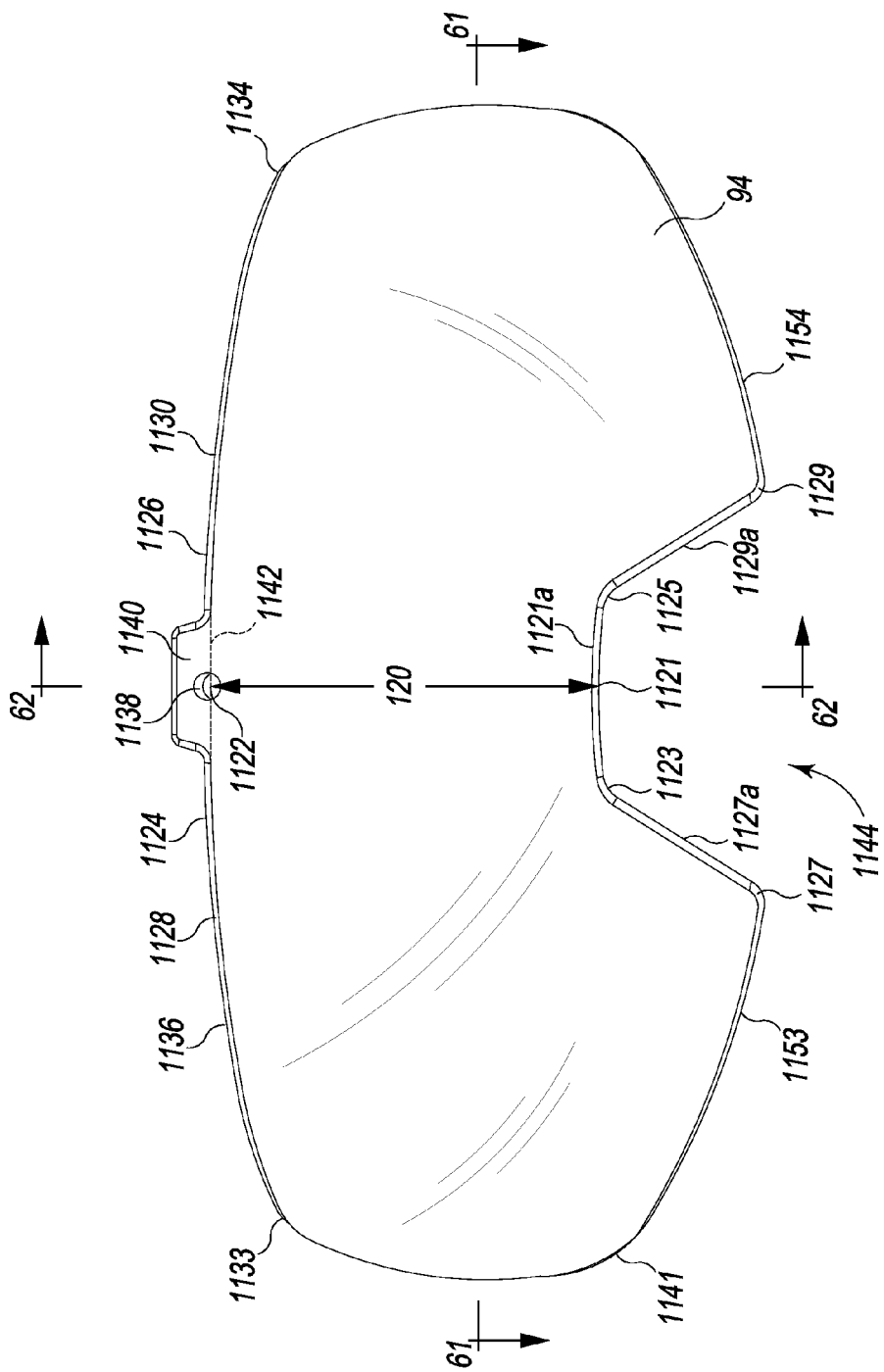
FIG. 60 is a front view of the lens of FIG. 59.

According to the embodiment shown in FIG. 61, the tapering thickness lens has the radii of the inner and outer surface offset from one another. The centerpoint CE is offset forwardly from CI along the frontal direction along Z axis as shown in FIG. 59. Correspondingly RE is offset from RI in the frontal direction along Z axis. In one embodiment, CI and CE are not offset vertically along the Y axis and are not offset laterally in the horizontal plane along the X axis.

FIG. 61 shows a horizontal cross-sectional view of the tapering thickness lens that demonstrates a tapering lens thickness in the horizontal direction. The lens tapers similarly in the vertical direction. The lens has a vertical midpoint that comprises a maximum thickness and the lens tapers toward both a top edge 1136 and a bottom edge 1127 from the vertical midpoint.

According to one embodiment, the tapering thickness lens has an RI of about 104 mm, and an RE of about 106 mm, and the lens has a thickness at the midpoint 1226 of about 5 mm. The lens has a radius of curvature in the vertical direction along the inner surface of about 127 mm and a radius of curvature in the vertical direction along the outer surface of about 130 mm.

Figure 65:
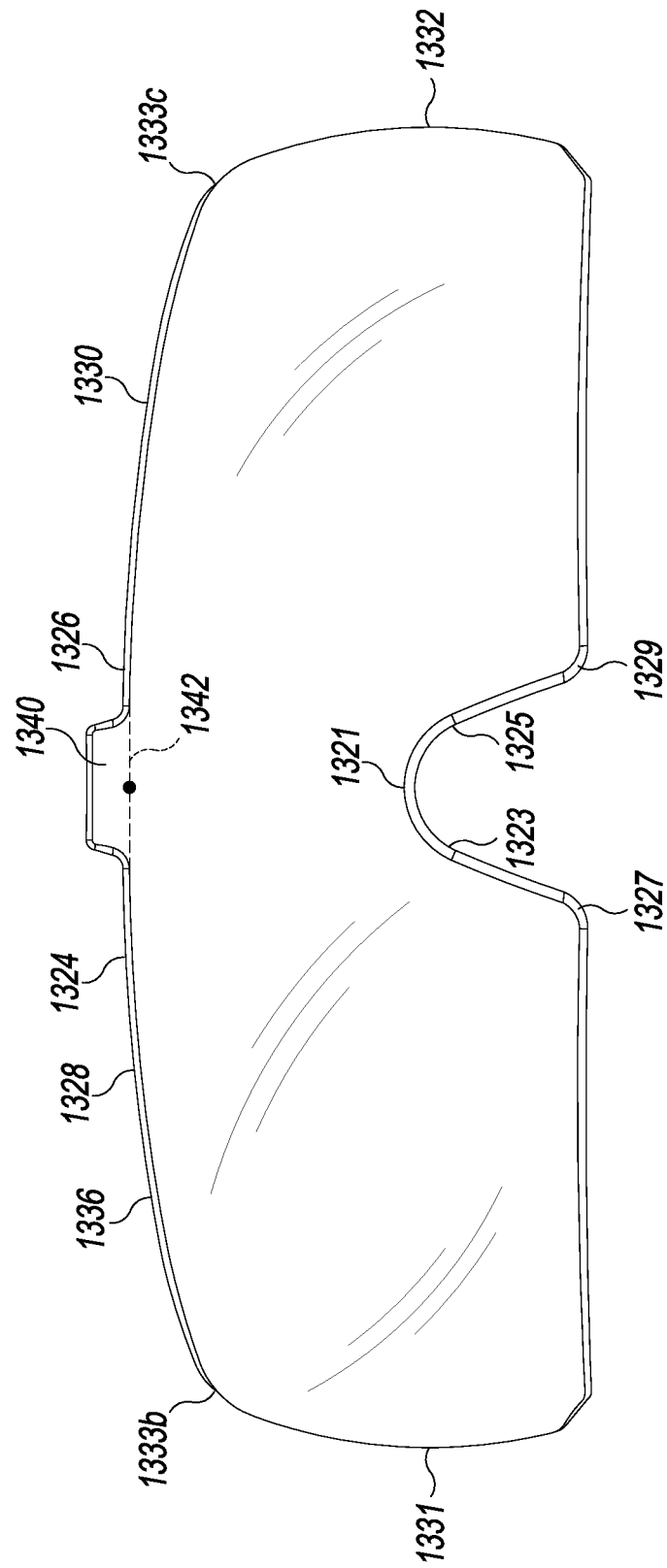
FIG. 65 is a front view of the lens of FIG. 64.

In another embodiment of the tapering thickness lens as shown in FIG. 65, the radius RI is about 109 mm and the radius RE is about 111 mm and the lens has a thickness at the midpoint 1226 of about 5mm. The lens has a radius of curvature in the vertical direction along the inner surface of about 127 mm and a radius of curvature in the vertical direction along the outer surface of about 130 mm.

In one aspect, the lens must have a minimum thickness of about 3 mm at the center 1226 in order to provide adequate impact protection and ballistic protection. In another aspect, it has been found that a vertical radius between about 127 mm and about 130 mm with an about 5 mm center thickness provides optics that reduce aberrations when the eyes are looking upward and downward through the lens. Moreover the lens achieves improved vertical field of view necessary for life-threatening situations. Lenses having large vertical curvatures need to be taller, bigger, and/or heavier to make sure that the edges of the lens are not blocking the useful field of view in military operations. The lens of the invention avoids the problems of large vertical curvatures. Also, large vertical curvatures restrict the ability to use the lens with ballistic mandible or jaw protectors, such as mandible 36.

Tapering thickness lens with vertical curvatures in the range of about 127 mm to about 130 mm have a desirable low-profiled design. Such lens provides optics with low refractive power, low astigmatism, and low prism power in both the horizontal and the vertical direction. The type of lens is advantageous for soldier activities, such as inspecting the roof of buildings, crouching and looking upward to use a weapon, inspecting grounds and running. The tapering thickness lens provides optics in the primary viewing area where the optical aberrations need to be minimized for sharp precise vision. The primary viewing area extends up to about 40 degrees sideways of eye rotation from the straight ahead viewing position in the horizontal direction and 40 degrees upward and downward vertically from the straight ahead viewing position, each of which is considered a limit where eye rotation stops and head rotation starts.

Figure 66:
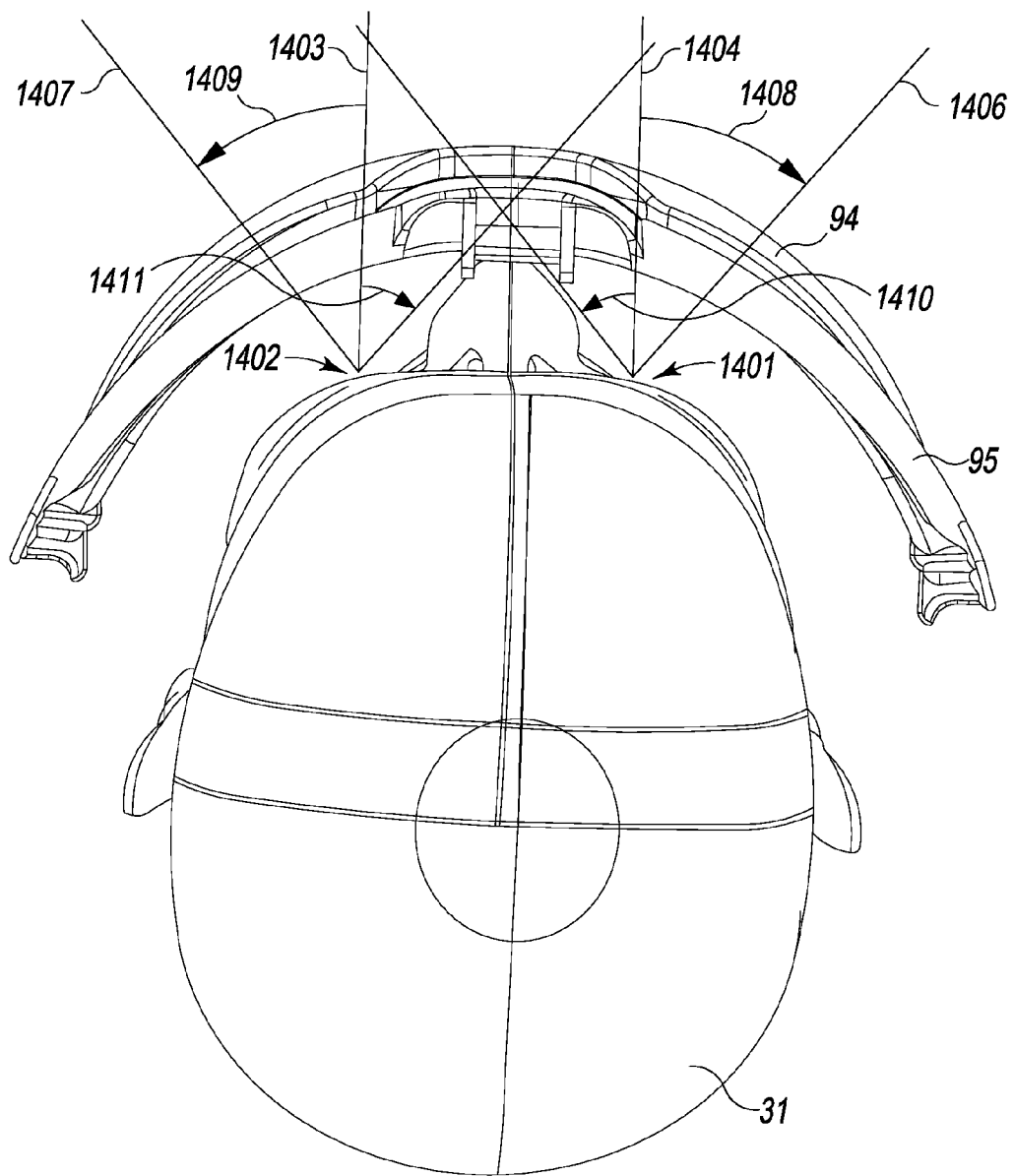
FIG. 66 is a top view of a lens positioned in front of a user.

FIG. 66 demonstrates the horizontal extent of the primary viewing area of the lens. A lens 94 is shown positioned in front of a user's eyes 1401, 1402. The straight ahead line of sight 1403, 1404 from each eye is shown. Regarding the primary viewing area of the lens corresponding to the right eye 1401, the primary viewing area extends forty degrees to the right as shown by angle 1408 and forty degrees to the left as shown by angle 1410. Likewise, regarding the primary viewing area of the lens corresponding to the left eye 1402, the primary viewing area extends forty degrees to the right as shown by angle 1411 and forty degrees to the left as shown by angle 1409. Therefore the lens has a primary viewing area between the ray 1406 corresponding to forty degrees to the right of straight ahead view of the right eye 1401 and ray 1407 corresponding to forty degrees to the left of straight ahead view of the left eye 1402.

Figure 67:
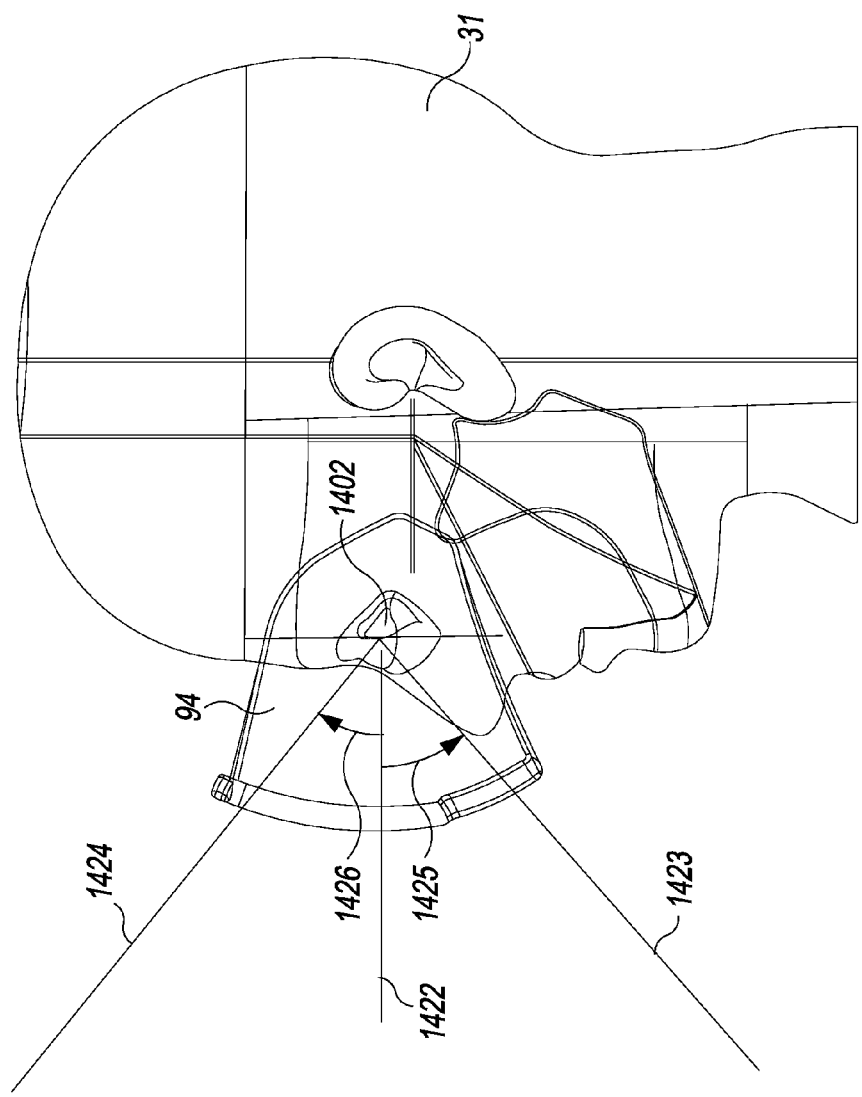
FIG. 67 is a side view of a lens positioned in front of a user.

FIG. 67 demonstrates the vertical extent of the primary viewing area. The lens 94 is shown positioned in front of a user's eyes 1401, 1402. The straight ahead line of sight 1422 from for each eye is shown. The primary viewing area of the lens extends forty degrees upward as shown by the upward angle 1426. The primary viewing area of the lens extends downward forty degrees as shown by the downward angle 1425. Therefore the vertical extent of the primary viewing area extends 80 degrees between the lower bound ray 1423 and the upper bound ray 1424. FIGS. 66 and 67 show the extent of the primary viewing area when the lens is positioned a distance from the user's eye of about 50 mm to about 60 mm, as for example positioned by mounting the lens to the helmet assembly 30 and placing the lens in the deployed position in front of the user's eyes. In one embodiment, the lens is positioned a distance from the user's eye of about 55 mm. One skilled in the art will recognize that the forgoing demonstrates a primary viewing area having a rectangle or square shape, but that the actual primary viewing area defined by the limitations of a user's eye may be elliptical in shape as a user tends to roll the eye downward or upward somewhat from the maximum upward or downward position when the user turns the eye sideways while also looking up or down. Therefore, the actual primary viewing area of a user may be slightly smaller than the primary viewing area of the lens.

In one embodiment, the tapering thickness lens has the following arc lengths. The lens has a vertical arc length from bottom nose cutout corner 1127 following a vertical plane to a corresponding point 1124 on the top edge 1128 is about 98 mm along the inner surface 1204 and is about 103 mm along the outer surface 1202. The lens has a minimum center vertical arc length in the nose cutout portion from the top 1121 of the nose cutout portion 1144 to the top 1142 of the lens, excluding the mounting tab 1140, of about 68 mm along the internal surface and about 73 mm along the external surface. The lens has a maximum horizontal arc length from one side edge 1132 to the other 1131 of about 317 mm along the inner surface and about 331 mm along the outer surface. The nose cut out area has a maximum width from the first bottom nose cutout corner 1127 to the second bottom nose cutout corner 1129 of about 70 mm. The nose cut out area has a minimum width at the top from 1123 to 1125 of about 35 mm. The lens has a top edge 1136 horizontal arc length from 1133b one side to the corresponding position on the other side of about 224 mm along the inner surface and about 236 mm along the outer surface. The lens has an arc length along the lower edge and across the nose cutout area of about 266 mm along the inner surface and about 278 mm along the outer surface. In one embodiment, the lens will have a minimum height arc length of about 68 mm and a maximum height or vertical arc length of about 103 mm. The lens will have a minimum width or horizontal arc length of about 224 mm and a maximum width arc length of about 331 mm.

Figure 64:
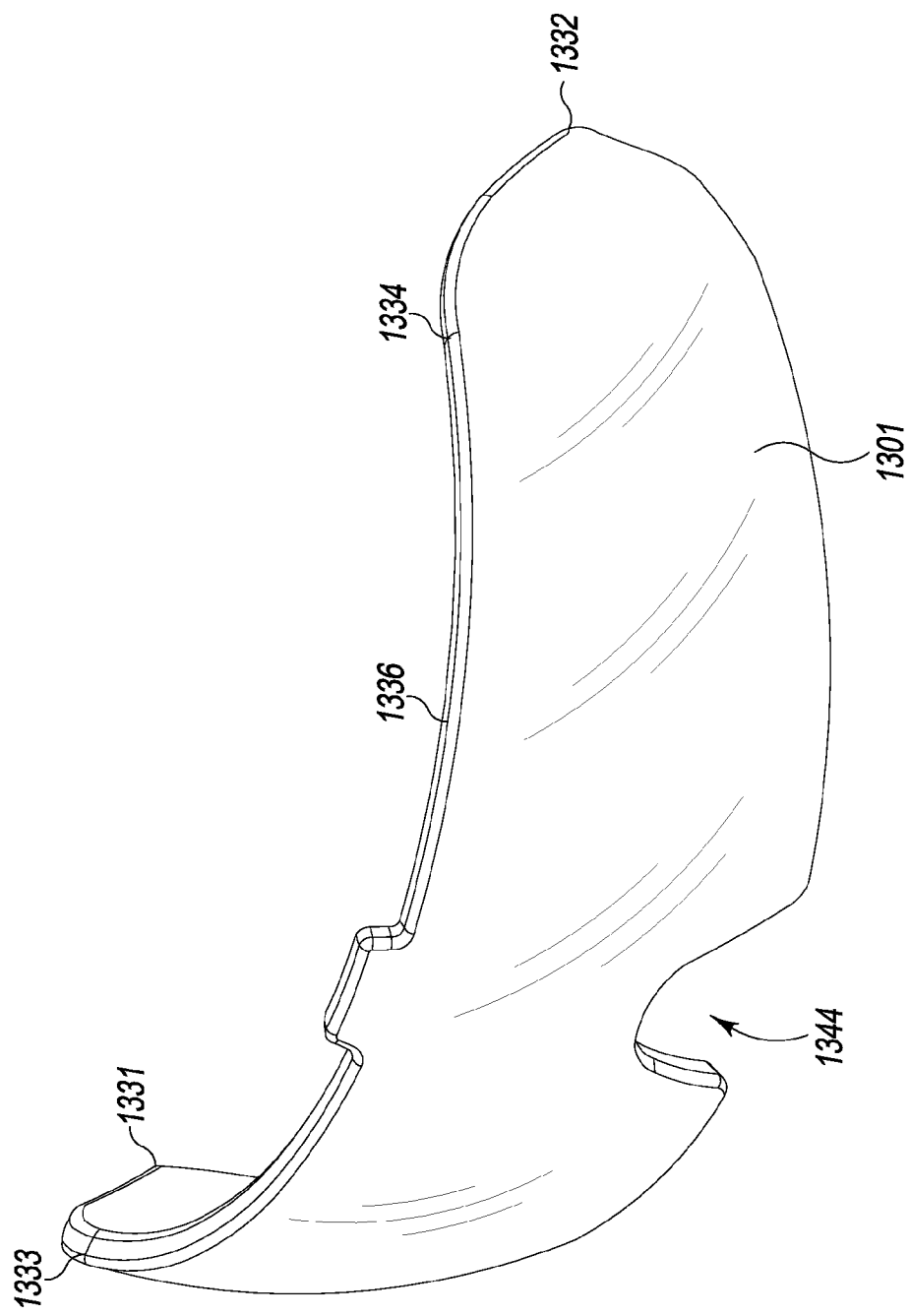
FIG. 64 is a perspective view of an alternative embodiment of a lens.

FIGS. 64-65 show a tapering thickness lens 1301 of an alternative embodiment. The lens 1301 conforms to the properties provided of the lens described in FIG. 61. The lens 1301 has a smaller nose cutout area 1344 than that of lens 94. The lens 1301 may be used with a different mandible than the mandible 36. Alternatively, it may be use without a mandible.

In one embodiment, the tapering thickness lens of FIG. 64 has the following arc lengths. The arc length of the lens 1301 from bottom nose cutout corner 1327 following a vertical plane to a corresponding point 1324 on the top edge 1328 is about 78 mm along the inner surface and is about 80 mm along the outer surface. The lens has a minimum center vertical arc length in the nose cutout portion from the top 1321 of the nose cutout portion 1344 to the top 1342 of the lens, excluding the mounting tab 1340, of about 48 mm along the internal surface and about 51 along the external surface. The lens has a maximum horizontal arc length from one side edge 1332 to the other 1331 of about 315 mm along the inner surface and about 337 mm along the outer surface. The nose cut out area has a maximum width from the first bottom nose cutout corner 1327 to the second bottom nose cutout corner 1329 of about 38 mm. The nose cut out area has a minimum width at the top from 1323 to 1325 of about 35 mm. The lens has a top edge 1336 horizontal arc length from 1333b one side to the corresponding position on the other side 1333c of about 223 mm along the inner surface and about 241 mm along the outer surface. The lens has an arc length along the lower edge and across the nose cutout area of about 238 mm along the inner surface and about 266 mm along the outer surface. In one embodiment, the lens will have a minimum height arc length of about 48 mm and a maximum height or vertical arc length of about 80 mm. The lens will have a minimum width or horizontal arc length of about 223 mm and a maximum width arc length of about 337 mm.

While several arc length parameters are given, it will be appreciated that the invention is not limited to lenses of those arc lengths, but rather a tapering thickness lens having a horizontal radius of curvature in the range of 100 mm to 120 mm, a vertical radius of curvature in the range of 120 mm to 135 mm, and a maximum lens thickness in the range of about 5 mm to about 8 mm will accrue the advantages of the invention including ballistic and impact protection while reducing refractive power, astigmatism and prism in the horizontal direction as well as in the vertical direction. Moreover, the lens may be used with or without a mandible or jaw protector. The lens may or may not have a nose cutout portion such as 1144.

Mandible and Attachment

For military applications particularly, the mandible should be ballistic impact resistant. The mandible could advantageously be used for motorcycle helmet, winter sport or auto racing applications. The mandible should have a high mass impact resistance.

Figure 20:
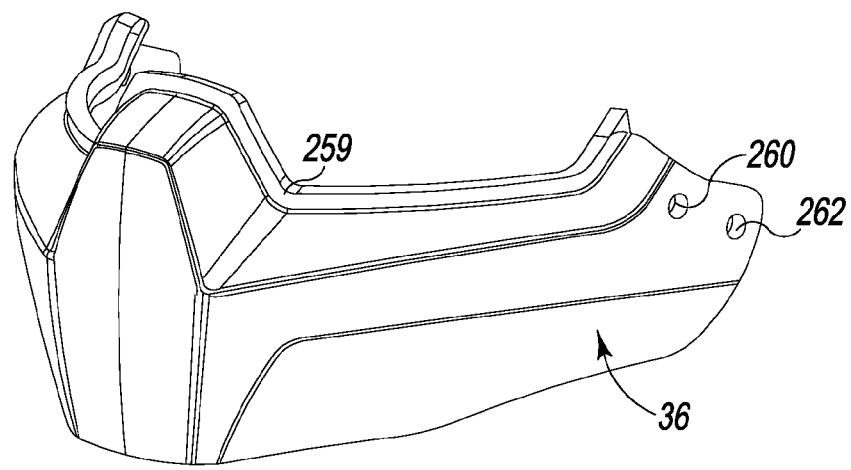
FIG. 20 is a front perspective view taken from of FIG. 1 with portions removed for explanation of underlying features showing a mandible.
Figure 21:
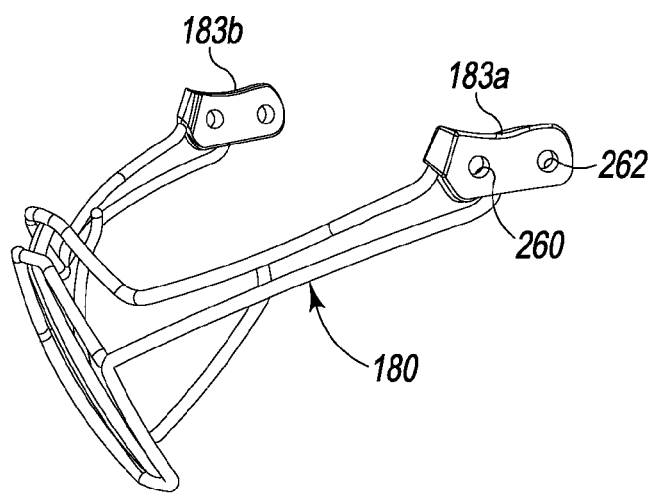
FIG. 21 is a front perspective view taken from of FIG. 20 with portions removed for explanation of underlying features showing an underlying tubular framework of the mandible.

FIG. 20-21 illustrates two embodiments of a mandible of the present invention. The mandible 36 shown in FIG. 20 is a unitary structure. The mandible includes an upstanding rim 259 that provides a surface against which the lens 94 can be supported when closed.

The mandible 180 shown in FIG. 21 comprises a rigid material mandible frame 180. The frame can be used alone to form a wire frame guard such as shown in FIG. 24E, or can be covered by a ballistic resistant fabric 182 as shown in FIG. 24F wherein the wire frame guard frame 180 is not visible. The mandible frame 180 is a tubular space frame or wire frame structure to reduce weight.

The fabric 182 is attached to an outside of the frame 180 such as by wrapping around the frame and secured in place by hook and loop fasteners (VELCRO). In this way the fabric is removable. The frame 180 includes two plates 183a, 183b which include holes for mounting the mandible frame 180 to the attachment bases 62, 64 as described below.

As illustrated in FIGS. 18, 19 and 32-34, the attachment base 62 comprises a base plate 230 and an overlying body block 232. The block 232 can include a surface 232a which can support ends of the face shield frame 95 as shown in FIG. 1. The base plate 230 includes hooks 234, 236 that engage a lower front edge 239 of a brim gasket 240 of the helmet 34. The base plate 230 also includes two threaded bosses (or bosses terminating in captured nuts) 242, 244 that fit into holes 260, 262 (FIGS. 19, 20 and 21) through the mandible 36 or frame 180 and receive screws 71, 72 that fasten together the mandible 36 (or frame 180), the base plate 230 and the body block 232. The mandible provides holes 260, 262 that receive the bosses 242, 244 and screws 71, 72 (FIG. 20).

The body block 232 includes a slot 263 that is engaged by the strap loop 85 of the strap assembly 76.

Figure 33:
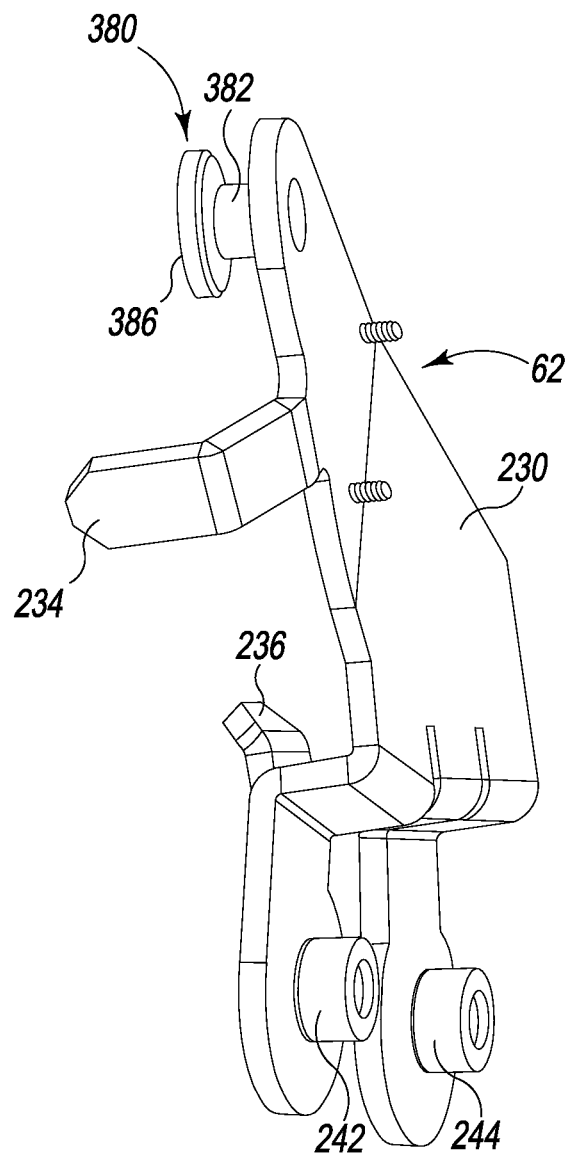
FIG. 33 is a perspective view of the attachment base of FIG. 32 with portions removed for explanation of underlying features.
Figure 34:
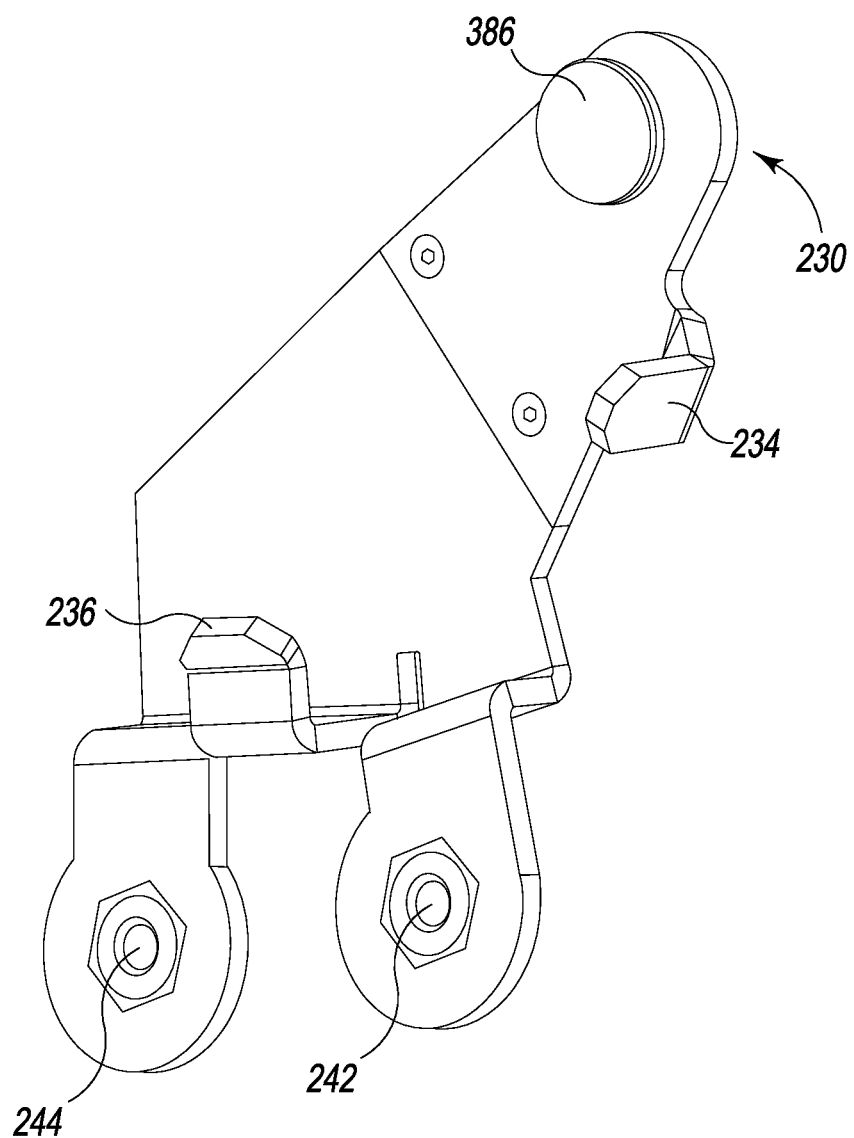
FIG. 34 is an inside perspective view of the attachment base shown in FIG. 33.

As shown in FIG. 33, the base plate 230 also includes a fixed, headed pin or rivet 380 having a shaft 382 and a head 386.

Figure 16:
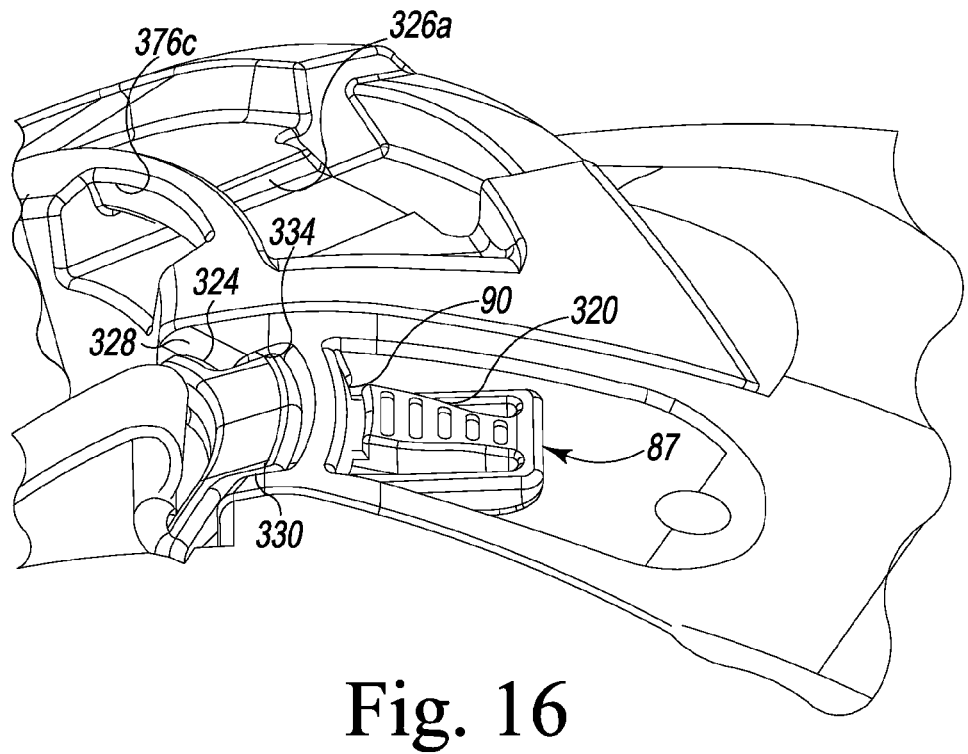
FIG. 16 is a left, rear perspective view of the helmet assembly shown in FIG. 1 with portions removed for explanation of underlying features.
Figure 17:
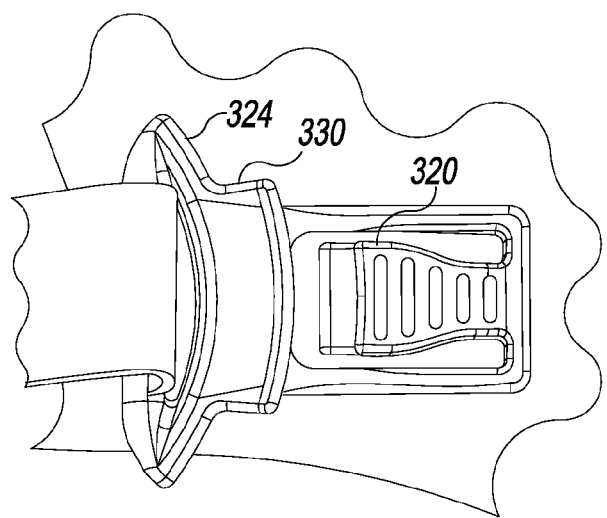
FIG. 17 is a left side view of the helmet assembly shown in FIG. 16 with portions removed for explanation of underlying features.
Figure 18:
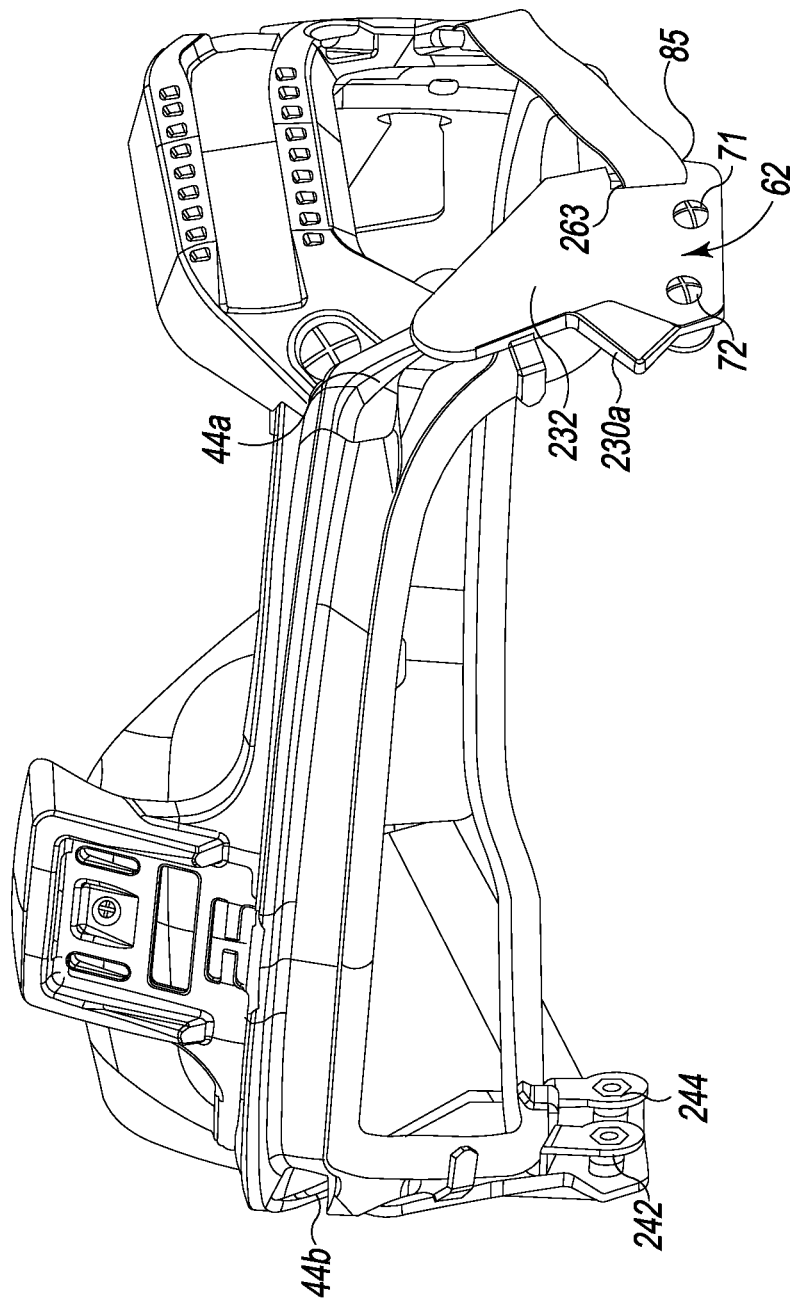
FIG. 18 is a front perspective view of the helmet assembly of FIG. 1 with portions removed for explanation of underlying features.

As shown in FIGS. 16 and 17, the buckle member 87 includes a resilient latch 320 that is depressed inwardly as the buckle member 87 is forced into the slot 90 of the back rail 52. The buckle member 87 also includes a base 324 that fits against a front surface 328 of the back rail. The buckle member also includes a plug portion 330 that fits snugly into a socket formation 334 contiguous with the slot 90.

Figure 35:
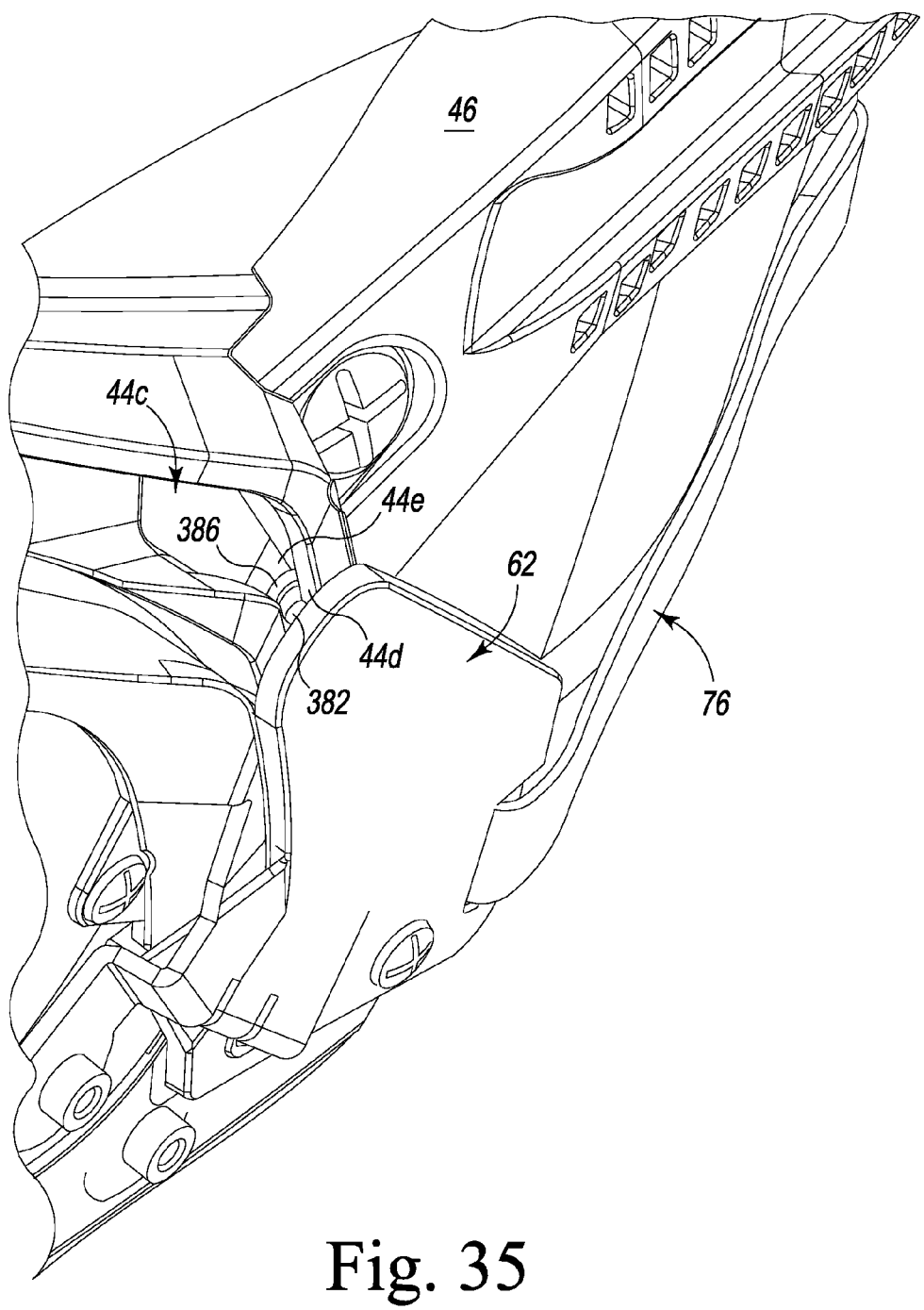
FIG. 35 is an enlarged fragmentary perspective view of a left side of the helmet assembly.

To don the mandible or guard, the wearer moves the heads 386 of the headed pins 380 of each attachment base 62, 64, with mandible 36 or frame 180 attached, into the wide mouth 44c of the two side channels 44a, 44b. As shown in FIG. 35, the wide mouth 44c is wide enough to receive the head 386 therein and the narrow region 44d is wide enough to allow sliding of the shaft 382 therethrough. Beneath the narrow regions 44d is a parallel passage 44e that is wide enough to allow sliding passage of the head 386. The attachment bases are slid downward until the headed pins are stopped within the narrow regions 44d. The mandible or frame and attachment bases are then rotated back and the hooks 234, 236 of the attachment bases will then be oriented to brace against the rim gasket 240 as the strap assemblies 76, 78 are strapped to the back rail 52 by the buckle members 87. To open the mandible for hydration (drinking), the buckle members 87 are released and the mandible can be rotated forward without separating from the helmet due to the headed pins 386.

Both the mandible hooks and the face shield frame supports rest against the helmet brim in the same area; should there be an impact, the load should be absorbed by the helmet.

Side Rails

The side rails 46, 48 are fastened to the helmet by screws 360, 362 (FIGS. 1-3) at front ends of the side rails and by being engaged to the back rail at rear sides thereof. The screws 360, 362 also serve to fasten the front mount 44 to the helmet as well.

Figure 19:
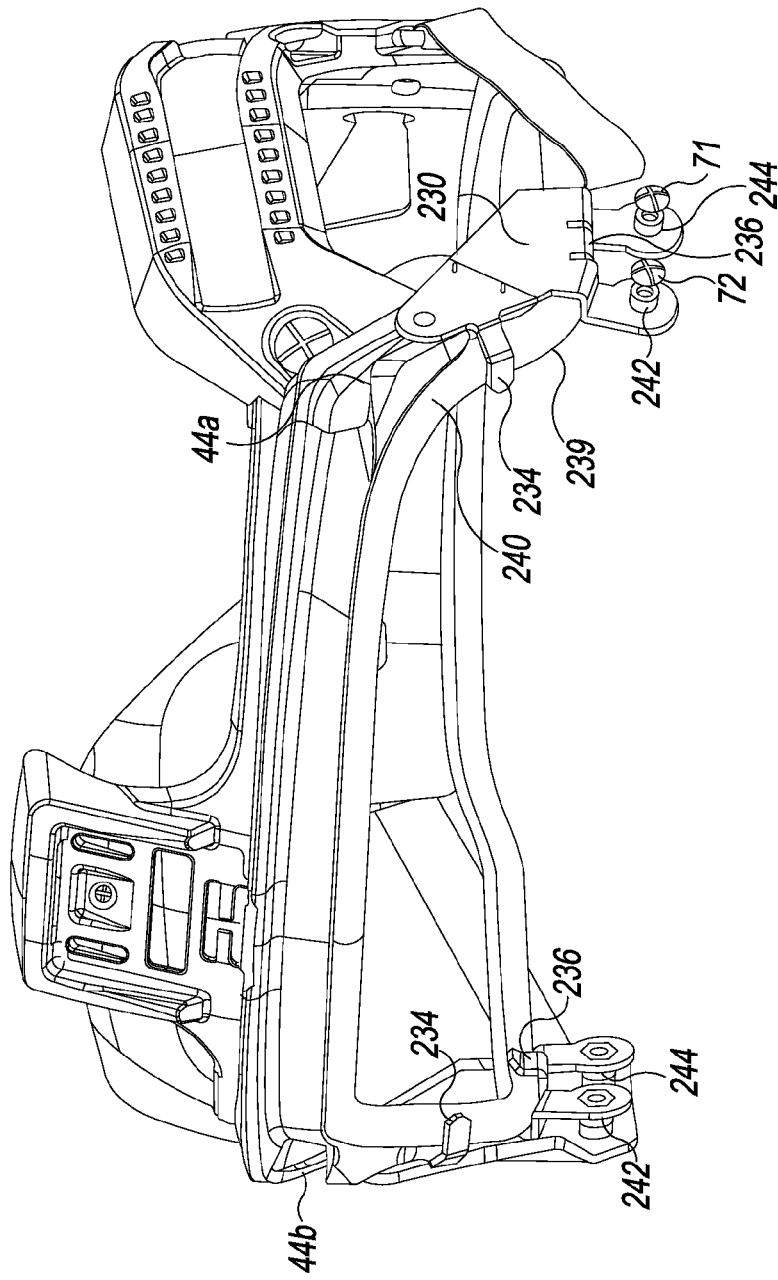
FIG. 19 is a front perspective view of the helmet assembly of FIG. 18 with further portions removed for explanation of underlying features.
Figure 19A:
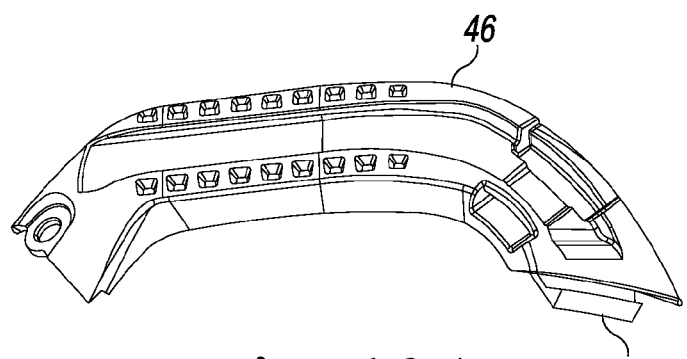
FIG. 19A is a perspective outside view of a side rail.
Figure 22:
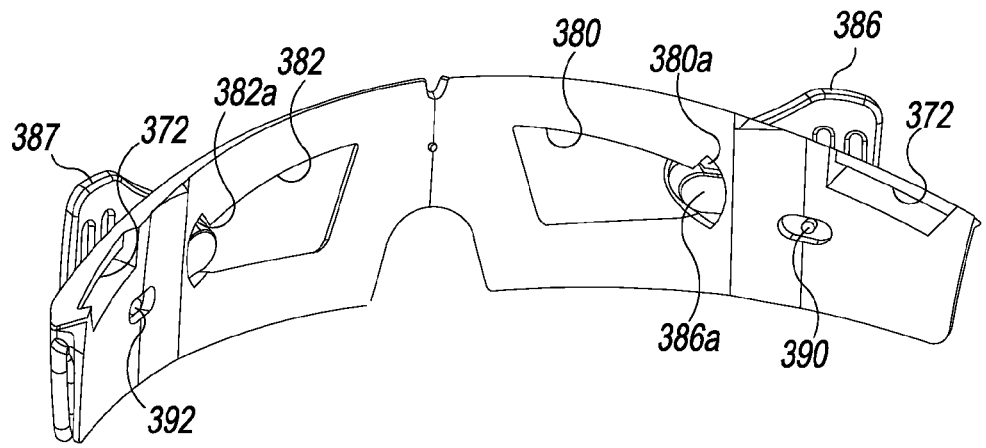
FIG. 22 is a front perspective view taken from FIG. 1 with portions removed for explanation of underlying features showing a back rail.

The side rails include an extending hook tab 370 (FIG. 19A) that fits into and interlocks with a hook recess 872 formed on opposite ends of the back rail (FIG. 22). When the back rail 52 is attached to the helmet the rear ends of the side rails are fixedly clamped to the helmet via the hook tabs 370.

Figure 6A:
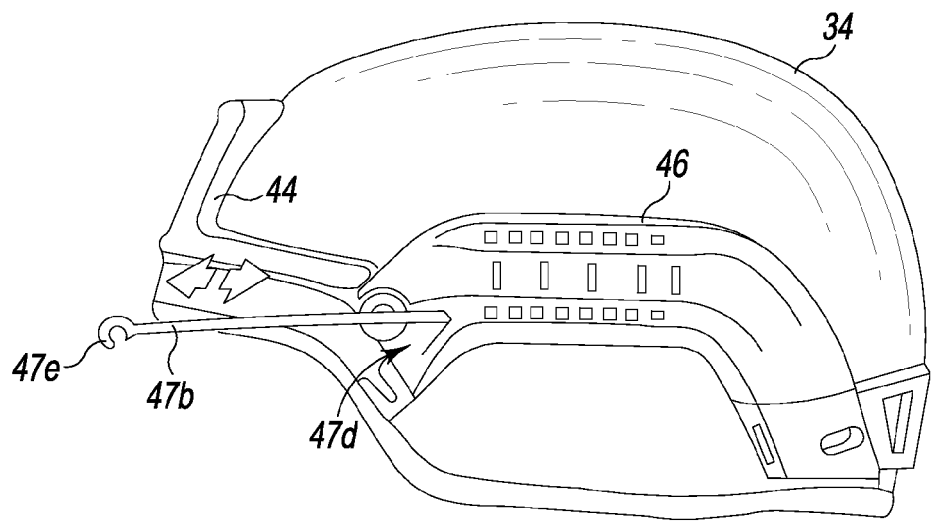
FIG. 6A is a left side vide of the helmet assembly shown in FIG. 1 with portions removed for explanation of underlying features.
Figure 6B:
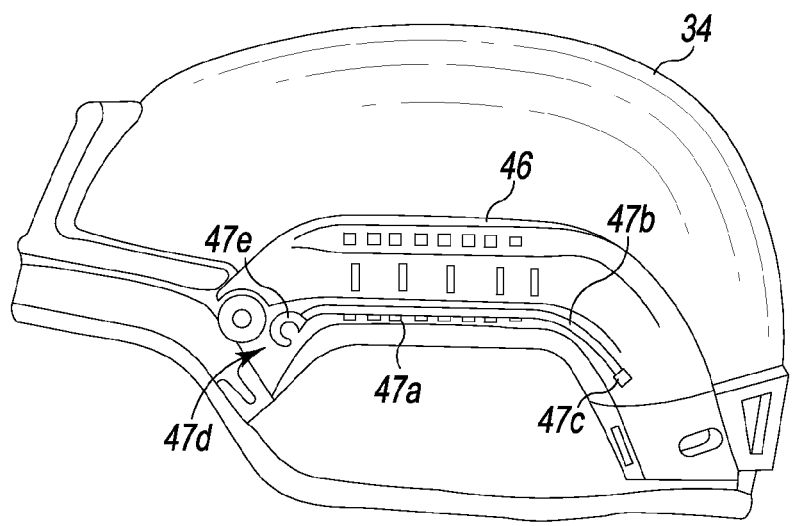
FIG. 6B is a left side vide of the helmet assembly shown in FIG. 1 with portions removed for explanation of underlying features and with the shock cord channel cover shown transparent.
Figure 7:
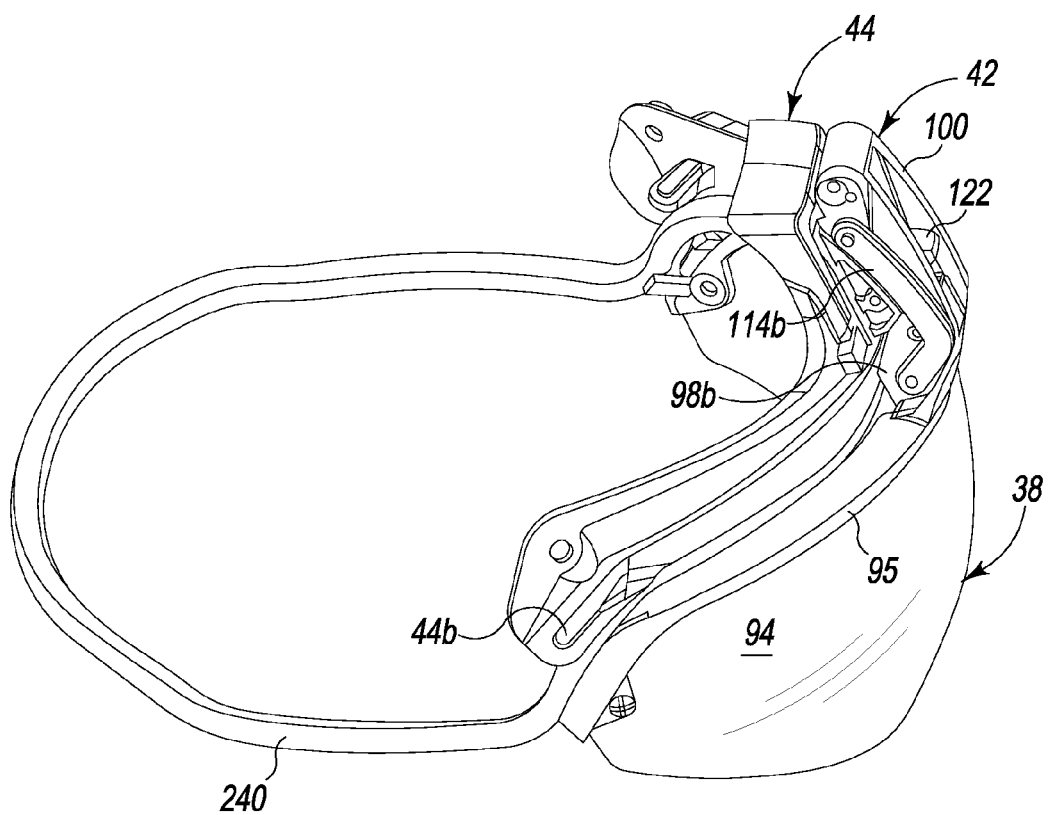
FIG. 7 is a right side perspective view of portions of the helmet assembly shown in FIG. 1 with portions removed for explanation of underlying features.
Figure 8:
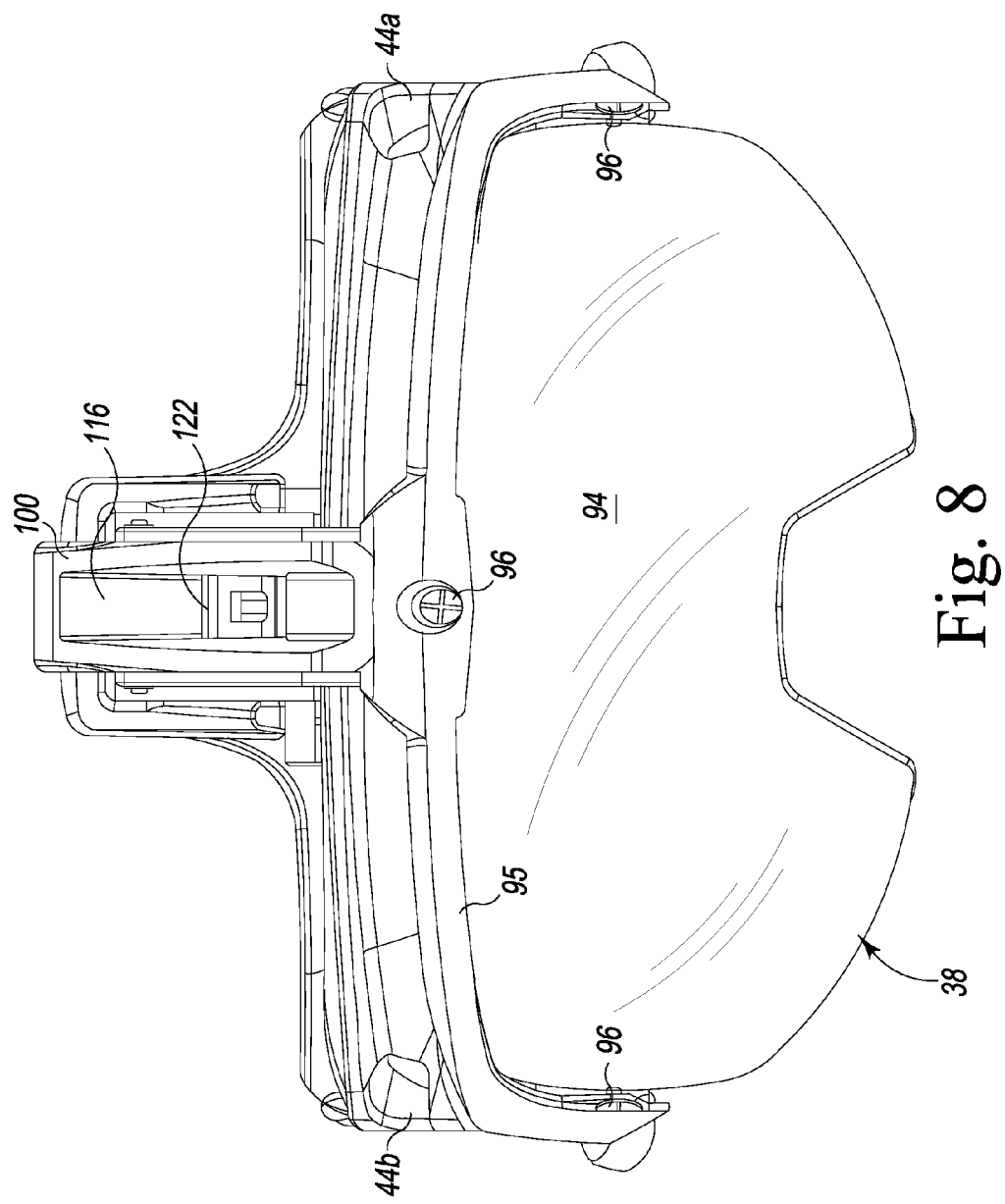
FIG. 8 is a front view of the helmet assembly portions shown in FIG. 7.

As shown in FIGS. 6A and 6B, the side rails include integrated night vision goggle (NVG) shock cords 47b, one on each side which are used to stabilize and secure either the NVG or the face shield 38. Shock cords are elastic cords. FIG. 6B shows a shock cord channel where the shock cord channel cover is transparent or not shown. Each side rail 46 contains a shock cord channel 47a that extends along a length of the side rail. The shock cord is anchored with an anchor 47c that attaches the cord at one end of the channel 47a. The cord extends along the length of the channel to the outlet 47d. The outlet is widens beyond the width of the channel as shown in FIGS. 6A and 6B. The widened outlet allow for a hook 47e attached to the end of the cord to reset within the widened outlet when the cord is in the retracted position as shown in FIG. 6B. When an accessory needs to be stabilized with the shock cords, the user pulls and stretches the shock cord to an extended condition, such as shown in FIG. 6A, and attaches it the accessory (not shown in FIGS. 6A, 6B).

Figure 4C:
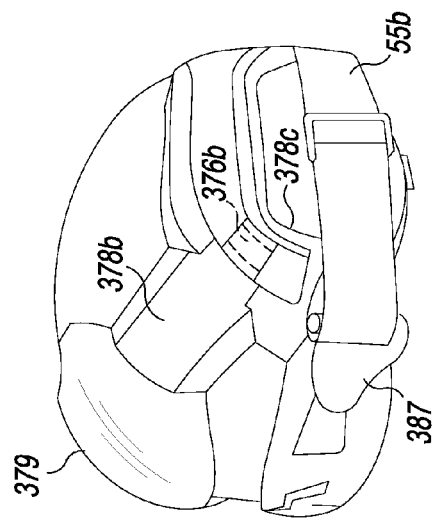
FIG. 4C is a rear perspective view of the helmet assembly in an alternate configuration wherein a top rail is added.
Figure 5:
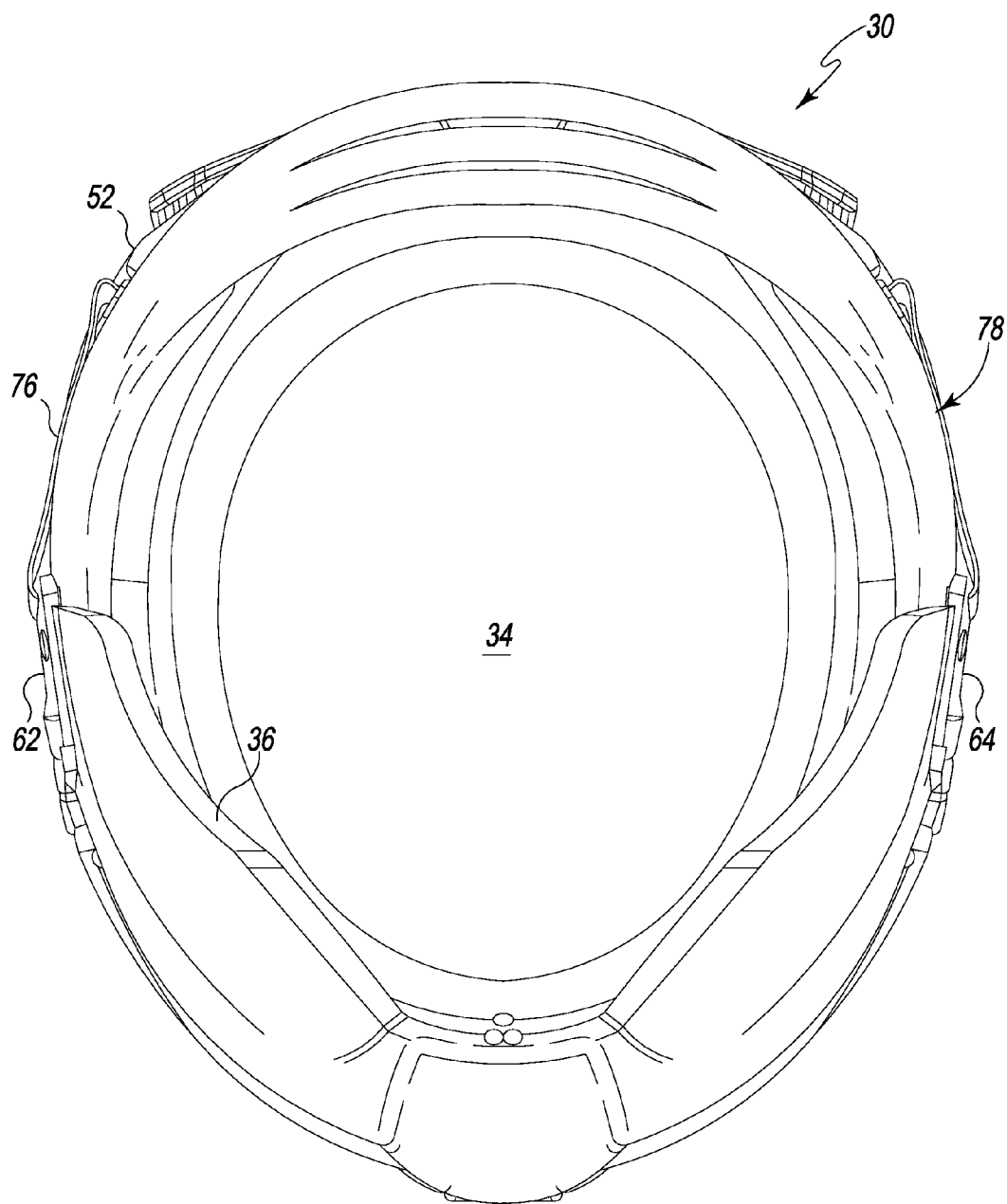
FIG. 5 is a bottom view of the helmet assembly shown in FIG. 1.

The side rails 46, 48 include mounting formations 376, 377 (FIG. 4) for mounting an additional rail between the formations. FIG. 4C and 4D illustrate a top rail 378 that includes legs 378a, 378b connected to a top pod or housing 379.

The formations include a guide recess 376a and a slot 376c (FIG. 16). To mount the top rail 378, the legs are engaged to the mounting formations wherein narrow end portions of the legs are inserted through the slots 378c of each formation 376, 377. The distal end of each leg includes a hook latch 378c that retains the legs 378a, 378b engaged with the respective side rail 46, 48. The legs 378a, 378b can be articulated at the pod 379 to act as latch tighteners to securely draw the hook latches 378c tightly against the slots 376c.

Additionally, the slots 376c can be made dimensionally identical to the slots 90 on the back rail 52. Therefore, if the top rail is not used, the wearer has alternate locations to insert the buckles 87 or can use the slots 376c for mounting another component.

The pod 379 is thus held onto a top region of the helmet 34. The pod 379 can contain electronics, communication equipment, or other equipment or can contain a beacon or other signal generating device which helps to identify the wearer to others as "friend" instead of "foe", or help in locating the wearer by friendly forces. The signal generated by the beacon can be a visual signal or radio signal or other signal. Where the signal indicator is an IR designator, since it is emitting IR signals, it will be seen at night by other soldiers in the back of the helmet wearer, when the other soldiers wear night vision goggles.

Figure 36:
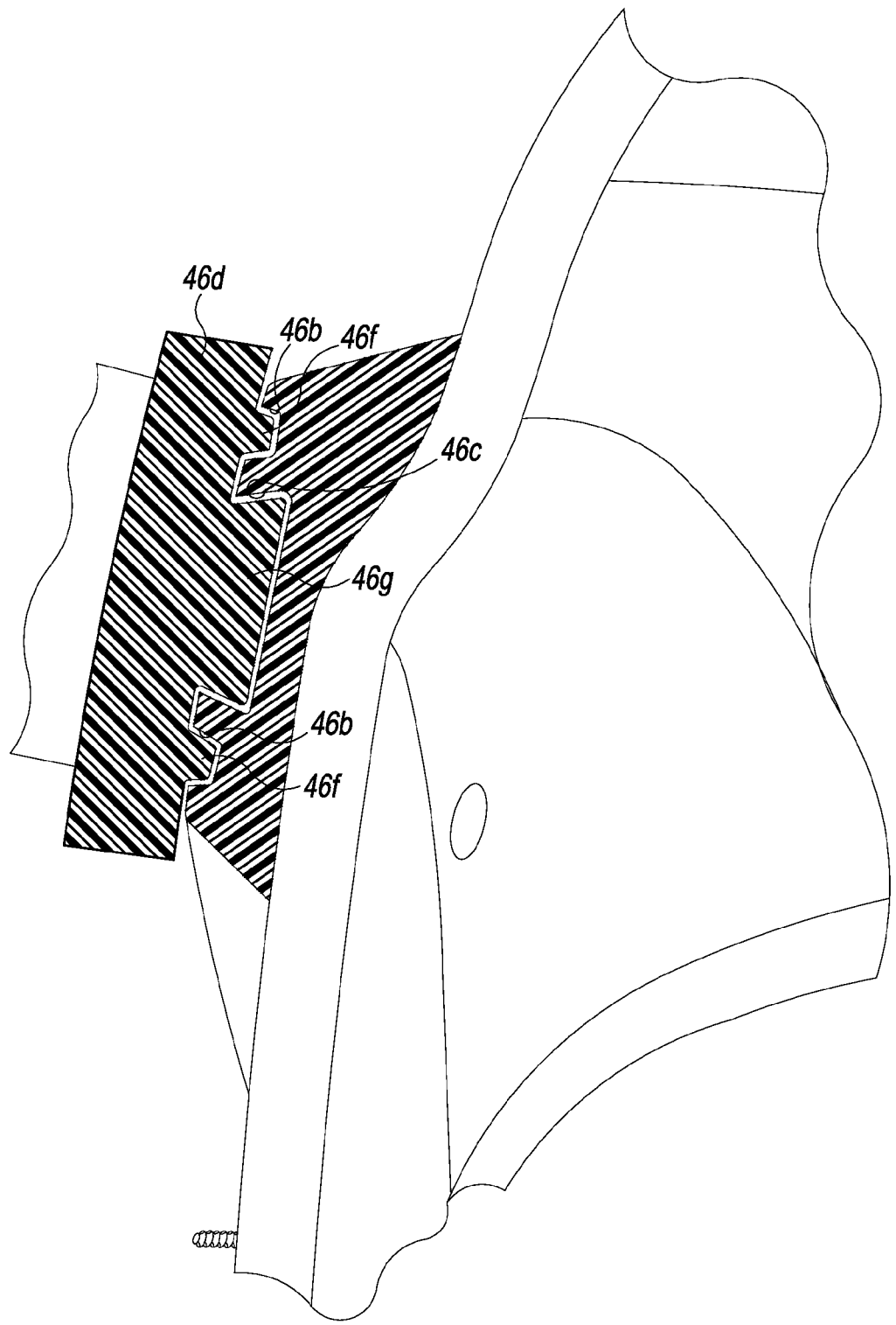
FIG. 36 is an enlarged, fragmentary sectional view taken generally along line 36-36 of FIG. 6 with an added functional attachment.

FIGS. 6 and 36 illustrate the side rails 46, 48 include attachment formations 46a that include an upper and lower row of depressions 46b and a dovetail slot 46c, between the rows of depressions. A component attachment base 46d includes a plurality of pins 46f that insert into a plurality of depressions. This insertion fixes the front-to-back position of the base 46d. The base 46d includes a reverse dovetail profile 46g that interlocks with the dovetail slot 46c. The dovetail profile 46g is slid into the dovetail slot and the pins 46f and/or the base 46d and/or the rail 46 has sufficient flexibility that the base can be forcibly positioned along the length of the rail until the desired position of the base, corresponding to registration of the pins 46f into the desired depressions 46b is reached.

The base 46d can be the mounting base for a camera, flashlight or other equipment.

Back Rail

Further details of the back rail 52 are illustrated in FIGS. 22. The back rail 52 includes major openings 380, 382 having pie-shaped minor recesses 380a, 382a contiguous therewith. Also shown are goggle clips 386, 387 that engage recesses 380a, 382a by hook portions 386a, 387a. The pie-shape of the recesses allows for a range of angular movement of the goggle clips with respect to the back rail 52. The back rail is mounted to the helmet by two screws 390, 392 (FIG. 4A).

The hook portions 386a, 387a allow one side of the goggles, one hook portion, to be released from the back rail 52 while the other hook portion retains the goggles, hanging down, onto the back rail. This is advantageous for a wearer to disengage the goggles without separating the goggles from the remaining helmet equipment.

Figure 23:
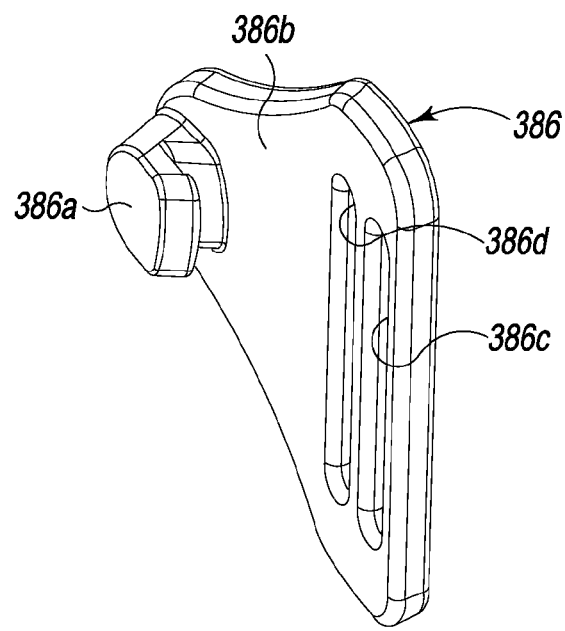
FIG. 23 is a perspective view of a goggle strap clip shown in FIG. 22.

One clip 386 is shown in FIG. 23. The clip includes a body portion 386b having slots 386c, 386d for receiving a goggle strap end, and formed with the hook portion 386a.

The back rail can also be configured to hold a power source such as a battery pack.

Adjustable Rear Rail System

FIGS. 45-51 illustrate an alternate embodiment of an adjustable back rail system 852 that includes a first outer back rail 810, an opposite second outer back rail 820, and a center back rail 830. The first and second outer back rails are constructed in mirror image fashion across a vertical centerline of the helmet. The adjustable rear rail system allows the parts of the helmet assembly 30 excluding the helmet, to be used on different sized helmets and will accommodate the variation in helmet through hole location, which may arise for example during helmet mass production. The adjustable back rail system 852 is shown in an expanded position in FIG. 47 and a retracted position in FIG. 46 for accommodating different sized helmets. The adjustable back rail system 852 may have an adjustable range beyond that shown in FIGS. 46 and 47.

Figure 50:
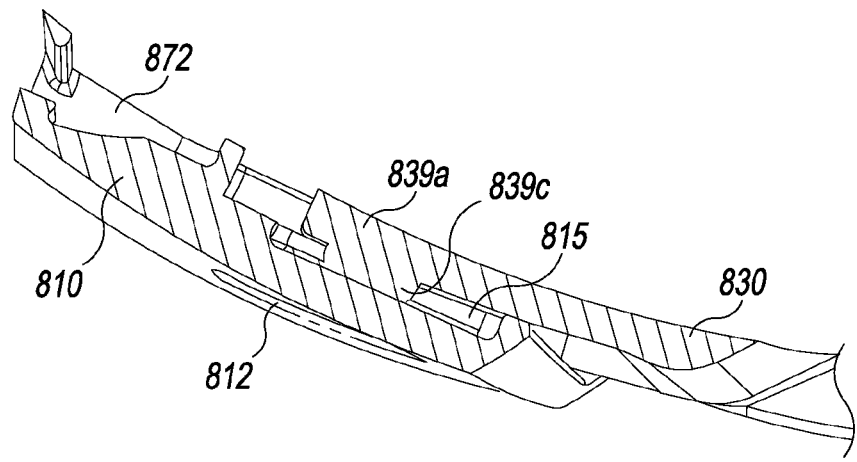
FIG. 50 is a sectional view taken from FIG. 48 generally along line 50-50.
Figure 51:
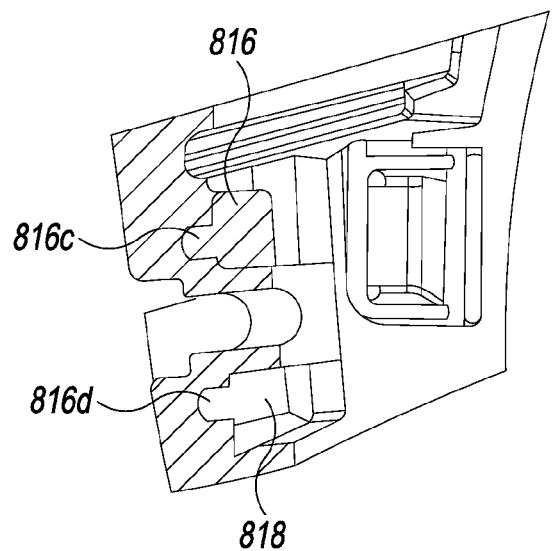
FIG. 51 is a section view taken from FIG. 48 generally along line 51-51.
Figure 52:
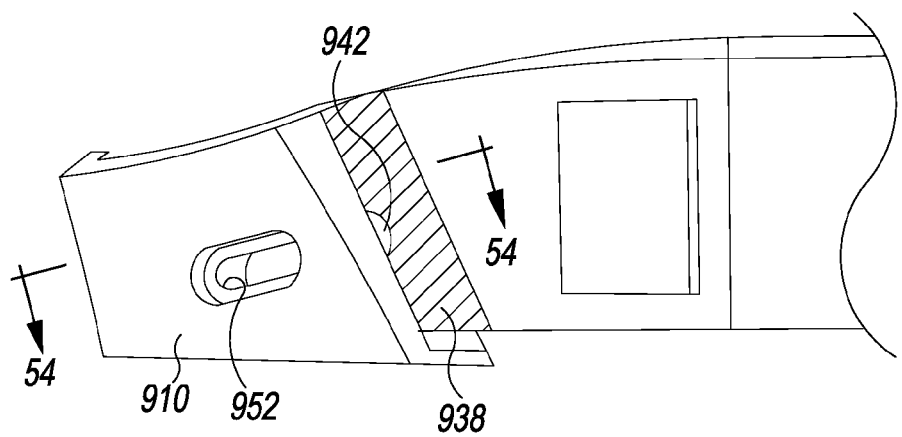
FIG. 52 is a fragmentary view of a portion of the center back rail and an outer rear rail of an alternative toothed back rail embodiment of the adjustable back rail system.
Figure 53:
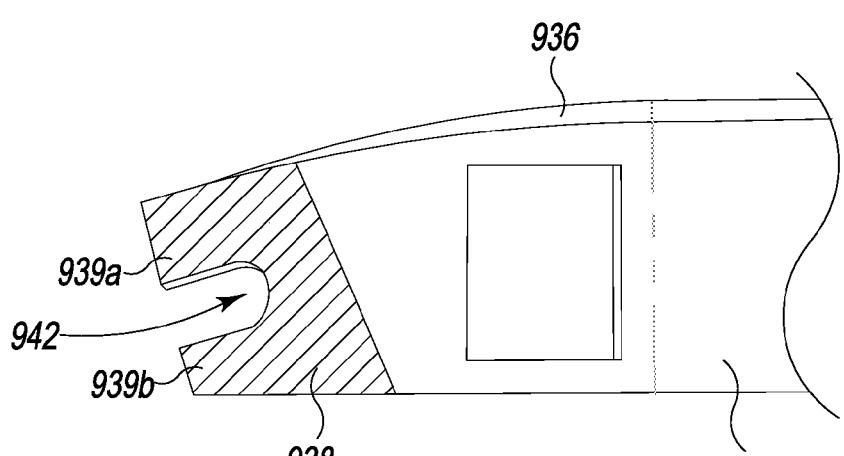
FIG. 53 is a fragmentary view of a portion of the center back rail of the alternative toothed back rail embodiment of the adjustable back rail system.
Figure 54:
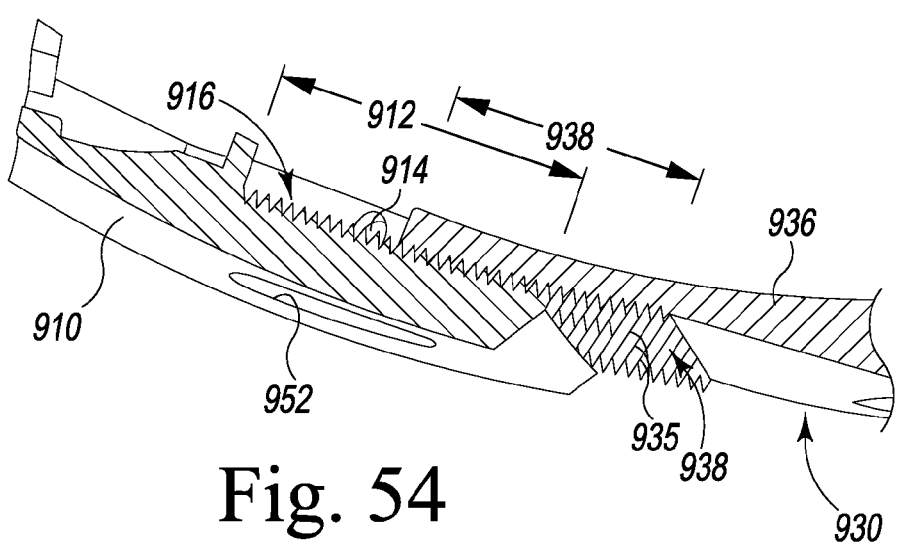
FIG. 54 is a sectional view from taken from FIG. 52 generally along line 54-54.

As shown in FIG. 50, each outer back rail 810, 820 has a hook recess 872 (not shown for outer rail 820). The extending hook tab 230 (FIG. 19A) of the side rails fit into and interlock with the hook recesses 872 of the outer back rails.

Figure 47:
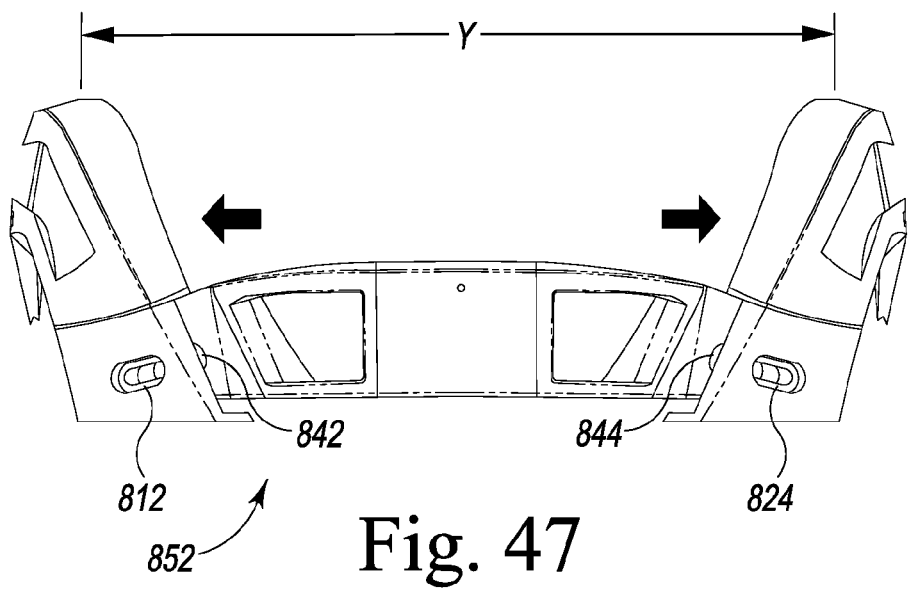
FIG. 47 is a rear view of the helmet assembly having the alternate adjustable back rail system in an expanded position, where the helmet is not shown.
Figure 48:
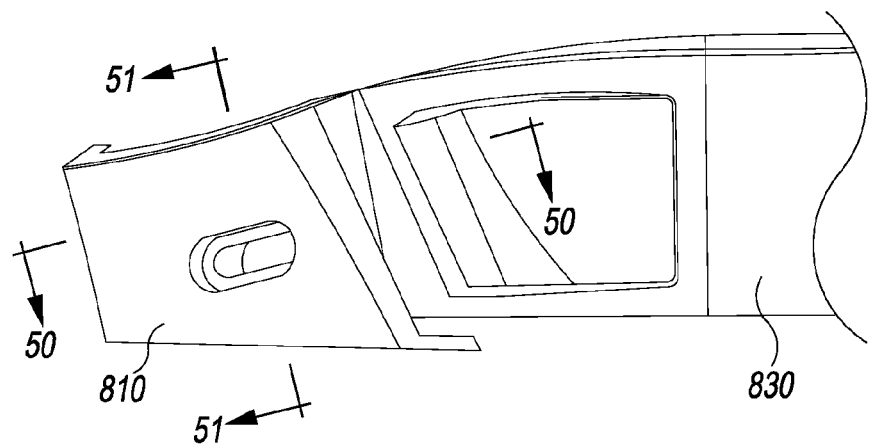
FIG. 48 is a fragmentary view of a portion of the center back rail and an outer rear rail of the adjustable back rail system.
Figure 49:
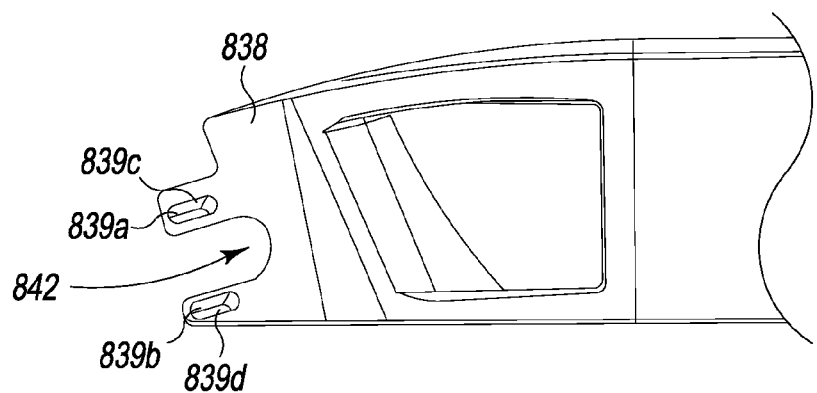
FIG. 49 is a fragmentary view of a portion of the center back rail of the adjustable back rail system.

The center rear rail has U-shaped anchor slots 842, 844 (partially shown in FIG. 47). The anchor slots 842, 844 correspond to outer anchor slots 812, 824, respectively of the first and second outer rear rails. The anchor slots are at least partially alignable with the outer anchor slot for receiving anchor screws (not shown, but similar to the screws 390, 392) to secure the back rail system 852 to the helmet. In another embodiment the U-shaped anchor slots may be oblong, circular, or oval shape.

The center back rail has an alignment point or line 836 for positioning the center rear rail at the front-back center line of a helmet. The outer back rails are positioned over outer ends 838 (second outer end not shown) of the center back rail. The outer end 838 has two engagement tabs 839a, 839b extending laterally from an end of the center rear rail for engaging and sliding within corresponding receiving channels 816, 818 of the outer back rail 810. Each engagement tab 839a, 839b has a forwardly extending tab 839c, 839d, respectively. The forwardly extending tabs correspond to forwardly extending recesses 816c, 818d of the receiving channels 816, 818, respectively.

When fitting the back rail system to the side rails and a helmet, the center back rail is aligned with the helmet at the alignment point 836. The side rails are attached to the outer rear rails. The outer rear rails are placed over the outer ends of the center back rail 830, and the engagement tabs 839a, 839b mate with the receiving channels 816, 818. Screws are then placed through the outer anchor slots 812, 824 and through the anchor slots 842, 844 to secure the back rail system to the helmet.

In an alternative embodiment, toothed back rail embodiment of the adjustable back rail system, as shown in FIGS. 52-57, the outer ends 936 (right outer end not shown) of the center back rail 930 has a plurality of locking teeth on the outward facing surface throughout a engagement portion 938 of the outer end 936. The right outer end is mirror image identical to the left outer end 936 across a vertical centerline of the helmet. The center back rail 930 is similar to the center back rail 830 except as described herein. The outer end 936 has two engagement tabs 939a, 939b within the engagement portion 938. The two tabs 939a, 939b form a U-shaped anchor slot 942 for receiving an anchor screw or fastener (not shown) to secure the back rail system to the helmet.

The outer back rails 910 have a corresponding toothed section 912 having locking teeth 914 on a rearward facing portion 916 of the outer back rail 910. Locking teeth 935 of the center back rail 930 engage the locking teeth 914 of the outer back rail 910 when the outer back rail is placed over the outer end of the center back rail. The toothed engagement between the center back rail and the outer back rails create a locked engagement when a screw or other fastener holds the outer back rail securely against the center back rail. When the a screw or fastener is loosed the outer back rails may be adjusted laterally to accommodate different sized helmets and/or accommodate the variation in helmet through hole location, which may arise for example during helmet mass production.

In another embodiment, the tab engaging channel embodiment, as shown in FIGS. 48-51, is combined with the toothed back rail embodiment, as shown in FIGS. 52-57, so that outer ends 838 comprise a toothed engagement portion similar to the toothed engagement portion 938 while still having engagement tabs like those of 839a, 839b with forwardly extending tabs 839c, 839d, and the outer back rail 810, 820 comprising a rearward facing portion having teeth similar to the rearward facing portion 916 while still having forwardly extending recesses like those of 816c, 818d.

As shown in FIGS. 55-57, the center back rail 930 has slots 950, 960 for holding goggle straps and securing goggles against a user's face or helmet. The center back rail 930 includes slots 950, 960 configured to receive buckle members 970. The buckle member 970 includes a resilient latch 972 that is depressed inwardly as the buckle member 970 is forced in the direction F of FIG. 55 into the slot 960 of the back rail 930, or direction E for the case of engaging slot 950. The buckle, as shown in FIG. 58, also has flanking supports 944a, 974b that are spaced apart in the lateral direction from the latch 972. The latch 976 has a first raised area 977, and a second raised area 978 separated by a recessed area 979.

The slots have a first raised portion 961 with lateral guiding segments 962*a*, 962*b* on each lateral side. A gap 963 separates the first raised portion from a main guide portion 962. Extending longitudinally inward of the slot from the first raised portion 961 is a second raised portion 964. The second raised portion 964 slopes upwards in a longitudinal direction outward of the slot as it approaches the first raised portion to form a receiving area for receiving the second raised area 978 of the latch 976. The buckle locks into the slot by the second raised area 978 of the latch engaging the second raised portion 964 of the slot and the recessed area 979 of the latch engaging the first raised portion 961 of the slot, and the first raised area 977 of the latch engaged with an outward facing surface 961*a* of the first raised portion 961. The flanking supports 974*a*, 974*b* are guided by the lateral guiding segments 962*a*, 962*b* of the slot on one side and the main guide portion 962 on the other when the buckle member enters and leaves the slot. The buckle member has a strap slot 972 for holding a strap at one end where the strap maybe be connected to a goggle at the other end. It will be understood by one skilled in the art that in other embodiments, the back rail 52 or back rail 830 may comprise slots such as slot 950, 960 of the back rail 930, which are configured to receive buckle members 970.

Variations in Mandibles and Guards

Figure 24D:
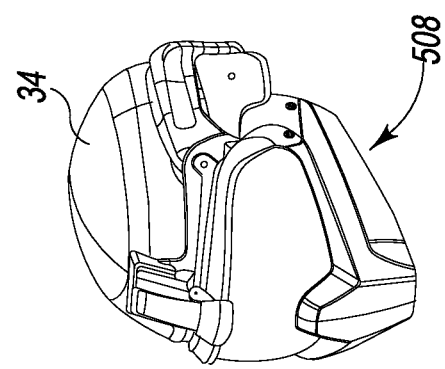
FIG. 24 is a perspective view of multiple helmet assemblies with varying mandible or lower jaw protection configurations.
Figure 24C:
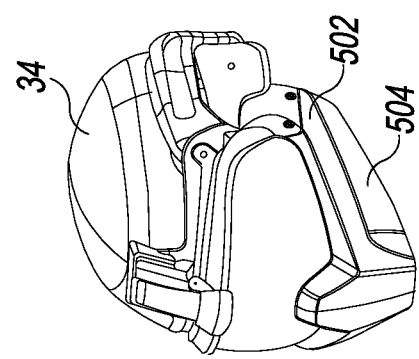
Figure 24B:
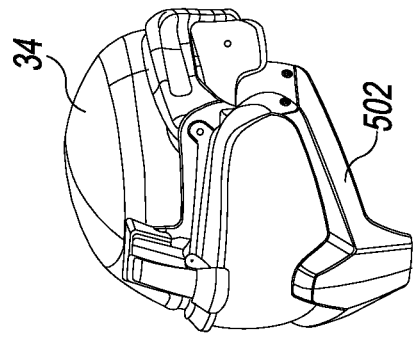
Figure 24A:
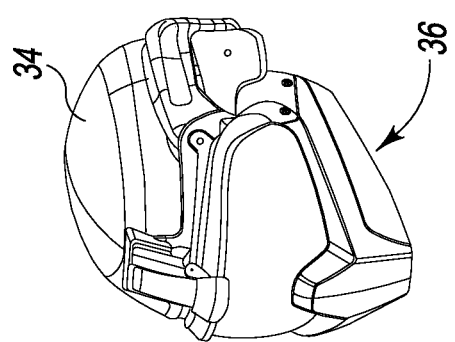
Figure 24H:
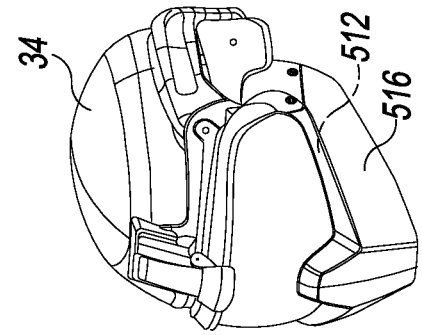
Figure 24G:
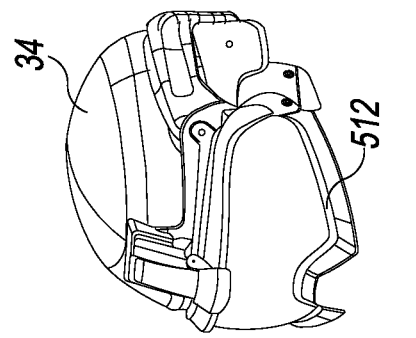
Figure 24F:
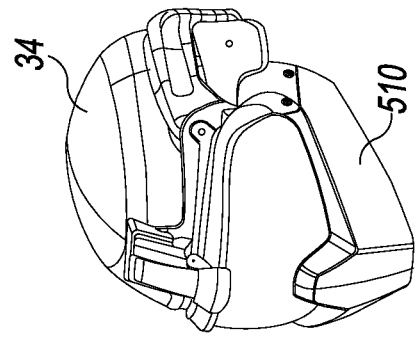
Figure 24E:
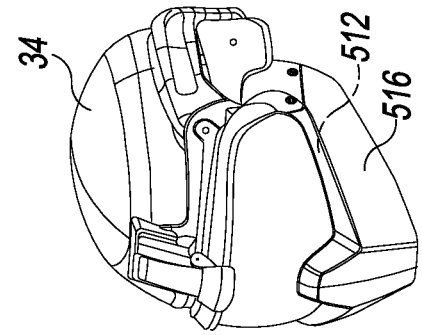
Figure 25:
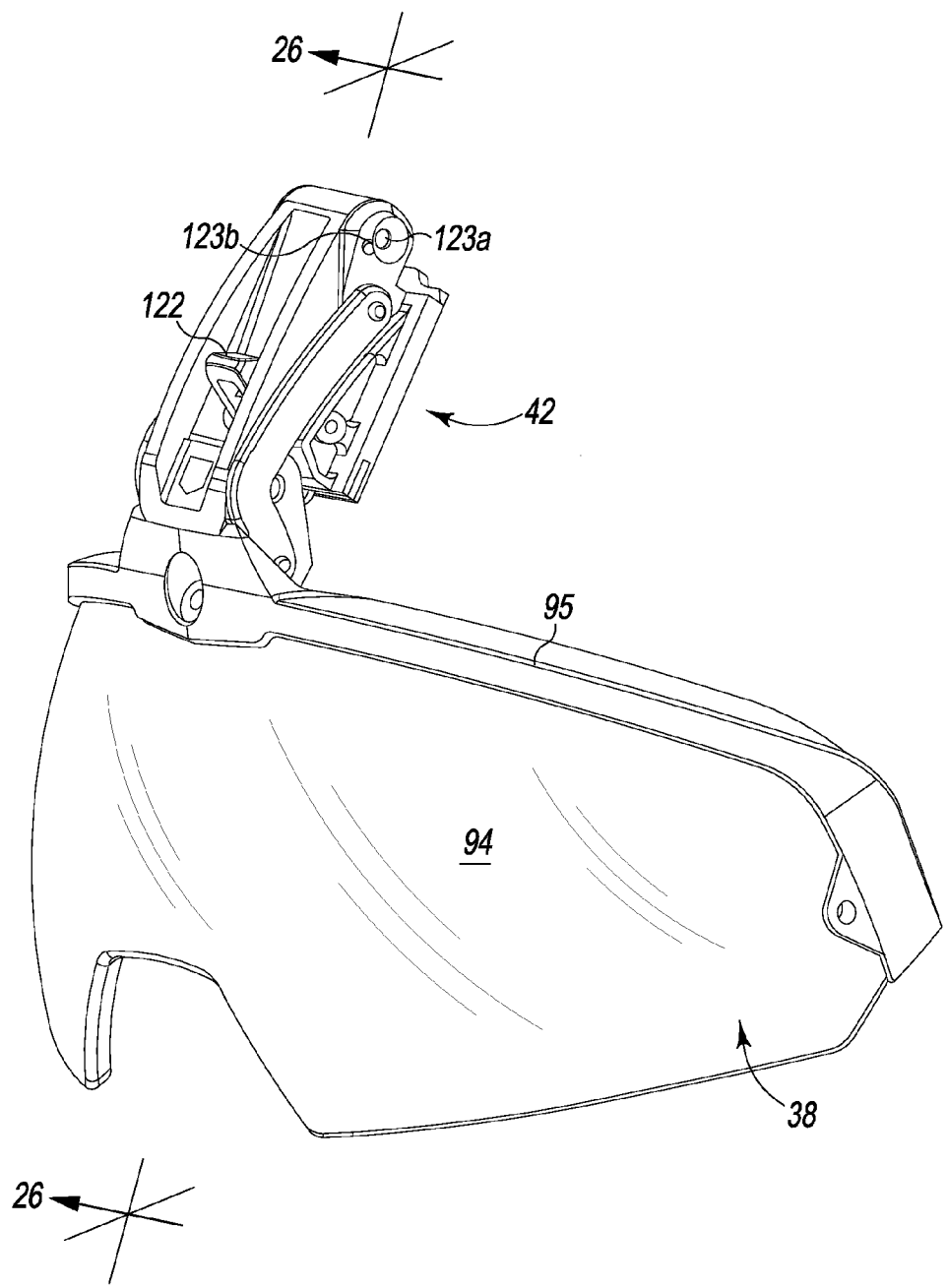
FIG. 25 is a perspective view of the face shield and mounting arrangement shown in FIG. 1, shown in a lowered, use position, but slightly open for ventilation, such as shown in FIG. 2A.

FIGS. 24A-24H illustrate multiple variations of the mandible attached to the helmet. FIG. 24A illustrates the mandible 36 previously described mounted to the helmet 34. FIG. 24B illustrates a rigid guard 502 mounted to the helmet 34. The guard has a shorter profile than the rigid mandible. FIG. 24C illustrates a rigid guard 502 mounted to the helmet 34 and carrying a removable ballistic resistant fabric 504 to extend protection below the guard. FIG. 24D illustrates a rigid guard and integrated non-removable ballistic resistant fabric 508 mounted to the helmet 34. FIG. 24E illustrates a rigid wireframe guard 180 mounted to the helmet 34. FIG. 24 F illustrates the wireframe guard 180 (not visible) having a ballistic resistant fabric 510 applied over the guard. FIG. 24G illustrates a lower semi-flexible frame 512. FIG. 24H illustrates the lower semi-flexible frame 512 with a ballistic resistant fabric 516 to extend protection below the frame.

Semi flexible frame mandibles or guards provide the benefit of conforming to a weapon when the wearer is aiming with a stock of the weapon proximate the cheek.

Alternate Mandible Attachment System

Figure 37:
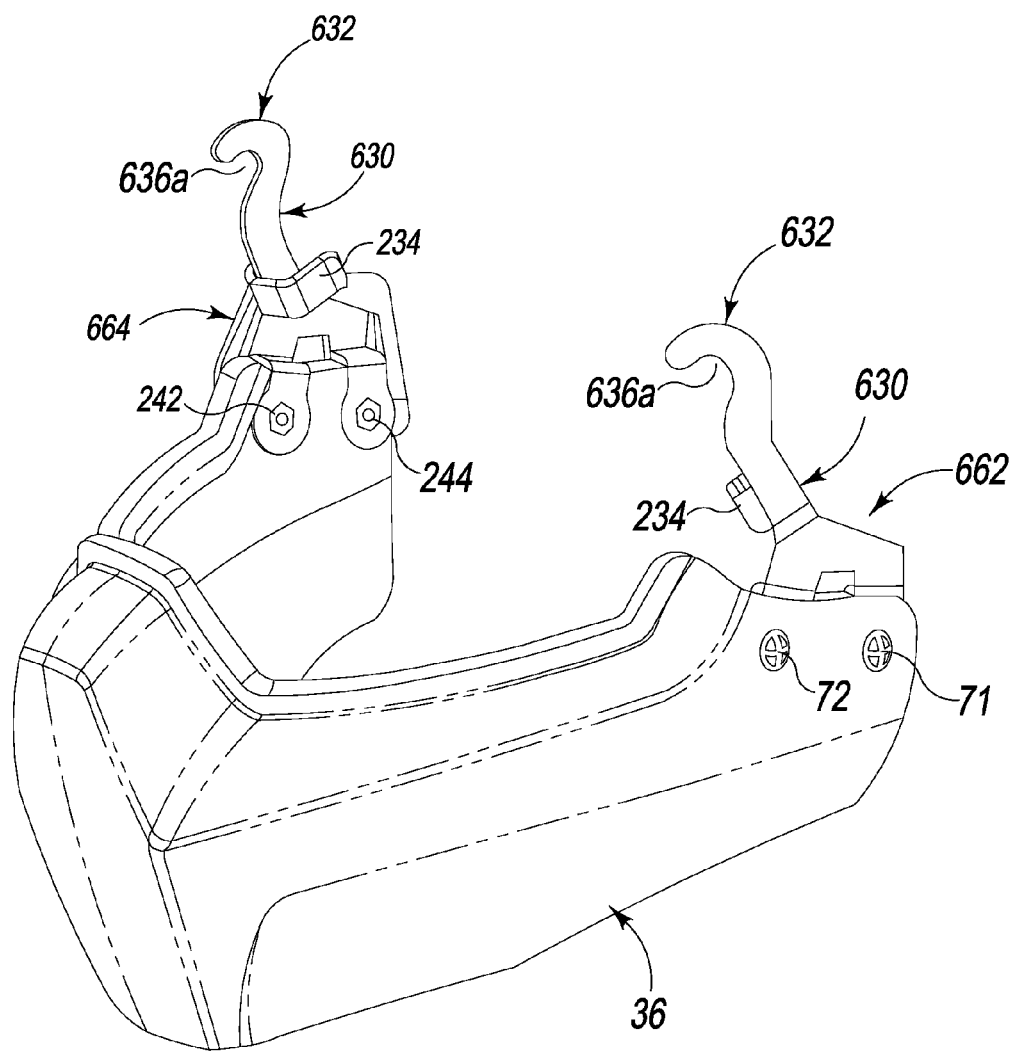
FIG. 37 is a perspective view of an alternate mandible attachment system.
Figure 38:
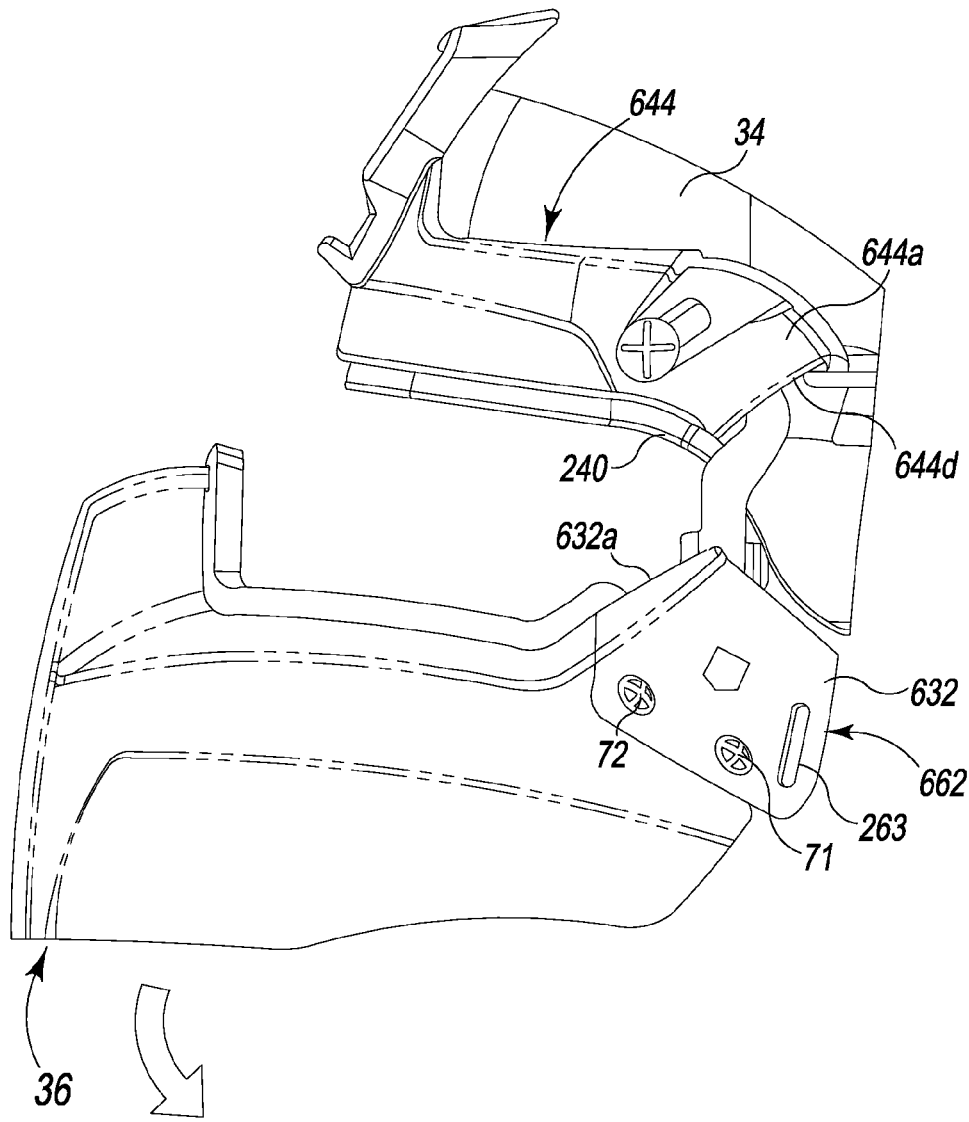
FIG. 38 is a fragmentary side view of a helmet with mandible using the alternate mandible attachment system of FIG. 37.
Figure 39:
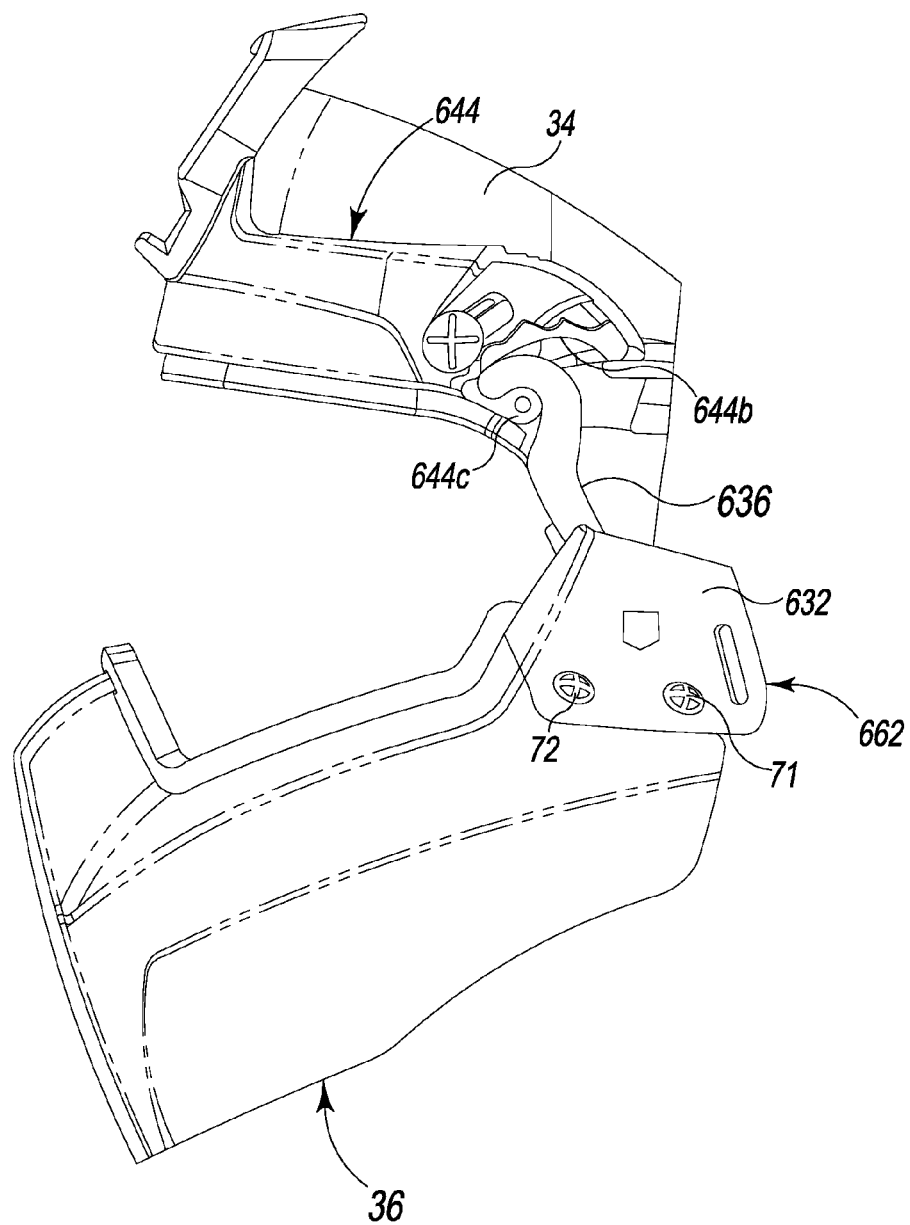
FIG. 39 is a fragmentary side view similar to FIG. 38 with portions removed to show underlying features.

FIGS. 37-39 illustrate an alternate mandible attachment system that includes revised attachment bases 662, 664, constructed in mirror image fashion across a vertical centerplane of the helmet. The bases 662, 664 include revised base plates 630, which are similar to the baseplates 230 (FIGS. 33-34) except as described herein, and a revised helmet mount 644 compared to the mount 44.

Figure 32:
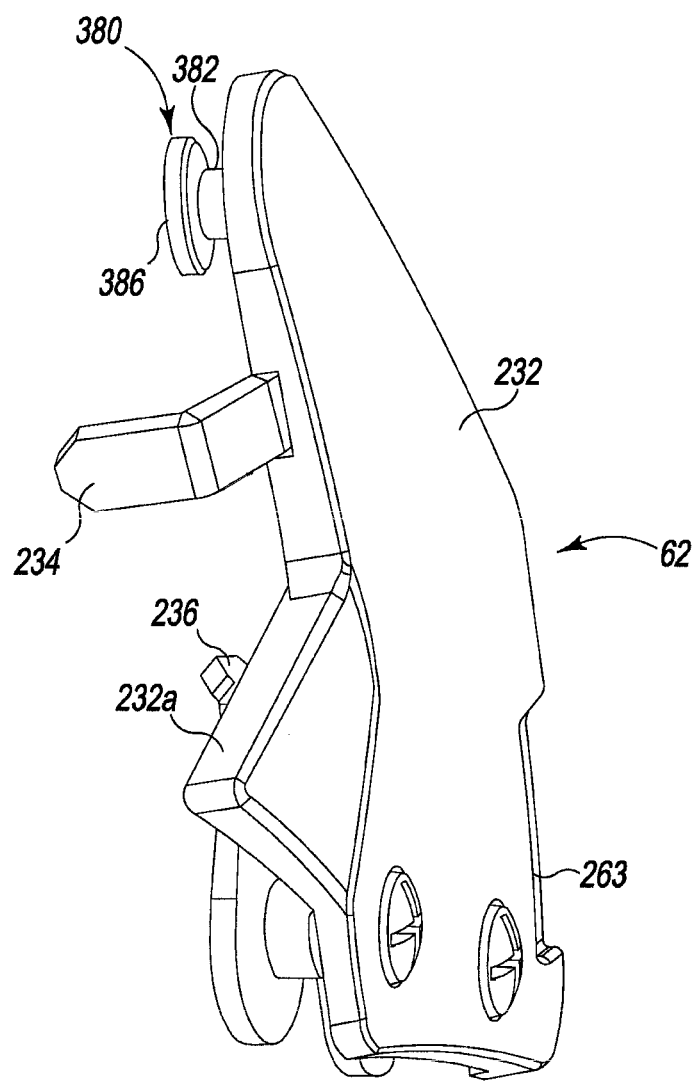
FIG. 32 is a perspective view of an attachment base taken from FIG. 1.

As illustrated in FIGS. 37-39, the attachment base 662 comprises a base plate 630, and an overlying body block 632 (the block 632 is missing in the attachment base 662 in FIG. 37 in order to see underlying features) similar in construction and attachment as the body block 232 shown in FIG. 32. The block 632 can include a surface 632*a* which can support ends of the face shield frame 95 as shown in FIG. 1.

The base plate 630 includes a hook 234 that engage a lower front edge 239 of a brim gasket 240 of the helmet 34 as previously described. The base plate 630 also includes an upstanding hook 636 having hook concavities 636*a* open forwardly.

The base plate 630 also includes two threaded bosses (or bosses terminating in captured nuts) 242, 244 that fit into holes 260, 262 (FIGS. 19, 20 and 21) through the mandible 36 or frame 180 and receive screws 71, 72 that fasten together the mandible 36 (or frame 180), the base plate 630 and the body block 632, as previously described. The mandible provides holes 260, 262 that receive the bosses 242, 244 and screws 71, 72 as previously described (FIG. 20).

The body block 232 includes a slot 263 that is engaged by the strap loop 85 of the strap assembly 76.

The mount 644 includes a concave area 644*a* at each end thereof to form a shaped void 644*b* between the mount 644 and the helmet 34, having an open receiving slot 644*d*. The shaped void is partly defined by a hook-shaped support 644*c* that has a concavity open upwardly and rearward.

To don the mandible or guard, the wearer moves the upstanding hooks 636 of each attachment base 662, 664, with mandible 36 or frame 180 attached, into the open receiving slots 644*d* of the two shaped voids 644*b* on opposite sides of the helmet. The relative position of the mandible or frame with respect to the helmet is shown in FIG. 38. As shown in FIG. 38-39, each void 644*b* receives the hook concavity 636*a* in mutual engagement with the hook-shaped support 644*c*. After the hooks 636 and the supports 644*c* are engaged, the mandible or frame and attachment bases are then rotated down and back from the orientation shown in FIG. 38 to the orientation shown in FIG. 39. The hooks 234 of the attachment bases 662, 664 will then be oriented to brace against the rim gasket 240 as the strap assemblies 76, 78 are strapped to the back rail 52 by the buckle members 87 as previously described.

To open the mandible for hydration (drinking), the buckle members 87 are released and the mandible can be rotated forward. The degree of engagement of the hooks 636 and the supports 644*c* can be designed that the mandible or frame can be rotated sufficiently to hydrate without separating from the helmet.

Both the mandible hooks and the face shield frame supports rest against the helmet brim in the same area; should there be an impact, the load should be absorbed by the helmet.

Mandible Adjustment System

FIGS. 40-44 illustrate an alternative embodiment having a mandible adjustment system that includes revised attachment bases 762, 764, constructed in mirror image fashion across a vertical centerline of the helmet. The second alternate adjustable mandible attachment system provides the ability to move the mandible between an upper limit position, as for example shown in FIGS. 43 and 44, and a lower limit position, as for example shown in FIGS. 41 and 43, to ensure optimal interface between the bottom portion of the visor 94 and the mandible 36. The adjustable mandible attachment system is adjustable to positions within a continuously variable range between the upper limit position and the lower limit position.

Figure 40:
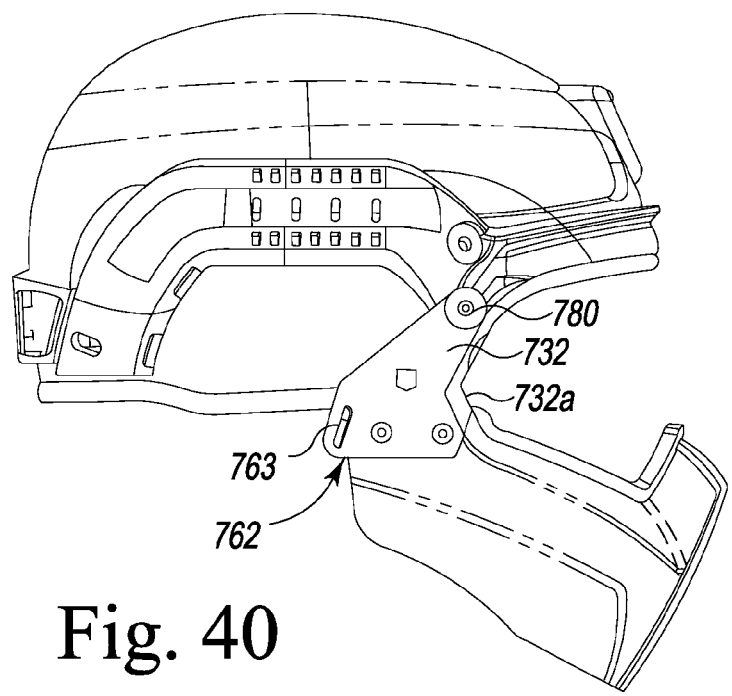
FIG. 40 is a side view of the helmet assembly having a second alternate adjustable mandible attachment system.
Figure 40A:
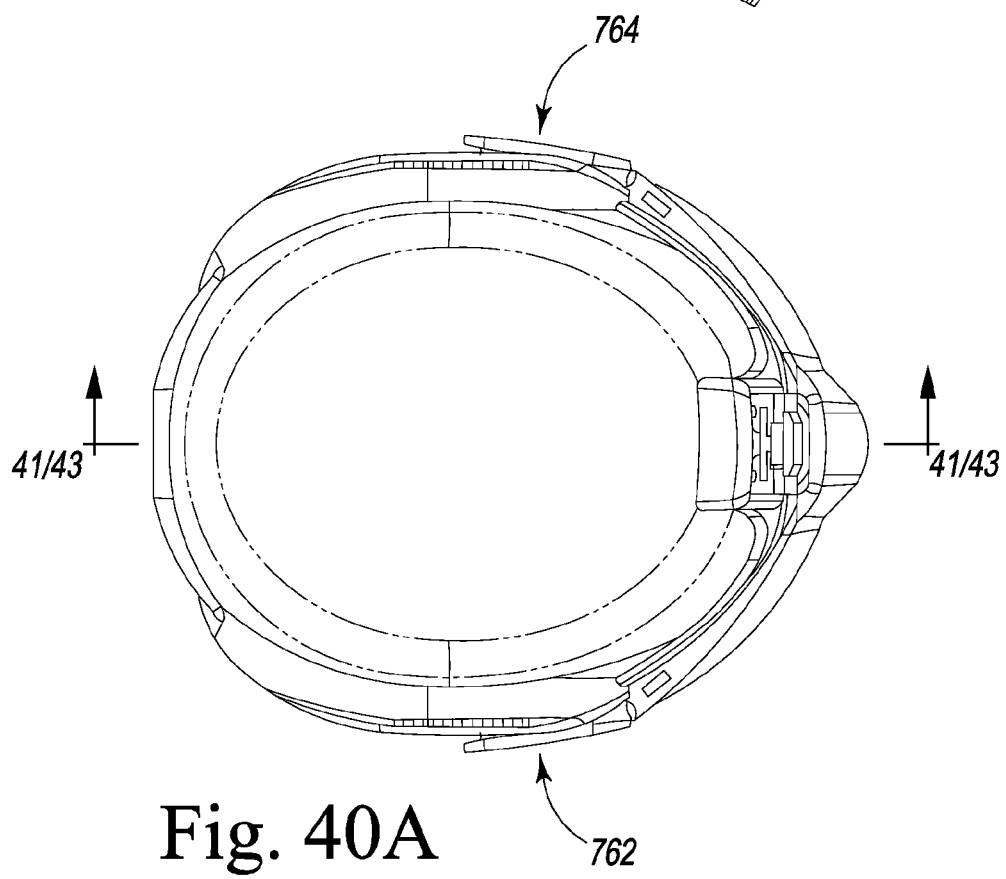
FIG. 40A is a top view of the helmet assembly having a second alternate adjustable mandible attachment system.
Figure 40B:
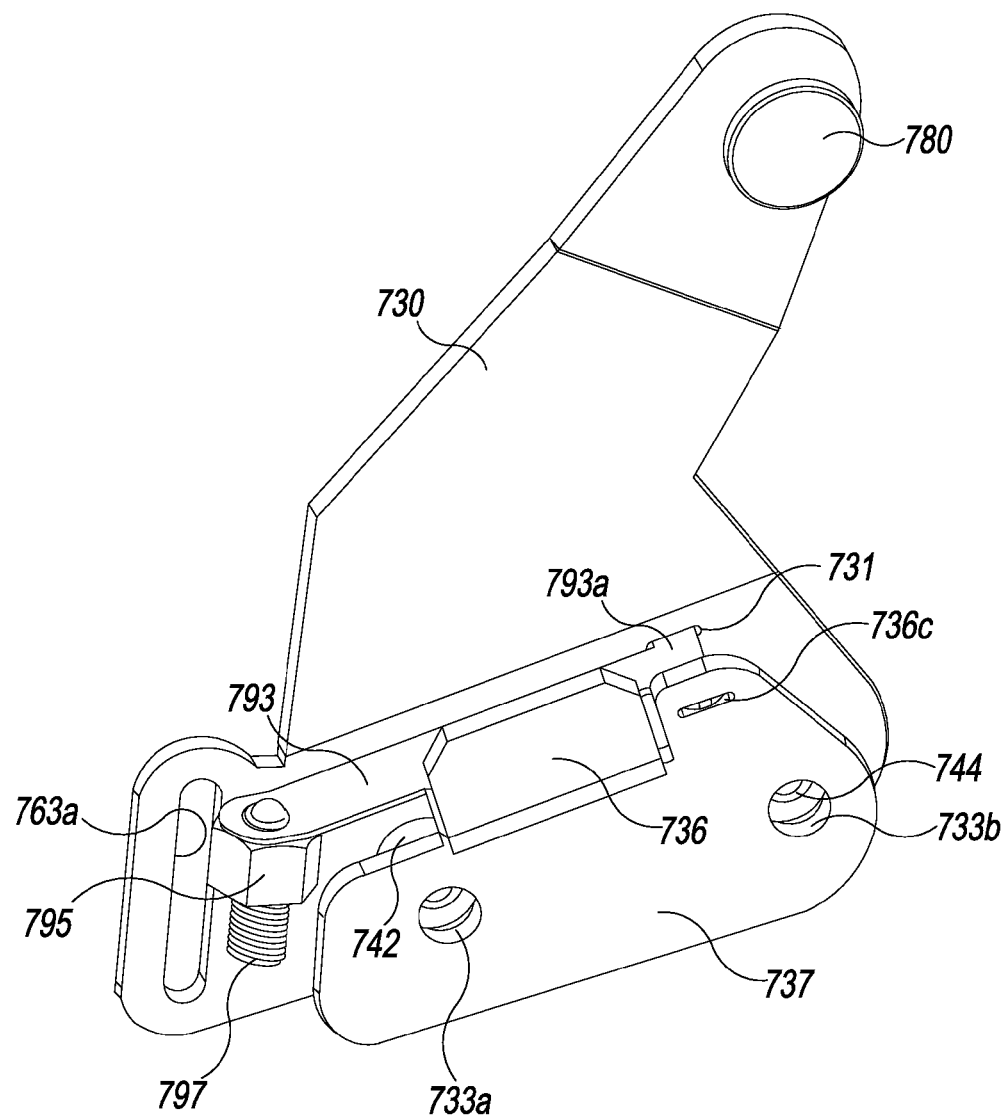
FIG. 40B is an inside perspective view of the attachment base of the second alternate adjustable mandible attachment system.

The bases 762, 764 include revised base plates 730 as shown in FIG. 40B. The base plate 730 includes a fixed, headed pin or rivet 780. The body block 732 includes a slot 763 that is engaged by the strap loop 85 of the strap assembly 76. The base plate includes a corresponding slot 763*a* for engaging the strap loop 85. The base plate 730 also includes two threaded bosses (or bosses terminating in captured nuts) 742, 744 that fit into holes 260, 262 (FIGS. 19, 20 and 21) through the mandible 36 or frame 180 and receive screws (not shown) that fasten together the mandible 36 (or frame 180), the base plate 730 and the body block 732.

FIG. 40B also shows an inner plate 737 that mates with an inner side of the mandible to secure the mandible between the inner plate and the base plate. The inner plate has two fastener holes 733a, 733b that correspond to the threaded bosses 742, 744. The inner plate has a retainer 736 that engages the lower edge 239 of the brim gasket 240 of the helmet 34 (see FIG. 19).

Figure 42:
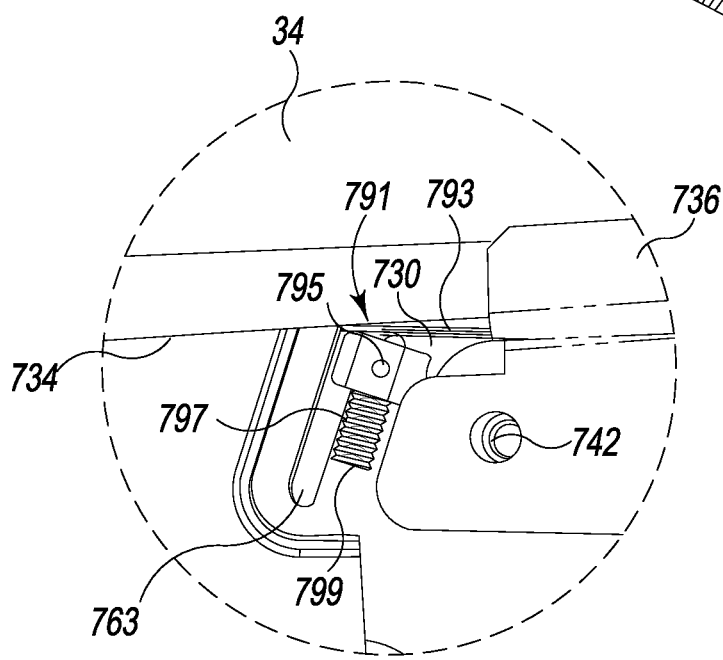
FIG. 42 is a detailed view from FIG. 41.
Figure 43:
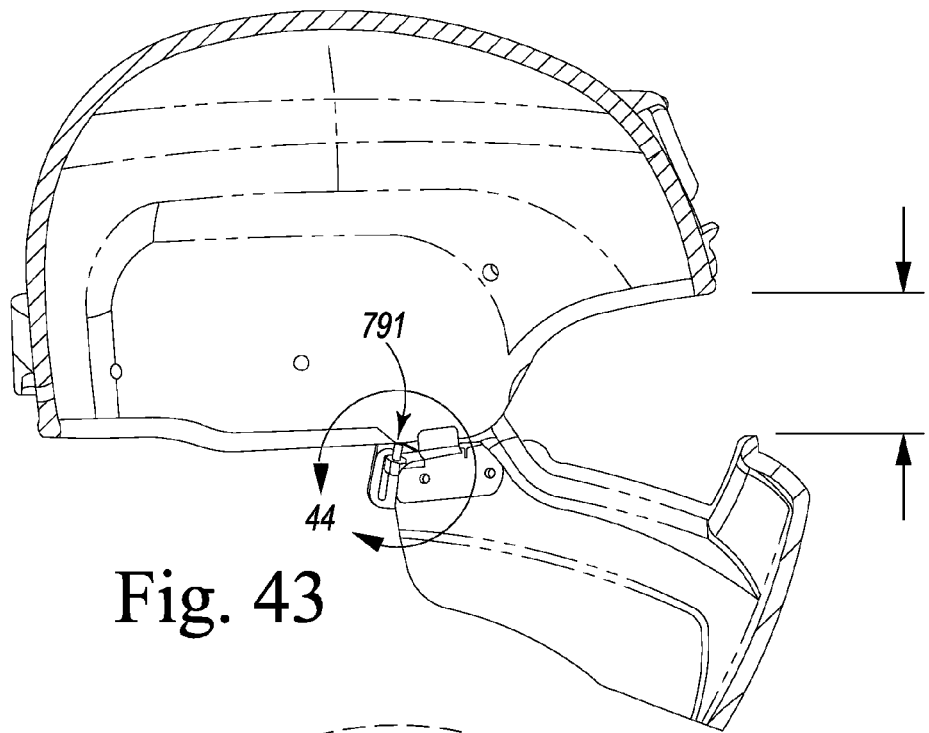
FIG. 43 is a sectional side view from FIG. 40A generally along line 41-41, with the standoff mechanism in a raised position.

The base plate 730 has a standoff mechanism 791. The standoff mechanism 791 has a contact plate 793, a base nut 795 and a set screw 797. The contact plate is flexible and is positioned between the lower edge 239 of the brim gasket 240 of the helmet 34 (see FIG. 19) or a lower edge 734 of the helmet 34 and the set screw 797, as shown in FIG. 42. The base nut 795 is fixed to the inside surface of the base plate 730. In one embodiment, the base nut 795 is located at a rearward position on the base plate 730 near the slot 763. The contact plate prevents the set screw from wearing on the lower edge of the helmet. The base nut is threaded to receive threads of the set screw 797. The set screw has an Allen key (not shown) at the bottom 799 of the set screw, which is configured to receive an Allen wrench for turning the set screw. Other turning mechanisms may also be employed.

As shown in FIG. 40B, the contact plate 793 has a T-shaped end 793a. The opposite lateral ends of the T-shaped portion engage a contact plate slot 731 of the base plate on one side and a contact plate slot 736c of the inner plate on the other side. The T-shaped portion holds the T-shaped portion of the contact plate in position between the base plate and the inner plate and the contact plate flexes from this location.

Figure 41:
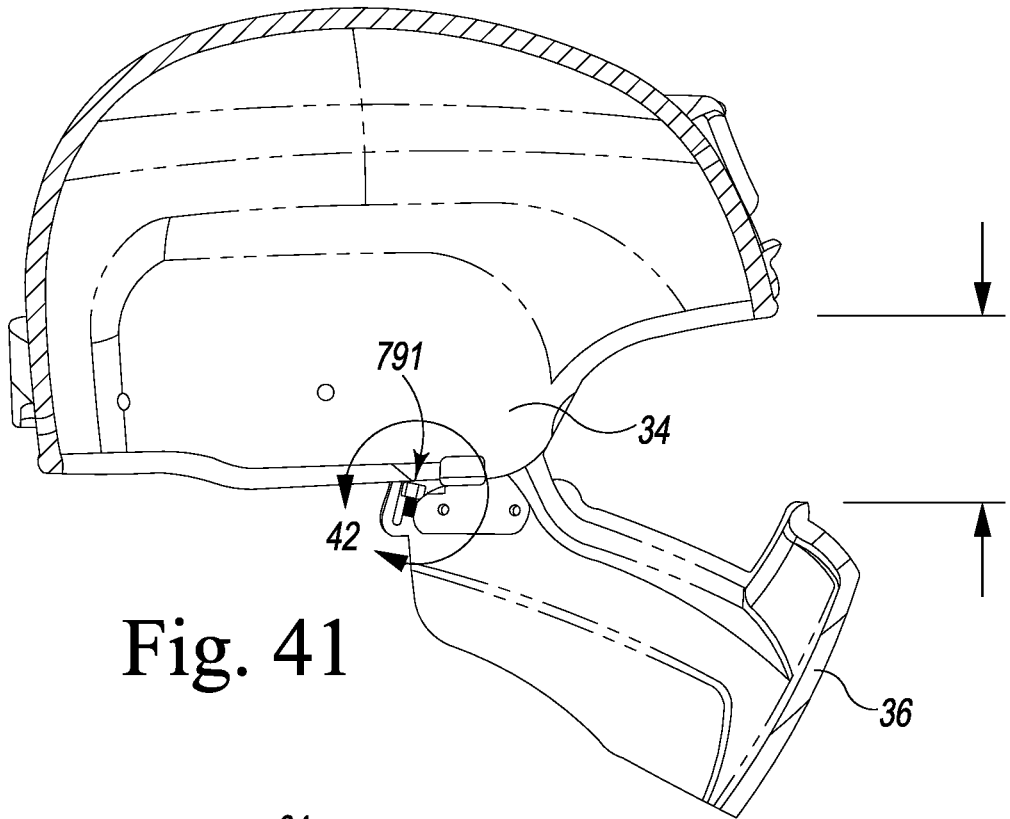
FIG. 41 is a sectional side view taken along 41-41 from FIG. 40A with the standoff mechanism in a lowered position.

When the standoff mechanism is in the lowered position, as shown in FIGS. 41 and 42, the set screw is in a lowered position with respect to the base nut. The base plate may rest against the top of the base nut, when the standoff mechanism is in the lowered position. When the standoff mechanism is in the lowered positioned the mandible is in a lowered position as shown in FIG. 41. To move the mandible upward the set screw is turned to raise the set screw relative to the base nut. As the set screw rises, it engages the contact plate 793 which puts pressure on the lower edge of the helmet. As the set screw is moved upward relative to the base nut, the base plate 730 pivots about the rivet 780 that is within the side channel 44a, and thereby raises the mandible closer to the front bottom edge of the helmet.

Figure 44:
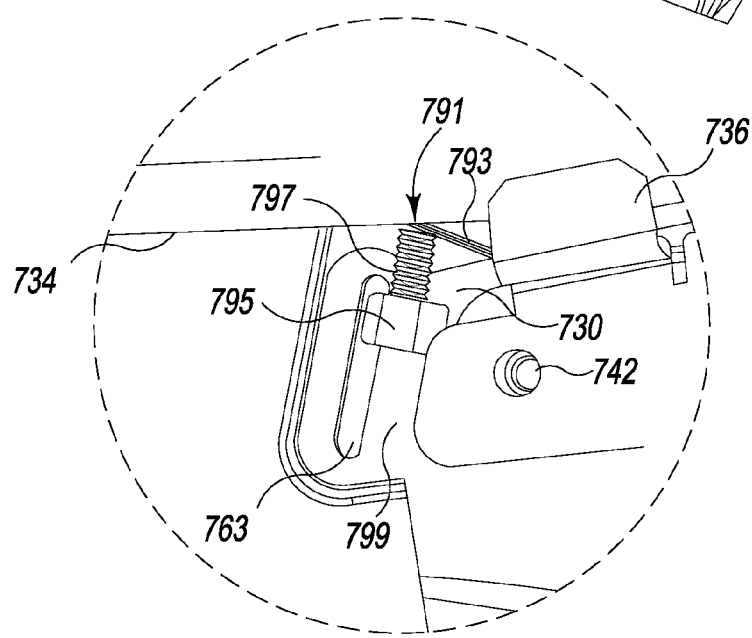
FIG. 44 is a detailed view from FIG. 43.
Figure 45:
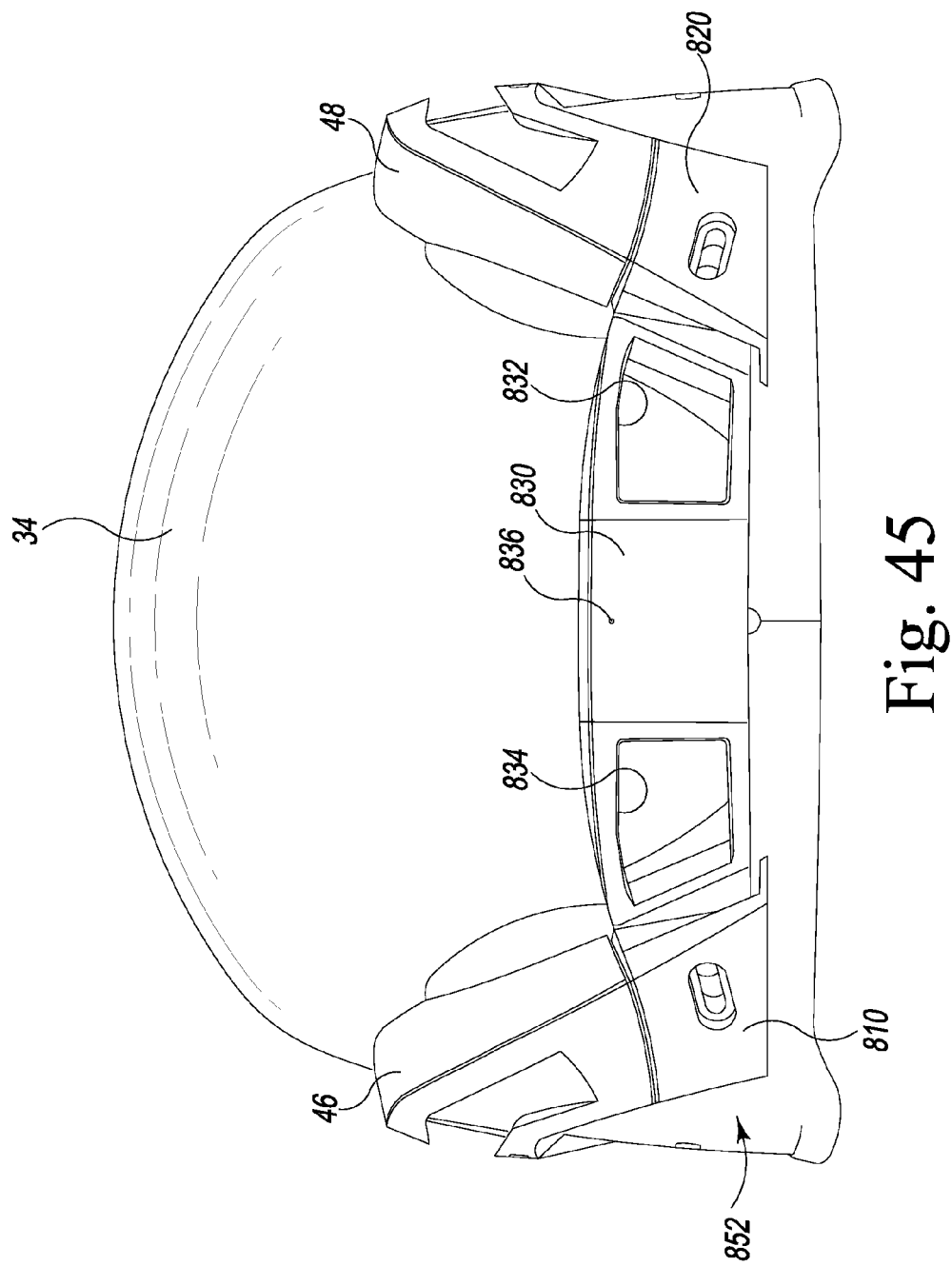
FIG. 45 is a rear view of the helmet assembly having an alternate adjustable back rail system.
Figure 46:
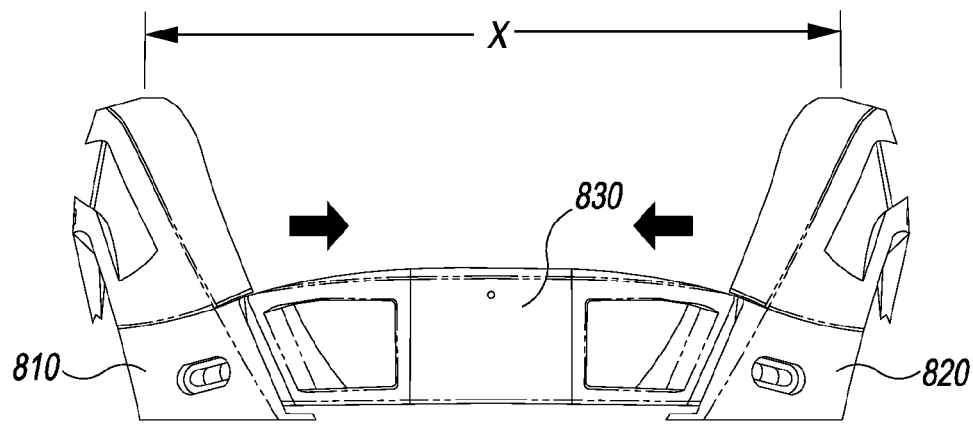
FIG. 46 is a rear view of the helmet assembly having the alternate adjustable back rail system in a contracted position, where the helmet is not shown.

As shown in FIG. 44, the rear portion of the base plate is driven downward as the set screw is moved upward relative to the base nut. This causes the contact plate to flex, remaining connected to the base plate at one end and positioned between the set screw and the bottom edge of the helmet at an opposite end of the contact plate. The upper and lower limit positions are determined, at least in part, by the length of the set screw.

Figure 69:
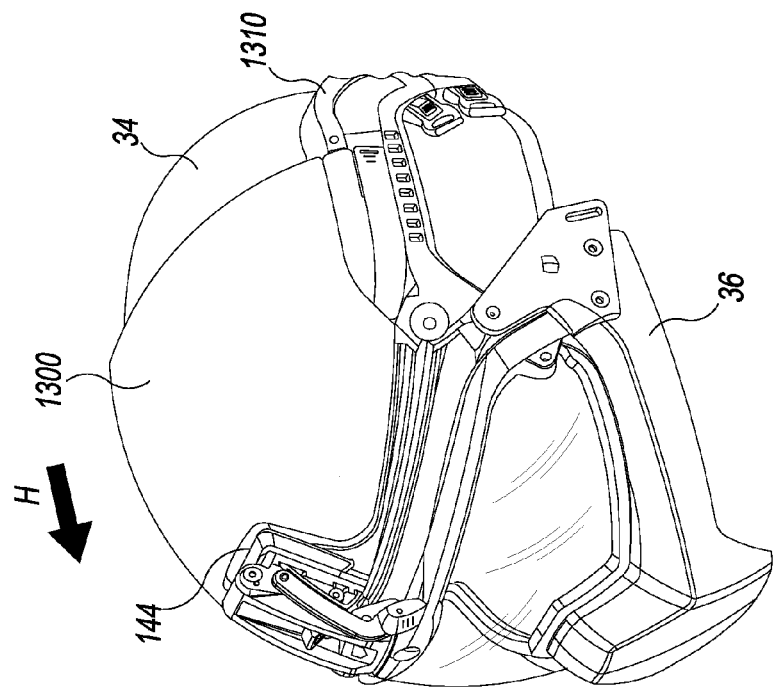
FIG. 69 is a perspective view of a helmet system.
Figure 68:
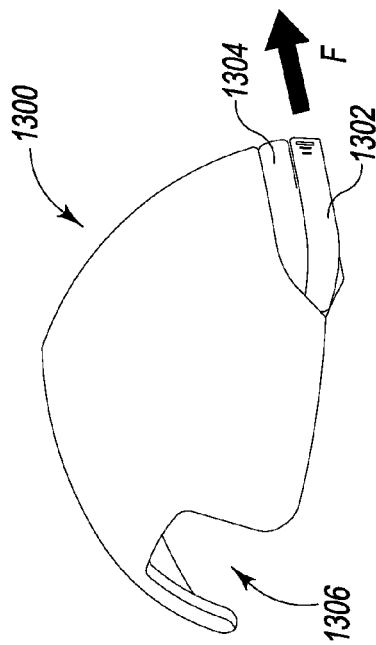
FIG. 68 is a perspective view of a head cap.

As shown in FIGS. 68 and 69, the helmet system may include an protective head cap 1300. The cap has a front opening 1306 that corresponds to the top front formation or central accessory mount 144. The central accessory mount may also be a mount for receiving the visor mounting arrangement 42. The front opening allow the accessory mount 144 to be received there through. The cap includes side rail engagement members 1304 (not shown for right side). The left side rail engagement member 1302 mirror image identical across the vertical midplate extending front to back of the helmet system.

Figure 70:
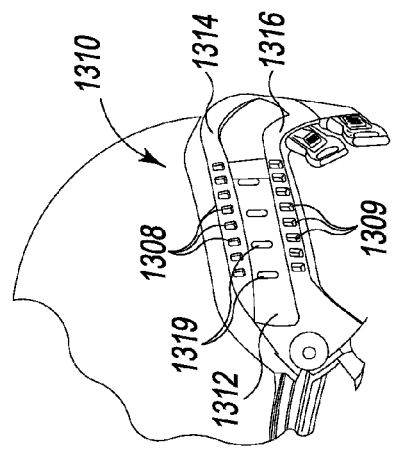
FIG. 70 is a perspective view of a side rail.

A second embodiment of the side rail 1310 is shown in FIG. 70. The side raid is identical to the side rail 46 except as described. The rail 1310 includes two raised portions 1314, 1316 and a recessed portion 1312 therebetween. The raised portions have a plurality of first accessory engagement recesses 1308, 1309. Similar first accessory engagement recesses 46f, 46g are shown in rail 46 in FIG. 6. The recessed portion contains a plurality of second accessory engagement recesses. The second engagement recesses are larger than the first engagement recessed. The engagement recesses can be used to secure accessories to the side rail.

The side rail engagement members 1302 contain an attachment mechanism for securing the protective cap to the side rails of the helmet system as shown in FIG. 69. The attachment mechanisms may comprise flexible protrusion on the underside of the side rail 1302 or a upper portion of the side rail 1304. The flexible protrusions engage one or more of corresponding second or first engagement recesses 1311, 1308 of the rail 1310. The flexible protrusion secure the cap 1300 to the side rails until a predetermined amount of force is applied in the H direction, as shown in FIG. 69, to remove the cap from the side rails.

Alternatively the cap 1300 may have an attachment mechanism having engagement members that are manually releasable by a mechanical locking mechanism. The engagement member engages the second or first engagement recesses 1311, 1308. The cap is removable by releasing the mechanical locking mechanism. The attachment mechanism may provide a sliding one-way lock engagement that allows the cap to be slid on in the direction F as shown in FIG. 68, but not removed without the release of the lock mechanism. In another embodiment, the lock mechanisms by be electronically controlled.

The cap 1300 may be made of composite material such as KEVLAR and thermoplastic or High-density polyethylene and thermoplastic.

Exemplary materials of construction for the helmet assembly include:

Helmet: Aramid fiber textile with either thermoplastic matrix or thermoset matrix Front mount: Glass reinforced nylon for the plastic part and Aluminum for the insert (where the visor attaches/anchors)

Side rails: Glass reinforced nylon

Back Rail: Glass reinforced nylon

Top rail: Glass reinforced nylon

Attachment bases for mandible: Glass reinforced nylon over Aluminum, Steel, Stainless Steel or Titanium Rigid mandible: It can be a combination of various materials such as: 1) aramid fiber textile and thermoplastic or thermoset matrix 2) aramid fiber textile and thermoplastic or thermoset matrix wrapped in carbon fiber textile 3) High Density Polyethylene wrapped in carbon fiber textile Soft mandible: Semi-Flexible Frame made of Nylon while the curtain (hanging from the frame) is made out of aramid fiber textile (many layers).

The presently described embodiment provides flexibility in outfitting a military helmet. The back rail can be used without the side rails. A top rail is optional. The mandible or frame is optional, and when used, can be used without the side rails. Other permutations are possible with some minor modifications.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A helmet and mandible combination comprising:
a helmet including a left channel and a right channel on opposite sides of the helmet and having a brim, each of the left and right channels having an open mouth;
left and right attachment bases configured to be carried by the helmet on opposite sides of the helmet, wherein the left attachment base includes a first pin which is slidable and rotatable within the left channel, and is removable from the left channel via the open mouth of the left channel, and the right attachment base includes a second pin which is slidable and rotatable within the right channel, and is removable from the right channel via the open mouth of the right channel, and wherein each of the left and right attachment bases abut the helmet brim when the attachment bases are attached to the helmet; and
a mandible attached to the left and right attachment bases, wherein the first pin is removable from the left channel through the open mouth in a direction transverse to a longitudinal direction of the first pin, and the second pin is removable from the right channel through the open mouth in a direction transverse to a longitudinal direction of the second pin;
the mandible and attachment bases are configured so that the mandible remains attached to the left and right attachment bases when the mandible has been removed from the helmet and the first and second pins have been removed from the left and right channels; and
the attachment bases are pivotally attached to the helmet at tops thereof and are braced on lower ends thereof against the helmet brim.

2. The helmet and mandible combination according to claim 1, wherein the attachment bases each comprise a metal base plate and a body block attached to the base plate, the block providing an attachment for a strap to stabilize the mandible on the helmet.

3. The helmet and mandible combination according to claim 1, wherein the left attachment is urged to brace against the brim by a first strap that is connected to the left attachment base and is connectable to the helmet, and the right attachment base is urged to brace against the brim by a second strap that is connected to the right attachment base and is connectable to the helmet.

4. The helmet and mandible combination according to claim 1, wherein the attachment bases are braced against the brim by a set screw and by a strap that connects the two attachment bases around a back of the helmet and urges the set screw against the brim.

5. The helmet and mandible combination according to claim 1, wherein the mandible comprises one selected from the group consisting of: a solid rigid guard, a rigid guard mounted to the helmet and carrying a removable ballistic resistant fabric to extend protection below the guard, a rigid wireframe guard, a wireframe guard having a ballistic resistant fabric applied over the guard, a lower semi-flexible frame, a lower semi-flexible frame with a ballistic resistant fabric to extend protection below the frame.

6. The helmet and mandible combination of claim 1, wherein each of the open mouth of the left channel and the open mouth of the right channel comprises a wide mouth.

7. A helmet and mandible combination comprising:
a helmet;
a visor lens;
the helmet including a channel, and the channel having an open mouth;
a mandible removably retained on the helmet by a pin removably retained in the channel at a location higher on the helmet than at least a portion of the visor lens, the pin being removable through the open mouth;
wherein:
the channel is arranged to permit the pin to be slid downward to the location at which the pin is removably retained; and
the pin has a longitudinal direction, and the pin is removable through the open mouth in a direction transverse to the longitudinal direction of the pin.

8. The helmet and mandible combination of claim 7, wherein the pin is a headed pin.

9. The helmet and mandible combination of claim 7, further comprising a securing element attached to the mandible and releasably attachable to the helmet to releasably secure the mandible to the helmet and selectively prevent the pin from being removed from the channel.

10. The helmet and mandible combination of claim 9, wherein the securing element comprises a strap.

11. The helmet and mandible combination of claim 9, wherein the mandible is associated with a hook, and wherein the hook is urged against the helmet when the securing element secures the mandible to the helmet.

12. The helmet and mandible combination of claim 7, wherein the pin is attached to the mandible.

13. The helmet and mandible combination of claim 7, wherein the channel is formed in a mount attached to the helmet.

14. The helmet and mandible combination of claim 7, wherein the helmet has a brim, the pin is attached to an attachment base, the mandible is attached to the attachment base, and the attachment base braces against the helmet brim.

15. A helmet and mandible combination comprising:
a helmet including a left channel and a right channel on opposite sides of the helmet and having a brim, each of the left and right channels having an open mouth;
left and right attachment bases configured to be carried by the helmet on opposite sides of the helmet, wherein the left attachment base includes a first pin which is slidable and rotatable within the left channel, and is removable from the left channel via the open mouth of the left channel, and the right attachment base includes a second pin which is slidable and rotatable within the right channel, and is removable from the right channel via the open mouth of the right channel; and
a mandible attached to the left and right attachment bases, wherein the attachment bases are pivotally attached to the helmet at tops thereof and are braced on lower ends thereof against the helmet brim.

16. The helmet and mandible combination of claim 15, wherein the first pin is removable from the left channel through the open mouth in a direction transverse to a longitudinal direction of the first pin, and the second pin is removable from the right channel through the open mouth in a direction transverse to a longitudinal direction of the second pin.

17. A helmet and mandible combination comprising:
a helmet including a left channel and a right channel on opposite sides of the helmet and having a brim, each of the left and right channels having an open mouth;
left and right attachment bases configured to be carried by the helmet on opposite sides of the helmet, wherein the left attachment base includes a first pin which is slidable and rotatable within the left channel, and is removable from the left channel via the open mouth of the left channel, and the right attachment base includes a second pin which is slidable and rotatable within the right channel, and is removable from the right channel via the open mouth of the right channel, and wherein each of the left and right attachment bases abut the helmet brim when the attachment bases are attached to the helmet; and a mandible attached to the left and right attachment bases, wherein the first pin is removable from the left channel through the open mouth in a direction transverse to a longitudinal direction of the first pin, and the second pin is removable from the right channel through the open mouth in a direction transverse to a longitudinal direction of the second pin; and the mandible and attachment bases are configured so that the mandible remains attached to the left and right attachment bases when the mandible has been removed from the helmet and the first and second pins have been removed from the left and right channels, wherein the helmet includes a visor lens, and the open mouths of each of the first channel and the second channel are positioned higher on the helmet than at least a portion of the visor lens.

18. A helmet and mandible combination comprising:
a helmet including a left channel and a right channel on opposite sides of the helmet and having a brim, each of the left and right channels having an open mouth;
left and right attachment bases configured to be carried by the helmet on opposite sides of the helmet, wherein the left attachment base includes a first pin which is slidable and rotatable within the left channel, and is removable from the left channel via the open mouth of the left channel, and the right attachment base includes a second pin which is slidable and rotatable within the right channel, and is removable from the right channel via the open mouth of the right channel, and wherein each of the left and right attachment bases braces against the helmet brim when the attachment bases are attached to the helmet; and
a mandible attached to the left and right attachment bases, wherein the first pin is removable from the left channel through the open mouth in a direction transverse to a longitudinal direction of the first pin, and the second pin is removable from the right channel through the open mouth in a direction transverse to a longitudinal direction of the second pin; and wherein the attachment bases are pivotally attached to the helmet at tops thereof and are braced on lower ends thereof against the helmet brim.

19. A helmet and mandible combination comprising:
a helmet including a left channel and a right channel on opposite sides of the helmet and having a brim, each of the left and right channels having an open mouth;
left and right attachment bases configured to be carried by the helmet on opposite sides of the helmet, wherein the left attachment base includes a first pin which is slidable and rotatable within the left channel, and is removable from the left channel via the open mouth of the left channel, and the right attachment base includes a second pin which is slidable and rotatable within the right channel, and is removable from the right channel via the open mouth of the right channel, and wherein each of the left and right attachment bases abut the helmet brim when the attachment bases are attached to the helmet; and
a mandible attached to the left and right attachment bases, wherein the first pin is removable from the left channel through the open mouth in a direction transverse to a longitudinal direction of the first pin, and the second pin is removable from the right channel through the open mouth in a direction transverse to a longitudinal direction of the second pin;
the mandible and attachment bases are configured so that the mandible remains attached to the left and right attachment bases when the mandible has been removed from the helmet; and
the helmet includes a visor lens, and the open mouths of each of the first channel and the second channel are positioned higher on the helmet than at least a portion of the visor lens.

20. The helmet and mandible combination of claim 19, wherein the first pin is a headed pin.

21. The helmet and mandible combination claim 19, further comprising a securing element associated with the mandible to releasably secure the mandible to the helmet.

22. The helmet and mandible combination of claim 19, wherein the mandible is associated with a hook, and wherein the hook is urged against the helmet when the securing element secures the mandible to the helmet.

23. The helmet and mandible combination of claim 19, wherein the channel is formed in a mount attached to the helmet.

* * * * *